(12) United States Patent
Ng et al.

(10) Patent No.: US 12,476,001 B2
(45) Date of Patent: Nov. 18, 2025

(54) DEVICE, SYSTEM AND METHOD FOR DETERMINING FACE TOUCHING

(71) Applicant: ELBAWARE LTD, Auckland (NZ)

(72) Inventors: Adrian Chun Hoow Ng, Auckland (NZ); Anthony Ronald John Phillips, Auckland (NZ); Bruce Mackenzie Stokes, Auckland (NZ)

(73) Assignee: ELBAWARE LTD, Auckland (NZ)

( * ) Notice: Subject to any disclaimer, the term of this patent is extended or adjusted under 35 U.S.C. 154(b) by 269 days.

(21) Appl. No.: 18/032,709

(22) PCT Filed: Oct. 20, 2021

(86) PCT No.: PCT/NZ2021/050184
§ 371 (c)(1),
(2) Date: Apr. 19, 2023

(87) PCT Pub. No.: WO2022/086346
PCT Pub. Date: Apr. 28, 2022

(65) Prior Publication Data
US 2023/0410997 A1    Dec. 21, 2023

(30) Foreign Application Priority Data
Oct. 23, 2020    (NZ) ........................... 769261

(51) Int. Cl.
*G16H 40/63*    (2018.01)
*G06F 3/01*    (2006.01)
(52) U.S. Cl.
CPC ............. *G16H 40/63* (2018.01); *G06F 3/011* (2013.01)
(58) Field of Classification Search
CPC ................... G16H 40/63; G06F 3/011; A61B 2562/0223; A61B 5/6824; A61B 5/1121;
(Continued)

(56) References Cited

U.S. PATENT DOCUMENTS

| 5,424,719 A | 6/1995 | Ravid |
| 6,360,615 B1 | 3/2002 | Smela |

(Continued)

FOREIGN PATENT DOCUMENTS

| CN | 110122929 | 8/2019 |
| GB | 2593550 A | 9/2021 |

(Continued)

OTHER PUBLICATIONS

Hui TKL, Sherratt RS. Coverage of Emotion Recognition for Common Wearable Biosensors. Biosensors (Basel). Mar. 24, 2018;8(2): 30. doi: 10.3390/bios8020030. PMID: 29587375; PMCID: PMC6023004. (Year: 2018).*

(Continued)

*Primary Examiner* — Sun M Li
(74) *Attorney, Agent, or Firm* — Leason Ellis LLP

(57) ABSTRACT

There is provided a wearable device and/or system for determining one or more of potential, imminent and actual touching of a user's face by the user's hand. The wearable device may comprise two sensors. The sensors may be configured to sense parameters indicative of the position and/or orientation of the user's arm, or part of the user's arm. A first sensor may be configured to sense an angle between the user's forearm and the user's upper arm. A second sensor may be configured to sense an orientation of the user's forearm with respect to gravity. The sensor signals may be sent to a processor for determining whether the user's arm position is indicative of face touching. The processor may be comprised as part of the wearable device, or the processor may comprised as part of the system separate to the wearable device, for example remote from the wearable device. The wearable device and/or system may comprise an output device for indicating that the user's arm position is indicative of face touching.

20 Claims, 44 Drawing Sheets

(58) Field of Classification Search
CPC ....... A61B 5/7282; A61B 5/0022; A61B 5/74; A61B 2562/0219

See application file for complete search history.

(56) References Cited

U.S. PATENT DOCUMENTS

| | | | |
|---|---|---|---|
| 6,487,906 | B1 | 12/2002 | Hock |
| 6,762,687 | B2 | 7/2004 | Perlman |
| 6,890,312 | B1 | 5/2005 | Priester et al. |
| 7,033,281 | B2 | 4/2006 | Carnahan et al. |
| 10,456,604 | B2 | 10/2019 | Cheatham, III |
| 2004/0027247 | A1* | 2/2004 | Pittman .................. G08B 23/00 340/573.7 |
| 2007/0283966 | A1* | 12/2007 | Maples .................... A61F 5/013 128/845 |
| 2009/0125083 | A1 | 5/2009 | Maples |
| 2010/0033441 | A1* | 2/2010 | Park ........................ G06F 3/044 345/173 |
| 2011/0144453 | A1* | 6/2011 | Kovarik ............... A61B 5/6893 600/300 |
| 2012/0146899 | A1* | 6/2012 | Teng ....................... G06F 3/014 345/157 |
| 2014/0194781 | A1 | 7/2014 | Einarsson |
| 2014/0198035 | A1* | 7/2014 | Bailey .................... G06F 3/0484 345/156 |
| 2014/0257142 | A1 | 9/2014 | Sarkodie-Gyan et al. |
| 2015/0320340 | A1 | 11/2015 | Verma |
| 2016/0140830 | A1* | 5/2016 | Hathorn ................ G08B 21/02 340/686.6 |
| 2017/0127979 | A1* | 5/2017 | Azaria .................... A61B 5/053 |
| 2017/0245793 | A1* | 8/2017 | Shen ..................... A61B 5/0077 |
| 2018/0027908 | A1* | 2/2018 | Greenly ................. A61B 5/681 |
| 2018/0092574 | A1 | 4/2018 | Tzvieli et al. |
| 2018/0192891 | A1 | 7/2018 | Brigham et al. |
| 2018/0192897 | A1 | 7/2018 | Mori et al. |
| 2021/0315488 | A1* | 10/2021 | McDaid ................. A61H 1/024 |
| 2023/0137048 | A1* | 5/2023 | Petty .................... A61B 5/7455 600/595 |

FOREIGN PATENT DOCUMENTS

| | | | |
|---|---|---|---|
| WO | 2011/063131 | 5/2011 | |
| WO | WO-2011063131 A1 * | 5/2011 | ......... A61B 10/0038 |
| WO | 2016077821 | 5/2016 | |
| WO | 2016/100368 | 6/2016 | |
| WO | 2020/004399 | 1/2020 | |
| WO | WO-2020004399 A1 * | 1/2020 | ............... A61B 5/11 |

OTHER PUBLICATIONS

C. Beach et al., "An Ultra Low Power Personalizable Wrist Worn ECG Monitor Integrated With IoT Infrastructure," in IEEE Access, vol. 6, pp. 44010-44021, 2018, doi: 10.1109/ACCESS.2018. 2864675. (Year: 2018).*

N. D'Aurizio, T. L. Baldi, G. Paolocci and D. Prattichizzo, "Preventing Undesired Face-Touches With Wearable Devices and Haptic Feedback," in IEEE Access, vol. 8, pp. 139033-139043, 2020, doi: 10.1109/ACCESS.2020.3012309. (Year: 2020).*

International Search Report and Written Opinion in corresponding International Patent Application No. PCT/NZ2021/050184, mailed Jan. 31, 2022 (22 pages).

D'Aurizio N, et al., 'Preventing undesired face-touches with wearable devices and haptic feedback', IEEE Access, Jul. 27, 2020; vol. 8, pp. 139033-139043.

Sudharsan B, et al., 'Avoid touching your face: A hand-to-face 3d motion dataset (covid-away) and trained models for smartwatches', In 10th International Conference on the Internet of Things Companion Oct. 6, 2020 (pp. 1-9).

Anthony'Chen X., 'FaceOff: Detecting Face Touching with a Wrist-Worn Accelerometer', arXiv e-prints. Aug. 2020: arXiv-2008.

Azaria, A., et al., 'Thumbs-Up—Wearable Sensing Device for Detecting Hand-to-Mouth Compulsive Habits', In Proceedings of the 9th International Joint Conference on Biomedical Engineering Systems and Technologies (BIOSTEC Jan. 2016)—vol. 1: Biodevices, pp. 54-65.

* cited by examiner

DEVICE, SYSTEM AND METHOD FOR DETERMINING FACE TOUCHING

This patent application is a U.S. National Phase Application under 35 U.S.C. § 371 of International Patent Application No. PCT/NZ2021/050184, filed on Oct. 22, 2021, which claims priority from New Zealand patent application no. 769261, filed on Oct. 23, 2020, all of which are incorporated by reference, as if expressly set forth in their respective entireties herein.

1. FIELD OF THE INVENTION

The present invention relates to devices, systems and methods for determining face touching. The present invention further relates to devices, systems and methods for indicating face touching. The present invention further relates devices, systems and methods for limiting and/or preventing the spread of infectious disease and viruses. The present invention further relates to devices, systems and methods for limiting and/or preventing habitual face touching. The present invention further relates devices, systems and methods for limiting and/or preventing unhealthy habits. In particular, the present invention relates to wearable devices for any one or more of determining face touching, indicating face touching and limiting and/or preventing the spread of infectious disease and viruses.

2. BACKGROUND TO THE INVENTION

Infectious disease and infections in general can spread quickly and easily between people. Spread may occur directly as a result of an uninfected person coming into close contact with an infected person. It may also occur indirectly when an uninfected person comes into contact with a contaminated surface or object.

Infectious disease and infections can spread through direct or close contact (e.g. within 1 metre) with infected people via mucus secretions. Coughing, sneezing, and speaking can all spread infectious traces or droplets of these secretions. Diseases can also spread indirectly via contaminated surfaces or objects which include infectious traces or droplets. A person may become infected if these droplets enter his/her mucous membranes, including his/her mouth, nose, eyes or ears. Infectious disease agents can also spread from faces to surfaces and materials that are handled by people. One example is transfer of bacteria from the skin and openings of the face onto food being prepared under clean conditions.

One example of an infectious disease is COVID-19, caused by the SARS-CoV-2 virus. The spread of COVID-19 has resulted in a global pandemic. The pandemic has caused significant social and economic damage across the world, and resulted in a high number of deaths.

Social distancing, frequent hand-washing, regular cleaning of shared surfaces, and use of face masks are some of the preventive measures in use and recommended around the world to limit or prevent the spread of infectious disease and infections in general.

It has become critical to improve prevention measures and devise other effective ways of limiting and preventing the spread of infectious disease and infections.

A person may become infected, e.g. contract COVID-19, through hand-to-face contact. If not cleaned or sanitised properly, a contaminated surface or the hands of a person who is infected is likely to remain contaminated for an extended period of time. The infected person may spread the infection by touching other surfaces with their contaminated hand(s). Other uninfected persons who then touch the contaminated hand or surface may become infected through hand-to-face contact. Consequently, hand-to-face contact may result in infection of the person touching their face, or of spread of an infection from a person touching their face.

Studies show that an average person touches his/her face with their hands between 15 to 30 times per hour. It is typically an involuntary action, nervous habit and/or other face touching habit that may be developed by some people. Examples of these habits include biting fingernails, nose-picking, pulling hair, scratching, repetitively touching, pulling or picking parts of the face and head. These involuntary actions and habits can be unwanted and/or have undesirable consequences that range from a mild to severe nuisance to spreading disease and infections when a person touches his/her eyes, nose, mouth and ears with contaminated hands.

Therefore, the inventors have identified a need to effectively limit and/or prevent people from touching their face to reduce/prevent such actions and habits and as a result reduce/prevent the transmission of contagions also known as fomites, such as bacteria (e.g. pathogenic *E coli*, *Salmonella*, staph *aureus*), fungi, and viruses including the virus causing COVID-19, other coronaviruses, adenoviruses, hand foot and mouth disease, influenza, noroviruses, rhinoviruses and rotaviruses. Habitual activities which involve repetitive hand movements towards the face, such as smoking, excessive drinking and/or eating may be considered unhealthy and have undesirable consequences. The inventors have therefore identified a need to effectively control, limit and/or prevent people from performing these activities.

The action of bringing a person's hand towards the face, and/or touching the face requires certain movements or positions of parts of the body. Therefore, the identification of these movements/positions may be indicative of facial touching. If the movements/positions are effectively identified, a person may then be warned that they are about to touch their face. This may cause the person to stop the movement or change positions to avoid touching their face. This may also cause the person to be made aware of, address and/or alter undesirable face touching habits or other unhealthy habits like smoking.

Face touching warning devices and systems are known in the art. Some of these are configured to identify movement/positions of parts of the body which are indicative of facial touching. For example, face touching requires acute flexion of the elbow and these devices are configured to identify movement/position related to elbow flexion.

One problem with the prior art devices and systems is that they are bulky and obtrusive. This results in reduced usage and appeal to users. This is compounded by the fact that many of the known devices and systems are not aesthetically pleasing.

Another problem is that they include complex configurations which are not user-friendly and are expensive to manufacture. This consequently increases the price of the product.

Furthermore, none of the known devices and systems have been commercially successful and are readily available to the public. This may be indicative that the existing devices and systems do not work effectively and efficiently.

Another problem with the known devices and systems is that they lack accuracy in determining face touching. This can result in false positives or false negatives. As well as rendering the devices less effective, this deters users from using them.

It is an object of aspects of the technology to provide a wearable device for limiting and/or preventing face touching to overcome or ameliorate problems with existing devices and systems. Alternatively, it is an object to provide an improved device, system and/or method for limiting and/or preventing face touching. Alternatively, it is an object to at least provide the public with a useful choice.

3. SUMMARY OF THE INVENTION

According to certain aspects of the technology, there is provided a wearable device for determining one or more of potential, imminent and actual touching of a user's face by the user's hand. According to certain aspects, there is provided a system comprising the wearable device.

In certain forms the wearable device may comprise two sensors. The sensors may be configured to sense parameters indicative of the position and/or orientation of the user's arm, or part of the user's arm. A first sensor may be configured to generate a first sensor signal indicative of an angle between the user's forearm and the user's upper arm. A second sensor may be configured to generate a second sensor signal indicative of an orientation of the user's forearm with respect to a reference, for example a fixed reference such as gravity. The sensor signals may be sent to a processor for determining whether the user's arm position is indicative of potential, imminent and actual face touching of the user's face by the user's hand. The processor may be comprised as part of the wearable device, or the processor may comprised as part of the system separate to the wearable device, for example remote from the wearable device. The wearable device and/or system may comprise an output device for indicating that the user's arm position is indicative of potential, imminent and actual face touching of the user's face by the user's hand.

According to one form of the technology there is provided a wearable device for use in a system for determining one or more of potential, imminent and actual touching of a user's face by the user's hand. The wearable device may comprise a body portion configured to be worn on the user's arm. The body portion may be configured to be mounted on the user's elbow region. The wearable device may comprise a first sensor mounted on the body portion. The first sensor may be configured to generate a first sensor signal indicative of an angle between the user's forearm and the user's upper arm. The wearable device may comprise a second sensor mounted on the body portion. The second sensor may be configured to generate a second sensor signal indicative of an orientation of the user's forearm with respect to gravity. The first sensor and the second sensor may be configured to respectively send the first sensor signal and the second sensor signal to a processor. The processor may be configured to determine one or more of potential, imminent and actual face touching of the user's face by the user's hand from the first sensor signal and the second sensor signal.

According to one form of the technology there is provided a wearable device for use in a system for determining one or more of potential, imminent and actual touching of a user's face by the user's hand. The wearable device may comprise a body portion configured to be worn on a user's arm. The wearable device may comprise a sensor unit mounted on the body portion. The sensor unit may comprise a housing. The sensor unit may comprise a first sensor configured to generate a first sensor signal indicative of an angle between the user's forearm and the user's upper arm. The sensor unit may comprise a second sensor configured to generate a second sensor signal indicative of an orientation of the user's forearm with respect to gravity. The first sensor and the second sensor may be housed in the housing. The first sensor and the second sensor may be configured to respectively send the first sensor signal and the second sensor signal to a processor. The processor may be configured to determine one or more of potential, imminent and actual face touching of the user's face by the user's hand from the first sensor signal and the second sensor signal.

In examples, the first sensor may be a proximity sensor and the first sensor signal may be indicative of a relative distance between a part of the user's forearm arm and a part of the user's upper arm.

In examples, the first sensor may be mounted on the body portion so that, when worn, the first sensor is located on the user's forearm or upper arm. The wearable device may further comprise a sensed member mounted on the body portion so that, when worn, the sensed member is located on the other of the user's forearm or upper arm. The first sensor may be configured to sense the distance of the sensed member from the first sensor.

In examples, the first sensor may be a magnetometer and the sensed member may be a magnet. The magnetometer may be configured to separately measure magnetic field strength in a plurality of directions. The magnetometer may be configured to measure a direction of a sensed magnetic field.

In examples, the second sensor signal may be indicative of an angle of the user's forearm relative to vertical. Additionally or alternatively, the second sensor signal may be indicative of an amount of internal/external rotation of the arm.

In examples, the second sensor may be an accelerometer. The accelerometer may be configured to separately measure acceleration in a plurality of directions.

In examples, the wearable device may comprise the processor, the processor being mounted on the body portion.

In examples, the wearable device may comprise an output device for indicating that potential, imminent and actual touching of a user's face by the user's hand has been determined.

In examples, the body portion may comprise a sleeve. The sleeve may comprise a first section configured, when worn, to be located above the user's elbow and a second section configured, when worn, to be located below the user's elbow.

According to one form of the technology there is provided a wearable device for use in a system for determining one or more of potential, imminent and actual touching of a user's face by the user's hand. The wearable device may comprise a body portion configured to be worn on the user's arm. The wearable device may comprise a first sensor mounted on the body portion. The first sensor may be configured to generate a first sensor signal indicative of an angle between the user's forearm and the user's upper arm. The wearable device may comprise a gyroscope mounted on the body portion. The gyroscope may be configured to generate a gyroscope signal indicative of an orientation of the user's forearm with respect to a reference. The first sensor and the gyroscope may be configured to respectively send the first sensor signal and the gyroscope signal to a processor. The processor may be configured to determine one or more of potential, imminent and actual face touching of the user's face by the user's hand from the first sensor signal and the gyroscope signal.

According to one form of the technology there is provided a system for determining one or more of potential, imminent and actual touching of a user's face by the user's hand. The system may comprise the wearable device according to any one of the other forms or aspects of the technology. The system may comprise a processor configured to receive and process the sensor signals and determine one or more of potential, imminent and actual face touching of the user's face by the user's hand from the sensor signals.

According to one form of the technology there is provided a system for determining one or more of potential, imminent and actual touching of a user's face by the user's hand. The system may comprise a wearable device. The system may comprise a processor. The wearable device may comprise a body portion configured to be worn on the user's arm. The wearable device may comprise a first sensor mounted on the body portion. The first sensor may be configured to generate a first sensor signal indicative of an angle between the user's forearm and the user's upper arm, and to send the first sensor signal to the processor. The wearable device may comprise a second sensor mounted on the body portion. The second sensor may be configured to generate second sensor signals indicative of an orientation of the user's forearm with respect to gravity, and to send the second sensor signals to the processor. The second sensor signals may be indicative of an angle of the user's forearm relative to vertical, and an amount of internal/external rotation of the arm. The processor may be configured to receive the signals. The processor may be configured to calculate from the signals a plurality of values indicative of the position and/or orientation of the user's forearm. The processor may be configured to determine one or more potential, imminent and actual face touching of the user's face by the user's hand by comparing each of the values to one or more predetermined thresholds.

In examples, the second sensor signal may be indicative of an angle of the user's forearm relative to vertical. Additionally or alternatively, the second sensor signal may be indicative of an amount of internal/external rotation of the arm.

According to one form of the technology there is provided a system for determining one or more of potential, imminent and actual touching of a user's face by the user's hand. The system may comprise a wearable device. The system may comprise a processor. The wearable device may comprise a body portion configured to be worn on a user's arm. The wearable device may comprise a magnetometer mounted on the body portion. The wearable device may comprise a magnet mounted on the body portion. The magnetometer and the magnet may be mounted on the body portion so that, when worn, one of the magnetometer and the magnet is located above the user's elbow and the other one of the magnetometer and the magnet is located below the user's elbow. The magnetometer may be configured to measure a magnetic field strength of the magnet in each of a plurality of directions. The magnetometer may be configured to send a signal indicative of the measured magnetic field strengths to the processor. The processor may be configured to receive the signal. The processor may be configured to calculate one or more adjusted magnetic field strength values from the measured magnetic field strengths in one or more of the plurality of directions. The processor may be configured to calculate an adjusted magnetic field strength using the adjusted magnetic field strength values. The processor may be configured to determine one or more of potential, imminent and actual face touching of the user's face by the user's hand from the adjusted magnetic field strength.

According to one form of the technology there is provided a system for determining one or more of potential, imminent and actual touching of a user's face by the user's hand. The system may comprise a wearable device. The system may comprise a processor. The wearable device may comprise a body portion configured to be worn on the user's arm. The wearable device may comprise a plurality of sensors mounted on the body portion. The sensors may each be configured to generate a signal representing a plurality of parameters indicative of a position and/or orientation of the user's arm and to send the signal to the processor. The processor may be configured to receive the signals. The processor may be configured to calculate from the signals a plurality of values indicative of the position and/or orientation of the user's arm. The processor may be configured to determine one or more potential, imminent and actual face touching of the user's face by the user's hand by comparing each of the values to one or more predetermined thresholds. The predetermined threshold(s) of at least one of the values may be dependent on another one or more of the values or one or more of the plurality of parameters.

In examples, the second sensor signal may be indicative of an angle of the user's forearm relative to vertical. Additionally or alternatively, the second sensor signal may be indicative of an amount of internal/external rotation of the arm.

In examples, the first sensor may be a proximity sensor and the first sensor signal may be indicative of a relative distance between a part of the user's forearm arm and a part of the user's upper arm.

In examples, the first sensor may be mounted on the body portion so that, when worn, the first sensor is located on the user's forearm or upper arm. The wearable device may further comprise a sensed member mounted on the body portion so that, when worn, the sensed member is located on the other of the user's forearm or upper arm. The first sensor may be configured to sense the distance of the sensed member from the first sensor.

In examples, the first sensor may be a magnetometer and the sensed member is a magnet. The magnetometer may be configured to separately measure magnetic field strength in a plurality of directions. The magnetometer may be configured to measure a direction of a sensed magnetic field.

In examples, the second sensor may be an accelerometer. The accelerometer may be configured to separately measure acceleration in a plurality of directions.

In examples, the system may comprise an output device for indicating that potential, imminent and actual touching of a user's face by the user's hand has been determined. The output device may be mounted on the body portion.

In examples, the body portion may comprise a sleeve. The sleeve may comprise a first section configured, when worn, to be located above the user's elbow and a second section configured, when worn, to be located below the user's elbow. As mentioned earlier, the device could be worn on either arm so this refers to one, or both, elbows of the body.

According to one form of the technology there is provided a processor-implemented method of determining one or more of potential, imminent and actual touching of a user's face by the user's hand. The method may be performed by a processor comprised as part of the system according to any other aspect or form of the technology. The processor-implemented method may comprise receiving the sensor signals from the respective sensor(s). The processor-implemented method may comprise analysing the sensor signals. The processor-implemented method may comprise determining one or more of potential, imminent and actual face touching of the user's face by the user's hand based on the step of analysing.

According to one form of the technology there is provided a processor-readable memory storage apparatus having processor-executable instructions encoded thereon which, when executed by a processor, cause the processor to perform the method of determining one or more of potential, imminent and actual face touching of the user's face by the user's hand according to a method of any of the other aspects or forms of the technology.

According to one aspect of the technology there is provided a wearable device for determining one or more of potential, imminent and actual face touching, the wearable device comprising:

a body portion configured to be worn on a user's arm; and
one or more sensors mounted on the body portion, the sensor(s) configured to detect an arm event and generate one or more sensor signals indicative of the arm event,
wherein the sensor(s) are configured to communicate in use with a processor configured to receive and process the sensor signal(s), wherein the processor is configured to determine whether the arm event is indicative of one or more of potential, imminent and actual face touching.

In examples:

The body portion may be configured to be mounted proximate the user's elbow.

The body portion may comprise a sleeve.

The sleeve may be formed from a relatively soft, flexible material.

The body portion may comprise a plurality of sections.

The body portion may comprise a first section and a second section.

The first section may be configured to be in use located at least partially above the user's elbow.

The second section may be configured to be in use located at least partially below the user's elbow.

The first and second section may be integrally formed.

The first and second sections may be attached to each other.

In examples:

The sensor(s) may be configured to detect an orientation and/or a relative position of at least a part the user's arm.

The sensor signal(s) may be indicative of the orientation and/or the relative position of the part(s) of the user's arm.

The wearable device may comprise a sensor unit comprising the sensor(s).

The sensor unit may be mounted to the second section.

The sensor(s) may comprise a position sensor.

The position sensor may be mounted to the second section.

The position sensor may be configured to measure one or more parameters indicative of the relative position of the part(s) of the user's arm, for example the position of a first part of the user's arm relative to a second part of the user's arm.

The parameter(s) may be indicative of an angle at the user's elbow.

The wearable device may be configured so that, in use, the position sensor is located on the user's forearm, preferably proximate the user's elbow.

The wearable device may comprise a magnet.

The magnet may be located on the user's upper arm, preferably proximate the user's elbow. For example, the magnet may be mounted to the first section.

The position sensor may be configured to measure a magnetic field strength of the magnet in one or more directions, for example in three directions along each of three mutually perpendicular axes (e.g. an X-axis, a Y-axis and a Z-axis). Additionally, or alternatively, the position sensor may be configured to measure a direction of the magnetic field generated by the magnet, for example the angle(s) of the magnetic field relative to one or more directions. For example, the position sensor may comprise a magnetometer.

The sensor signal(s) may be indicative of the parameter(s) measured by the position sensor.

The sensor(s) may comprise an orientation sensor.

The orientation sensor may be mounted to the second section.

The orientation sensor may be configured to measure one or more parameter(s) indicative of the orientation of the part(s) of the user's arm, for example the orientation of the user's forearm.

The wearable device may be configured so that, in use, the orientation sensor is located on the user's forearm, preferably proximate the user's elbow.

The orientation sensor may be configured to measure acceleration of the orientation sensor in one or more directions, for example in three directions along each of three mutually perpendicular axes (e.g. an X-axis, a Y-axis and a Z-axis). For example, the orientation sensor may comprise an accelerometer.

The sensor signals may be indicative of the parameter(s) measured by the orientation sensor.

The wearable device may comprise a plurality of sensors. For example, the sensors may comprise one or more position sensors and one or more orientation sensors.

In examples:

The wearable device may comprise the processor.

The sensor unit may comprise the processor.

Alternatively, the processor may be located remote to the wearable device.

The processor may be configured to calculate one or more values indicative of the relative position of the part(s) of the user's arm using the parameter(s) measured by the position sensor.

The value(s) may be indicative of the position of the first part of the user's arm relative to the second part of the user's arm.

The value(s) may be indicative of the angle at the user's elbow.

The processor may be configured to calculate one or more magnetic field strengths and/or directions from the parameters measured by the position sensor, for example a magnetic field strength component along each of the three directions and/or an overall magnitude of magnetic field strength and/or one or more angles of the magnetic field relative to one or more directions.

The processor may be configured to calculate an adjusted magnetic field strength using adjusted magnetic field strength values in two of the three axes.

The adjusted magnetic field strength and/or the one or more angles of the magnetic field may be the value(s) indicative of the angle of the user's elbow.

The processor may be configured to calculate an adjusted magnetic field strength by applying a gain to the magnetic field strength component measured in one or more directions.

The processor may be configured to calculate one or more values indicative of the orientation of the part(s) of the user's arm using the parameter(s) measured by the orientation sensor.

The value(s) may be indicative of the orientation of the user's forearm.

A first value may be indicative of the orientation of the user's forearm when viewed from a viewpoint that is perpendicular to the frontal plane of the user when the user is in an upright position.

A second value may be indicative of the orientation of the user's forearm when viewed from a viewpoint that is perpendicular to the sagittal plane of the user when the user is in an upright position.

The processor may be configured to calculate an acceleration vector using the acceleration measured by the orientation sensor in each of the three directions.

The processor may be configured to calculate the orientation of the orientation sensor relative to the earth's gravitational field using the acceleration vector.

The processor may be configured to determine the arm event is indicative of potential, imminent and/or actual face touching by comparing the value(s) indicative of the relative position of the part(s) the user's arm and/or the value(s) indicative of the orientation of the part(s) of the user's arm to one or more predetermined thresholds.

The predetermined threshold(s) may comprise one or more minimum thresholds and one or more maximum thresholds.

The processor may be configured to determine the arm event is indicative of potential, imminent and/or actual face touching when the value(s) indicative of the relative position of the part(s) of the user's arm pass(es) the predetermined threshold(s).

The processor may be configured to determine the arm event is indicative of potential, imminent and/or actual face touching when the value(s) indicative of the orientation of the part(s) of the user's arm pass(es) the predetermined threshold(s). For example, when the first value passes the predetermined threshold(s) and/or the second value passes the predetermined threshold(s).

The predetermined thresholds for the first value may include a minimum threshold angle of −10° and a maximum threshold angle of 54° from the vertical when viewed from a viewpoint that is perpendicular to the frontal plane of the user when the user is in an upright position.

The predetermined thresholds for the second value may include a minimum threshold angle of −30° and a maximum threshold angle of 15° from the vertical when viewed from a viewpoint that is perpendicular to the sagittal plane of the user when the user is in an upright position.

The predetermined threshold(s) of one of the values calculated by the processor using the parameter(s) measured by one of the sensors may be a function of the parameter(s) measured by another one of the sensors and/or a function of the value(s) calculated using the parameter(s) measured by another one of the sensors.

The processor may be configured to process the sensor signal(s) and to determine whether the arm event is indicative of potential, imminent and/or actual face touching by execution of an algorithm.

The algorithm may comprise a set of instructions configured to cause the processor to:
(a) receive the sensor signal(s);
(b) calculate the value(s) indicative of the relative position and/or orientation of the part(s) of the user's arm; and
(c) determine the arm event is indicative of potential, imminent and/or actual face touching by comparing the value(s) indicative of the relative position of the part(s) of the user's arm and/or the value(s) indicative of the orientation of the part(s) of the user's arm to the predetermined threshold(s).

In examples:

The processor may be configured to provide an output indicative of potential, imminent and/or actual face touching.

The processor may be configured to generate one or more output signals related to the arm event indicative of potential, imminent and/or actual face touching.

The processor may be configured to be in use in communication with an output device for indicating potential, imminent and/or actual face touching.

The output device may be configured to receive the one or more output signals.

The wearable device may comprise the output device.

The output device may be located remote to the sensor(s).

The output device may be configured to generate a warning.

The output device may comprise an alarm to generate the warning.

The alarm may be configured to generate a vibration or other haptic feedback.

According to one aspect of the technology there is provided a system for determining one or more of potential, imminent and actual face touching, the system comprising:
one or more sensors located in use on a user's arm, the sensor(s) configured to detect an arm event and generate one or more sensor signals indicative of the arm event; and
a processor configured to receive and process the sensor signal(s) and determine whether the arm event is indicative of one or more of potential, imminent and actual face touching.

In an example the system may comprise the wearable device according to any one or more of the previously described aspects and/or examples of the technology.

According to yet another aspect of the technology there is provided a processor-implemented method of determining one or more of potential, imminent and actual face touching, the processor-implemented method comprising the steps of:
(a) receiving one or more sensor signal(s) indicative of an arm event from one or more sensors located in use on a user's arm, wherein the sensor(s) are configured to detect an arm event and generate the sensor signal(s) in response;
(b) analysing the sensor signal(s); and
(c) determining whether the arm event is indicative of one or more of potential, imminent and actual face touching based on the step of analysing.

In examples, the method is performed by a processor comprised as part of the system and/or the wearable device according to any one or more of the previously described aspects and/or examples of the invention.

In examples, step (b) may comprise calculating the value(s) indicative of the relative position and/or orientation of the part(s) of the user's arm.

In examples, step (c) may comprise determining the arm event is indicative of potential, imminent and/or actual face touching by comparing the value(s) indicative of the relative position of the part(s) of the user's arm and/or the value(s) indicative of the orientation of the part(s) of the user's arm to one or more predetermined thresholds.

In examples:

The method may comprise the step of providing an output indicative of potential, imminent and/or actual face touching.

The method may comprise the step of generating one or more output signals.

The method may comprise the step of transmitting the one or more output signals to an output device for indicating potential, imminent and/or actual face touching. For example, the output device may be the output device described above.

The step of providing the output indicative of potential, imminent and/or actual face touching may comprise generating a warning. For example, the output device comprises an alarm which generates the warning.

According to yet another aspect of the technology there is provided a processor-readable memory storage apparatus having processor-executable instructions encoded thereon which, when executed by a processor, cause the processor to perform a method of determining one or more of potential, imminent and actual face touching according to any one or more of the previously described aspects and/or examples of the technology.

According to another aspect of the technology, there is provided a method to detect the act of face touching by a wearable device on the arm, the method comprising:
- a lever system switch and an angle sensing module, capable of detecting the act of face touching by detecting the motion of elbow bending and arm elevation;
- a circuit design capable of producing a stimulus when the act of face touching is detected, that comprises: a power module, a power storage module, a stimulus module and an on/off switch; and
- a wearable device which acts as a housing unit for the lever system switch, angle sensing module, stimulus module, power module, power storage module and an on/off switch.

According to another aspect of the technology, there is provided a wearable arm device comprising:
- a lever system, preferably a lever microswitch capable of detecting the bending of the elbow;
- a circuit design capable of producing a stimulus when the act of bending the elbow is detected, that comprises: a tilt switch, a power module, a power storage module, a stimulus module and an on/off switch.

According to another aspect of the technology, there is provided a wearable arm device comprising:
- an angle sensing module, preferably a tilt switch capable of detecting the elevation of the arm;
- a circuit design capable of producing a stimulus when the act of elevation of the arm is detected, that comprises: a lever microswitch, a power module, a power storage module, a stimulus module and an on/off switch.

According to another aspect of the technology, there is provided a wearable arm device comprising:
- a stimulus module capable of producing a stimulus when the bending of the elbow and elevation of the arm is detected, the stimulus module comprising:
  - a circuit design capable of detecting the bending of the elbow and elevation of the arm, the circuit design comprising: a lever microswitch, tilt switch, a power module, a power storage module and an on/off switch.

According to another aspect of the technology, there is provided a wearable arm device comprising:
- a lever system, preferably a micro lever switch and an angle sensing module, preferably tilt switch, capable of detecting the act of face touching by the hand, wherein the act of face touching by the hand is derived from the combination of elbow bending and arm elevation;
- a circuit design capable of producing a stimulus when the act of face touching is detected, that comprises: a power module, a power storage module, a stimulus module and an on/off switch.

In one example, the device is a wearable device wore at a short distance above the main creases of the cubital fossa. The distance may be between 3 mm to 50 mm above the main creases of the cubital fossa.

In examples, the height of the lever microswitch from the horizontal axis of the device may be short.

For example, the height may be between 8 mm to 20 mm.

In examples, the lever system switch may be a lever microswitch which consist of a COM, NO and NC terminal. The lever microswitch may turn on the circuit when its lever is pushed down when the user bends the elbow.

In examples, the angle sensing module may be a tilt switch. The tilt switch may be activated when the angle of the of the elevation of the arm is greater than 1° against the direction of the gravity.

In examples, angle of the tilt switch from the horizontal axis of the device may be an acute angle. For example, the tilt switch may be positioned at an angle between 60° to 89° in relation to the horizontal axis of the device housing.

In examples, a positive signal input from the lever system switch and angle sensing module may detect the act of face touching in an accurate and specific manner.

In examples, the act of face touching may activate the device to emit a stimulus.

In examples, the stimulus may be of sound, light or vibration.

In examples, the device may be activated by the bending of the elbow and elevation of the arm. The device may be deactivated when the user straightens the elbow or depresses the arm.

In examples, the stimulus may stop after a short period of time. For example, the duration of stimulus may be between 0.1 second to 3 seconds. The stimulus may stop even if the user continues to bend the elbow and elevate the arm for more than 3 seconds.

In examples, all of the components of the device may be arranged in one housing unit.

According to another aspect of the technology, there is provided a method of preventing the act of face touching and to overcome the bad habit of face touching. The method may comprise performing the steps:
- a user wearing the wearable device of any of the other aspects of the technology on one or both arms;
- the user trying to touch the face by bending the elbow and elevating the arm;
- the act of bending the elbow and elevating the arm triggering the device to produce a stimulus;
- the stimulus alerting the user;
- the user aborting the act of face touching by straightening the elbow and/or depressing the arm;
- the stimulus stopping after a short period of time or after the act of face touching has been aborted; and
- the device being ready to detect the next act of face touching.

Further aspects of the invention, which should be considered in all its novel aspects, will become apparent to those skilled in the art upon reading of the following description which provides at least one example of a practical application of the invention.

4. BRIEF DESCRIPTION OF THE DRAWINGS

The invention shall now be described by way of reference to the following non-limiting drawings, in which.

Figure 24:
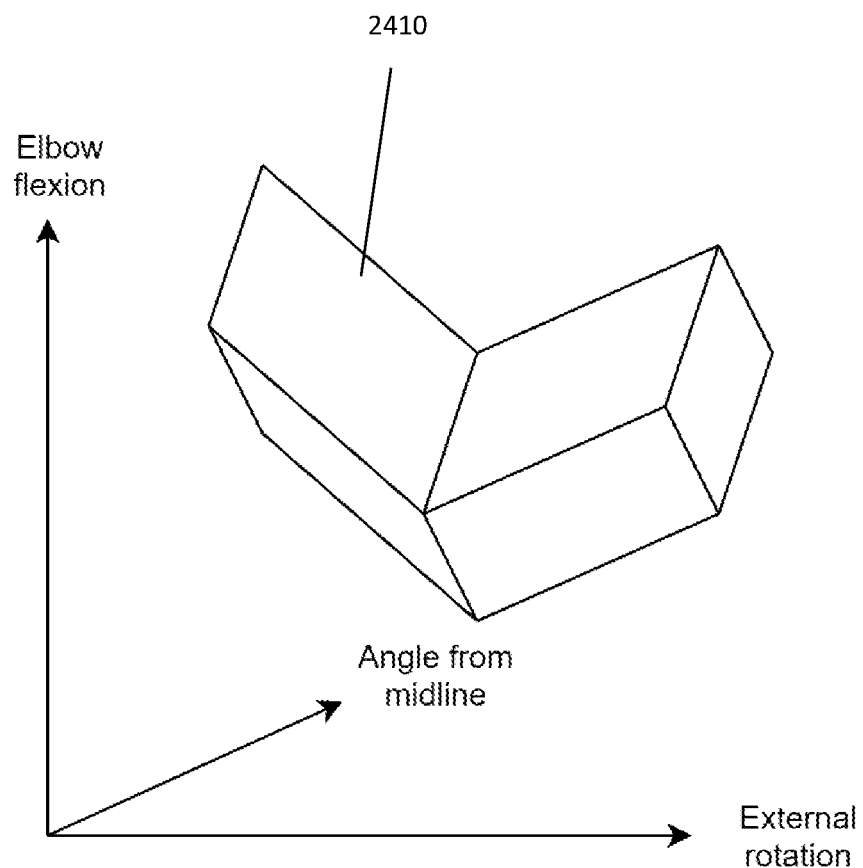
Figure 25:
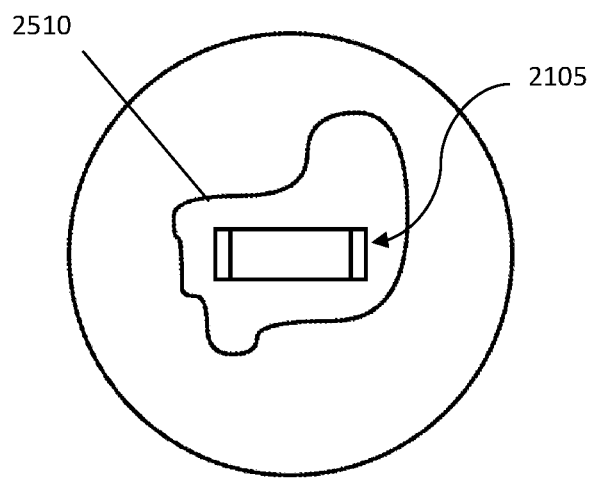
Figure 26:
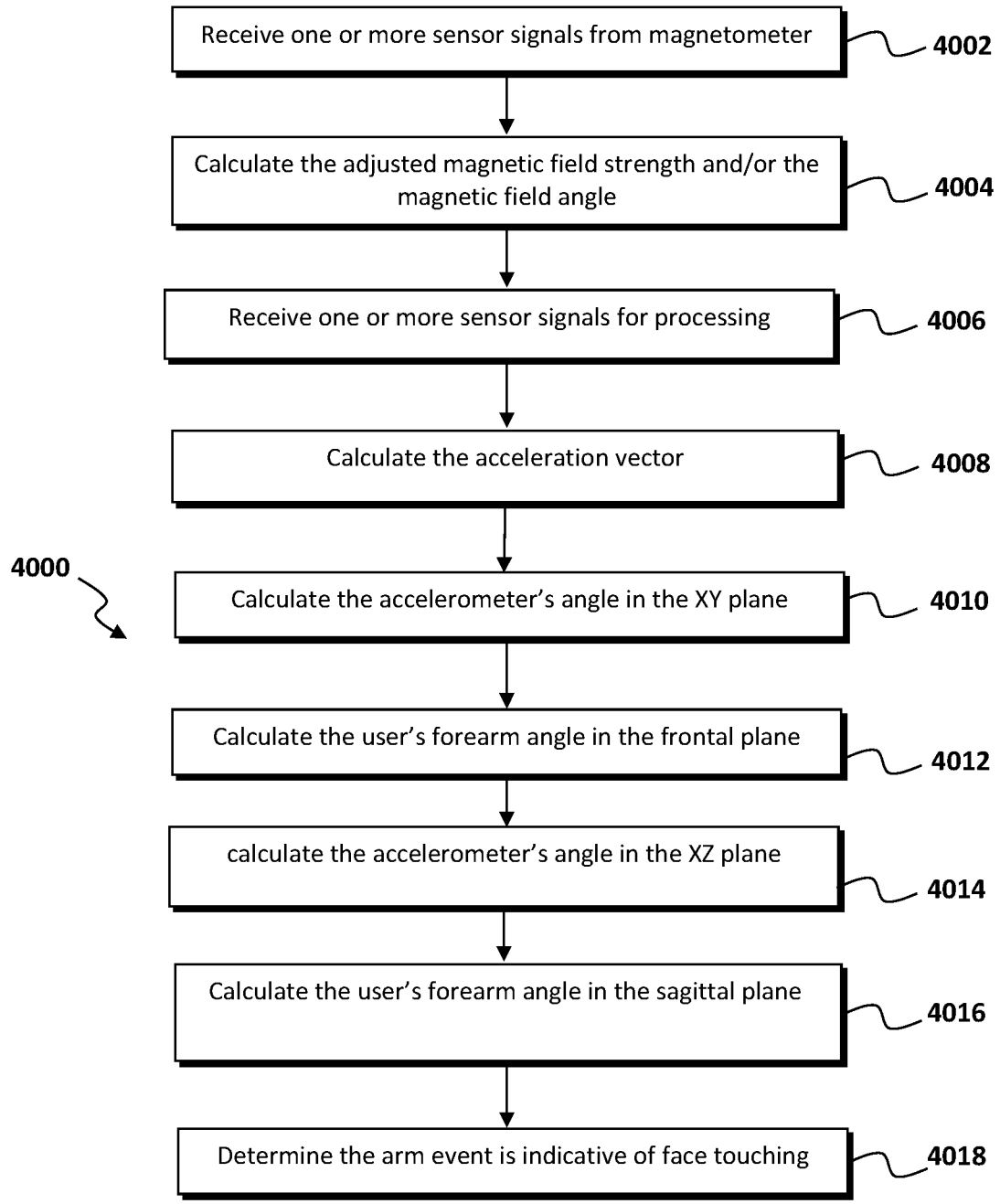
Figure 27:
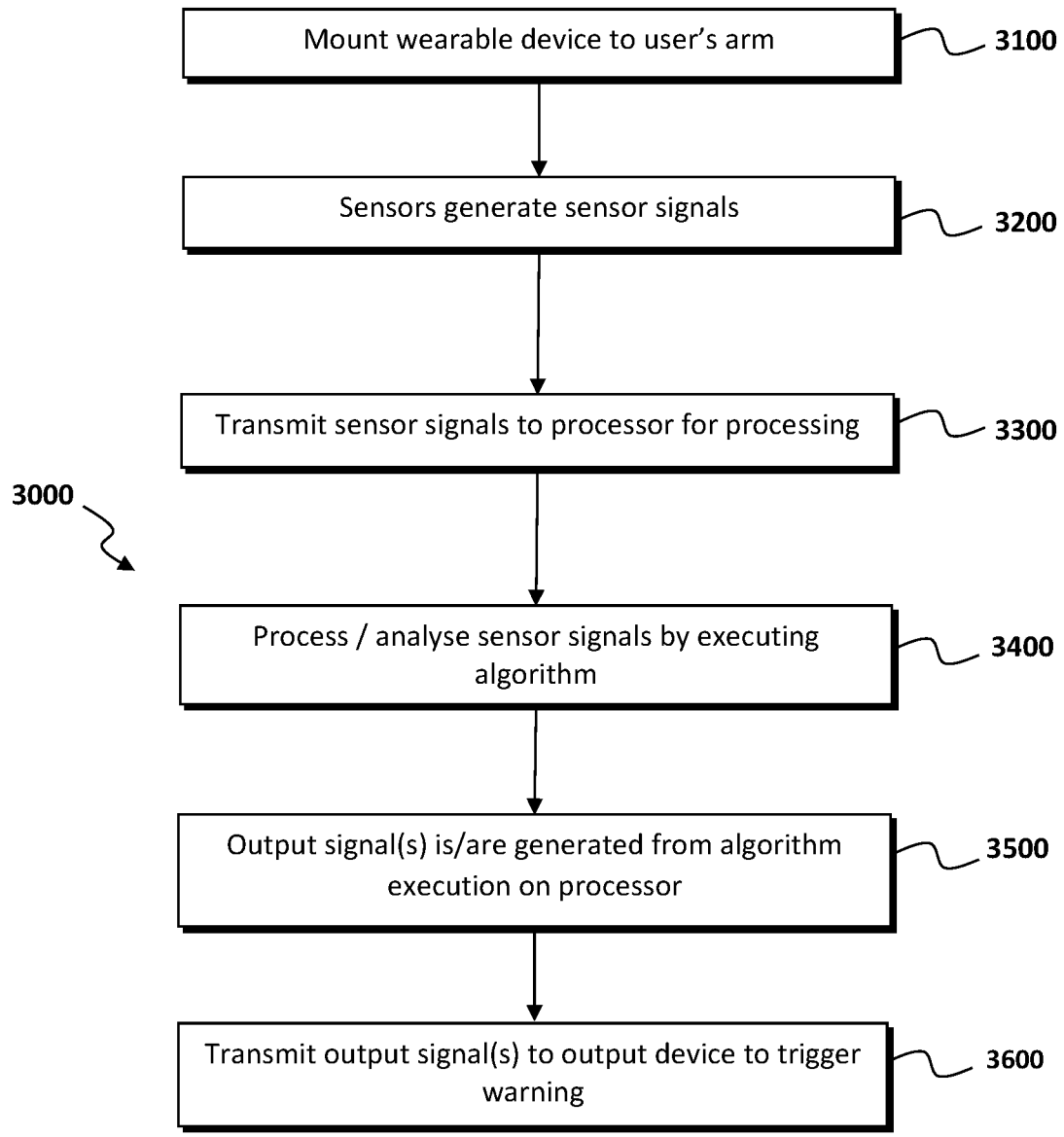
Figure 28:
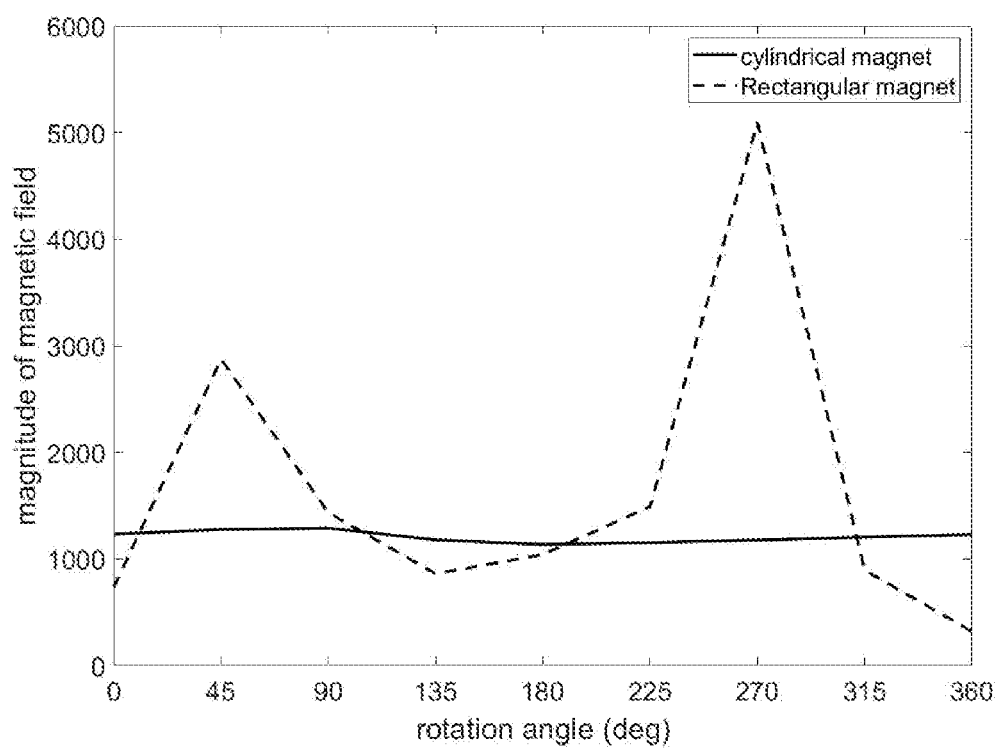
Figure 29:
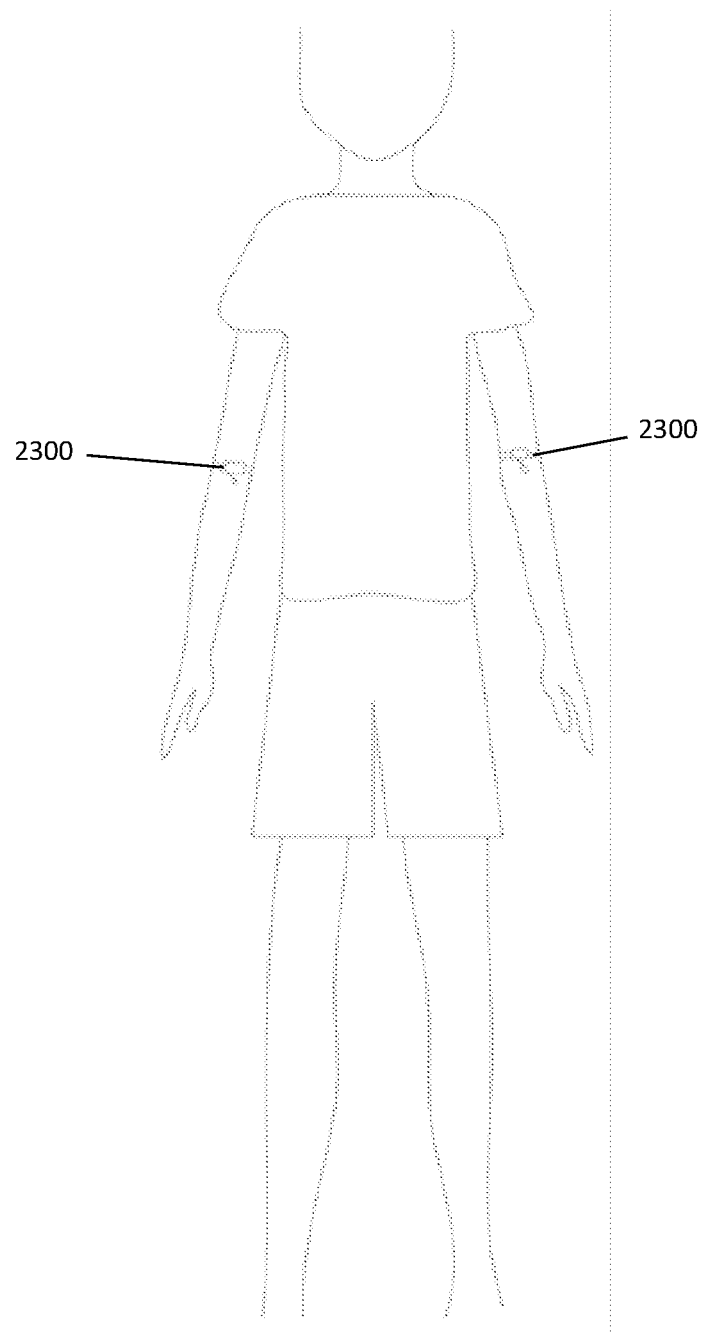
Figure 30:
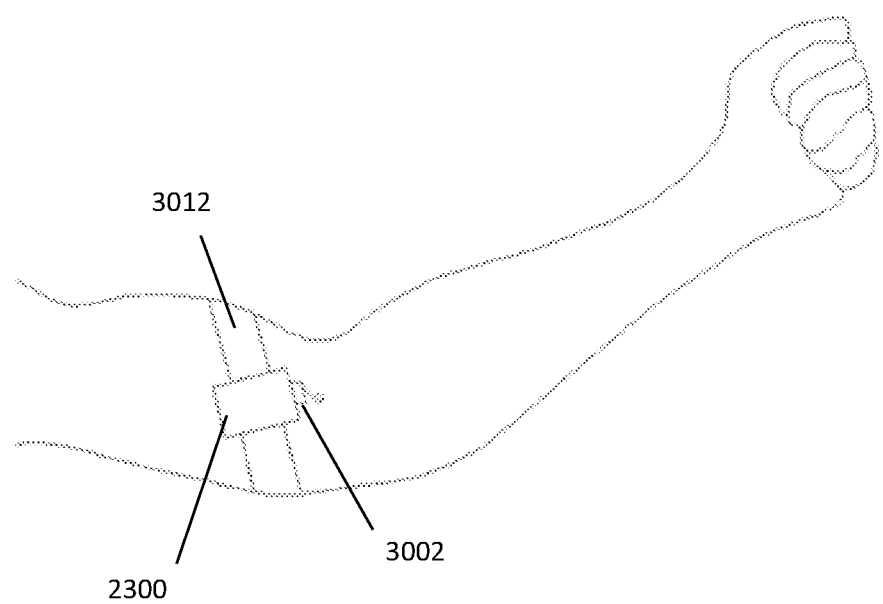
Figure 31:
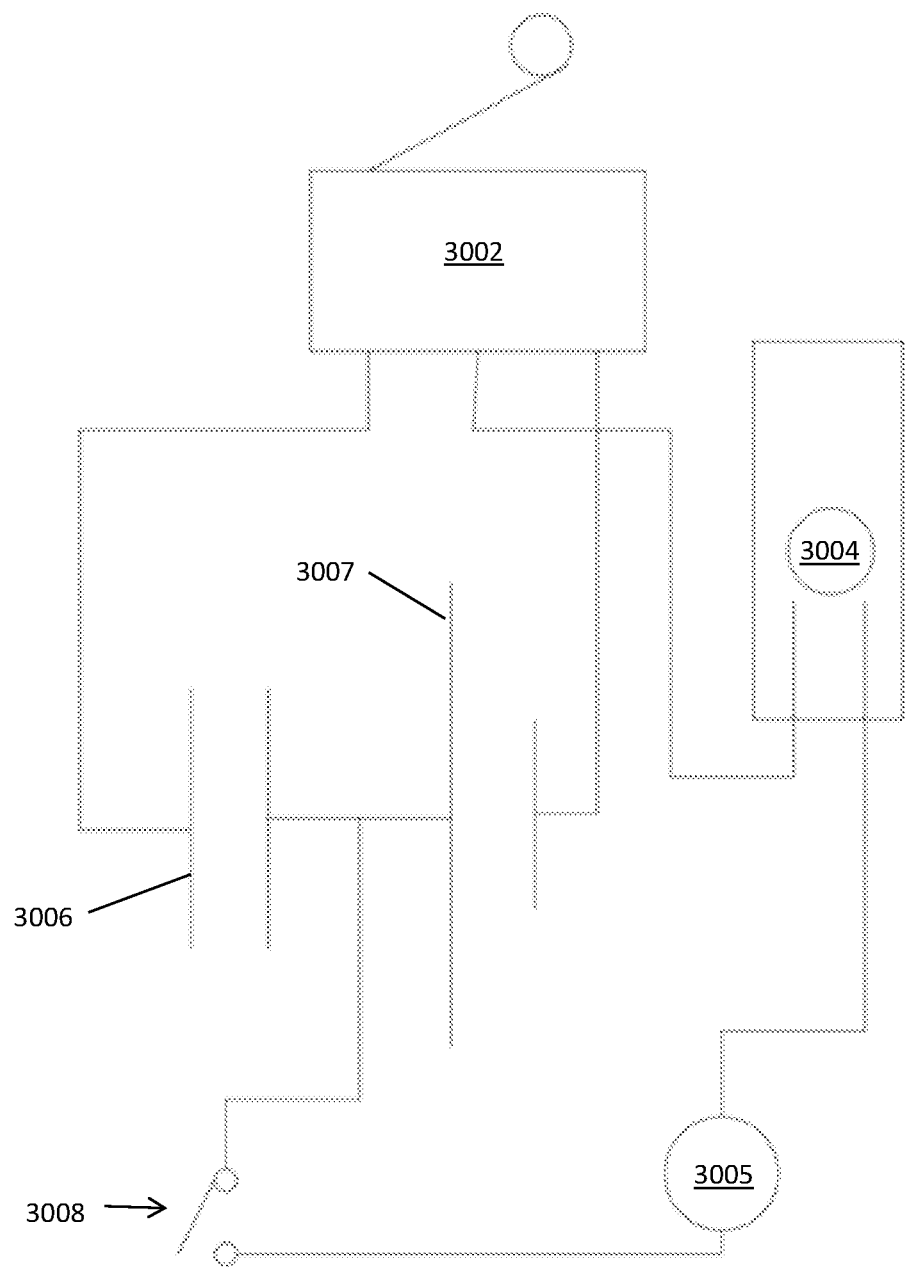
Figure 32:
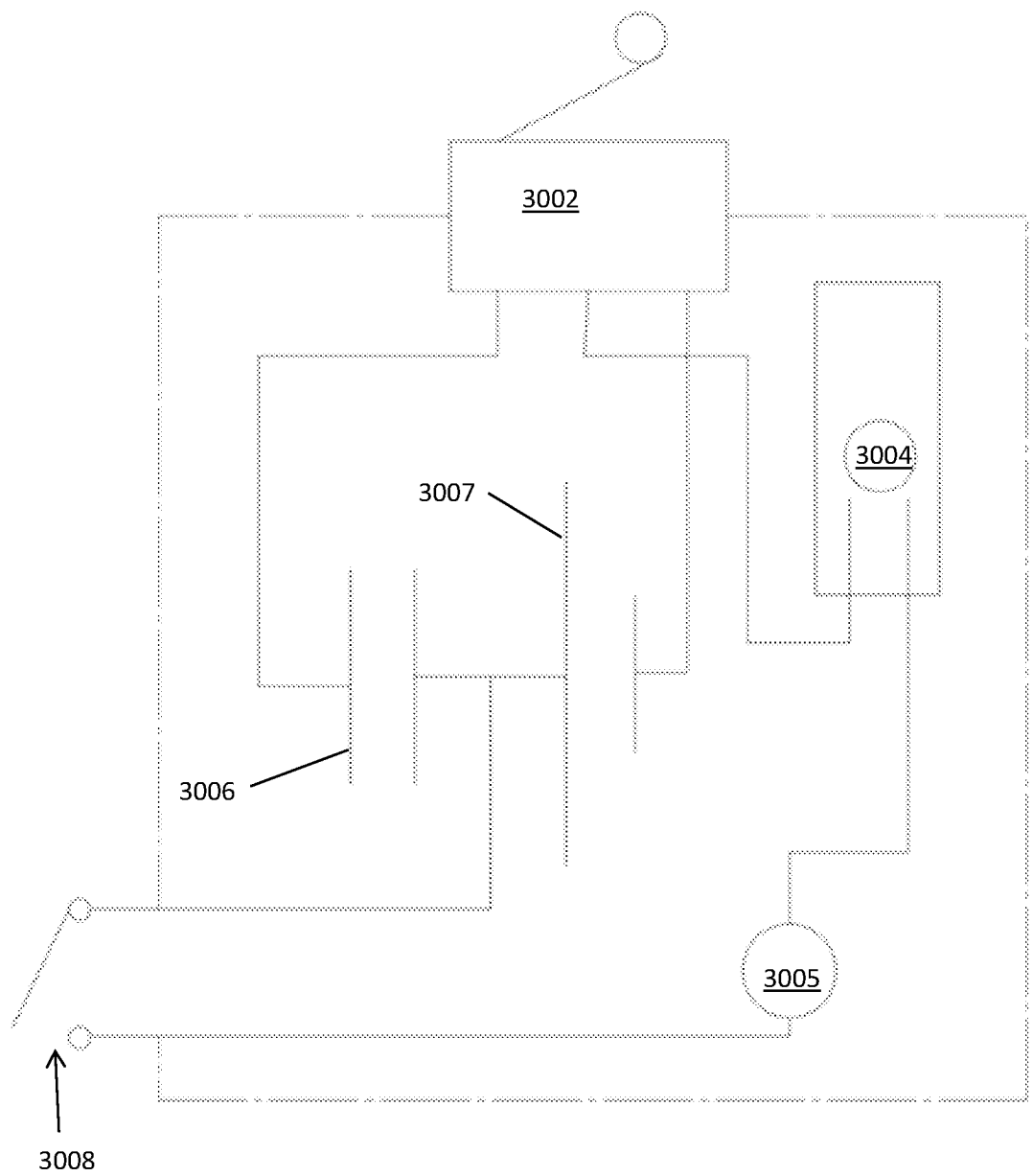
Figure 33:
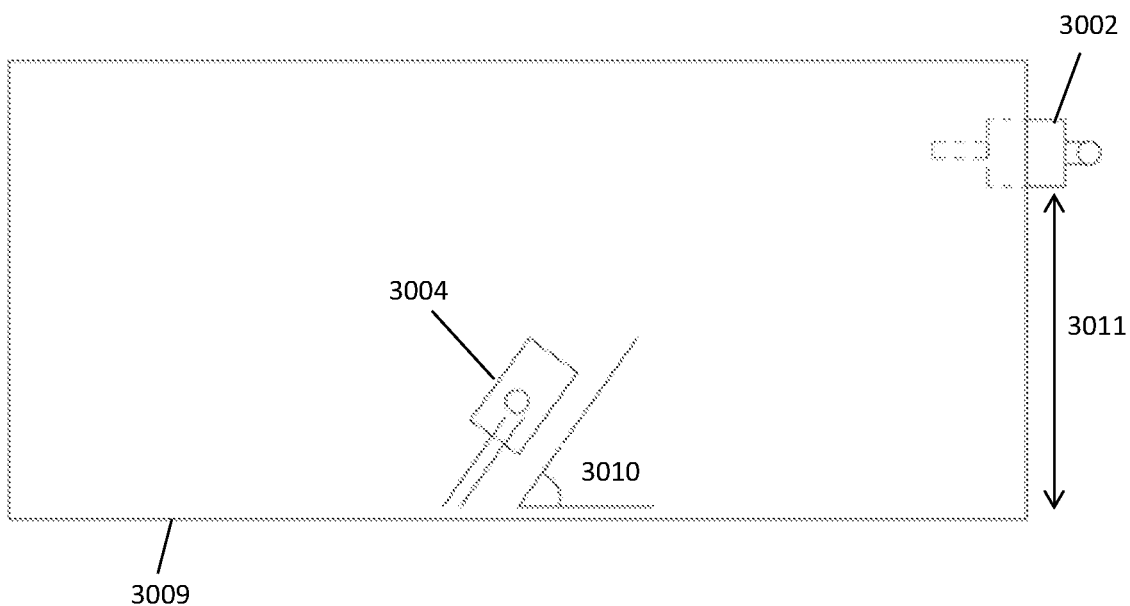
Figure 34:
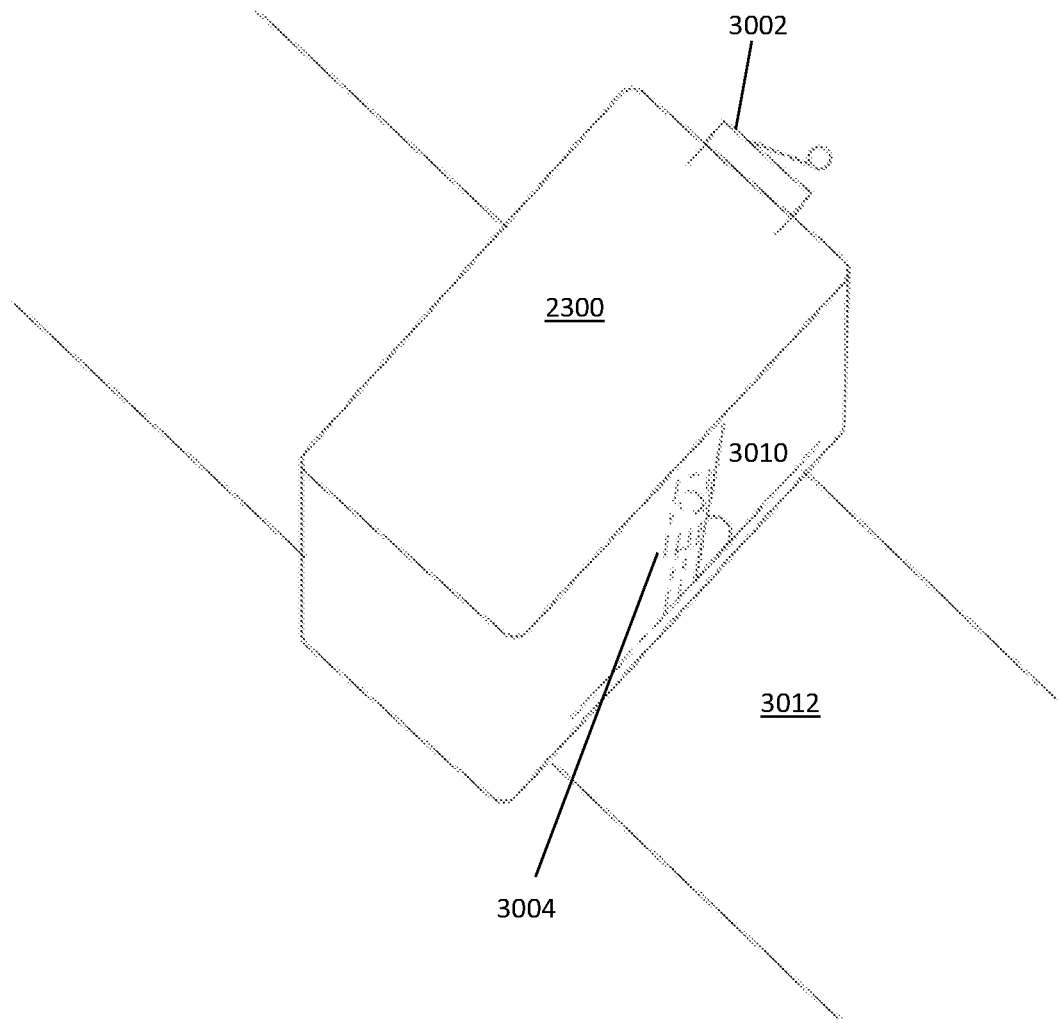
Figure 35:
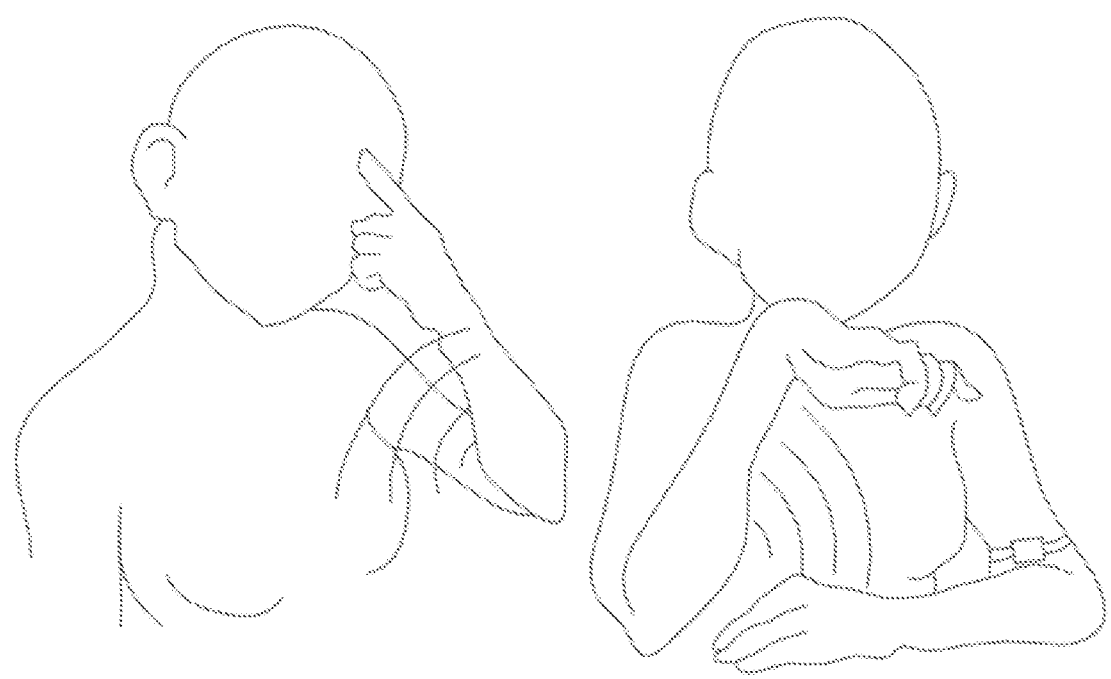
Figure 36:
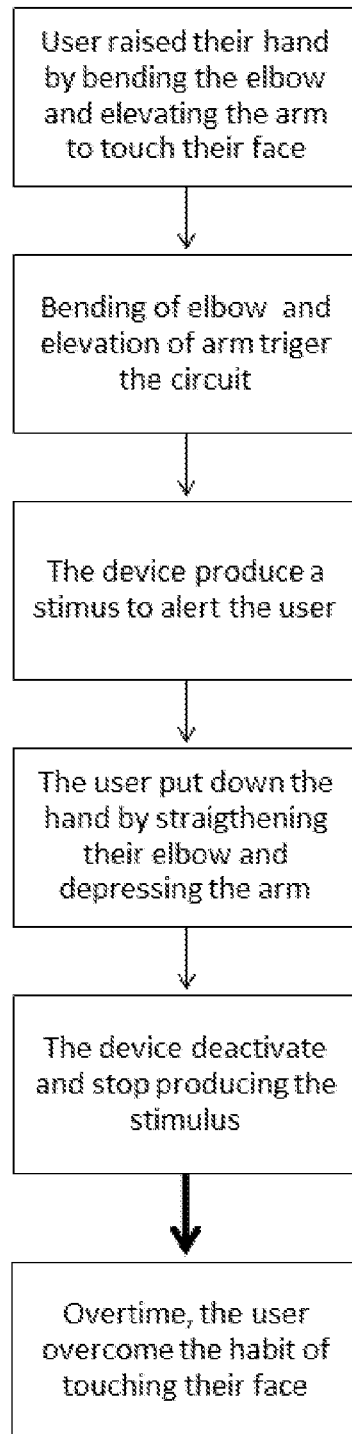
Figure 37:
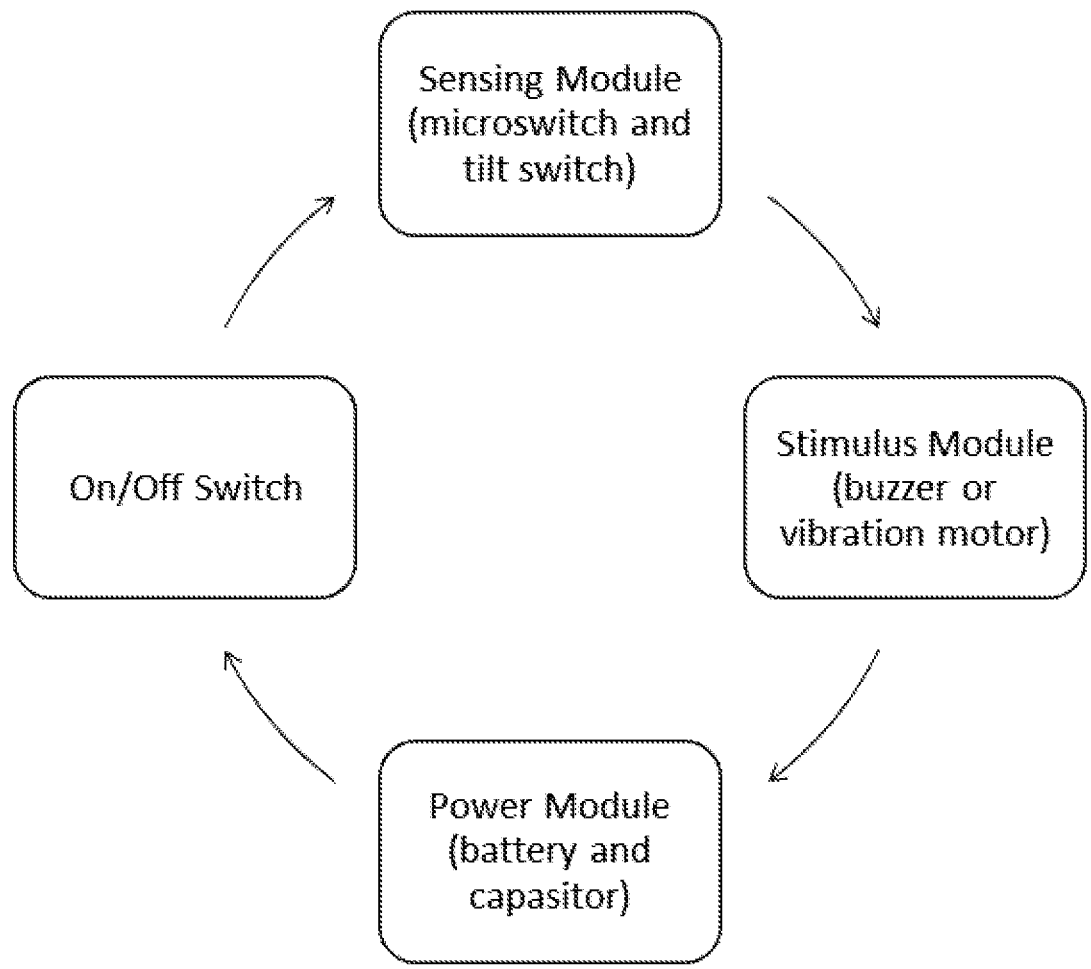

FIG. 24, which is an illustration of the pre-determined combinations of values calculated by the processor that may lead to a determination of face touching according to another form of the technology;

FIG. 25 is an illustration of the combination of values sensed by the accelerometer and calculated by the processor that may lead to a determination of face touching according to another form of the technology;

FIG. 26 is a flow chart illustrating an exemplary algorithm executed by a processor according to one form of the present technology;

FIG. 27 is a flow chart illustrating a method of determining potential, imminent and/or actual face touching according to one form of the present technology;

FIG. 28 is a graph of magnetic field against rotation angle for two different types of magnet;

FIG. 29 shows a person wearing a wearable arm device on both arms according to one form of the present technology;

FIG. 30 shows a person wearing a device on the arm at a distance above the main creases of the cubital fossa according to one form of the present technology;

FIG. 31 shows an example of a circuit design for a wearable device according to one form of the present technology;

FIG. 32 shows an example of the circuit design of FIG. 31 fitted in a device housing according to one form of the present technology;

FIG. 33 shows a side view of the device shown in FIGS. 31 and 32;

FIG. 34 shows an isometric view of a wearable device attached to an elastic material according to one form of the present technology;

FIG. 35 shows a variety of postures which may trigger a wearable device to produce a stimulus to alert a user according to one form of the present technology;

FIG. 36 shows steps in preventing the act of face touching according to one form of the present technology; and FIG. 37 shows an example of modules used in a wearable device according to one form of the present technology.

5. DETAILED DESCRIPTION OF THE INVENTION

5.1. Face Touching

Aspects of the present technology relates to systems, devices and/or methods that deter a person from touching their face with their hands. In this specification, unless the context clearly indicates otherwise, "face touching" will be understood to mean the act of touching one's face with one's hands.

In various forms, deterring a person from face touching may be achieved by detecting that person may be about to touch their face with their hands and/or is touching their face with their hands. By detecting potential and/or imminent face touching it may be possible to alert the person that they are about to touch their face, and consequently stop them from doing so. It will be appreciated that, after sensing an event that is indicative of potential and/or imminent face touching, the systems, devices and methods of some forms of the present technology may not able to control whether the person continues with the action that ultimately leads to face touching but may be able to take steps to deter them from doing so, as occurs in some forms of the technology.

The deterrent may also be achieved by detecting actual face touching and informing the person of this act, either in real-time or after the fact. The realisation that a person has touched their face may cause the act of face touching to cease, thus reducing the duration of the face touching event and the chances of transferring contagions (either to/from the face). Further, the realisation of face touching, or of how often a person has touched their face, may assist with deterring face touching in the future. The systems, devices and methods of some forms of the present technology may be used for training or retraining purposes, wherein it is used until the user significantly reduces and/or stops his/her face touching habits or other unhealthy habits.

5.2. System for Determining Face Touching

Figure 1:
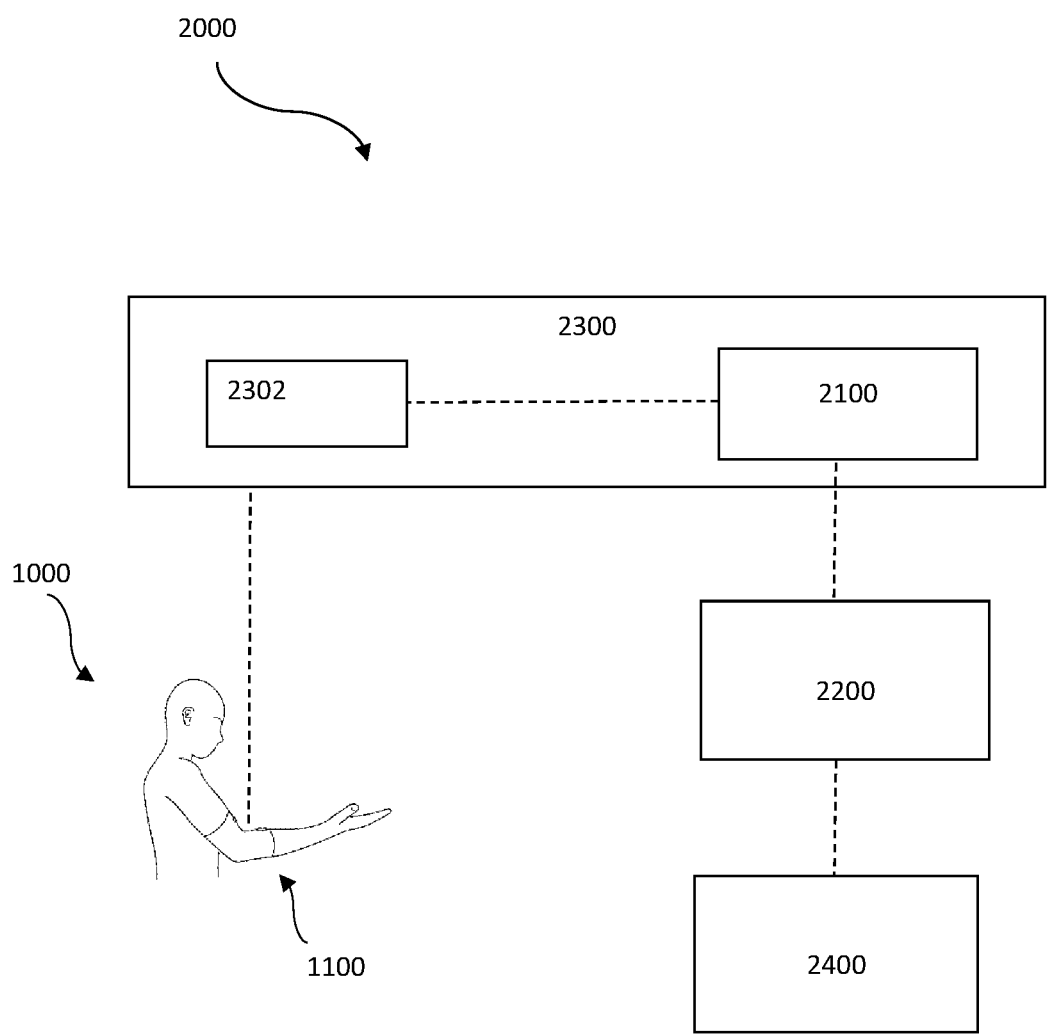
FIG. 1 is a schematic illustration of a system according to one form of the present technology.

FIG. 1 shows an exemplary system 2000 for determining potential, imminent and/or actual face touching according to an aspect of the present technology. The system 2000 may be configured to detect one or more arm events (i.e. motions and/or positions of the arm) and determine that the arm event(s) indicate(s) potential, imminent and/or actual face touching. In the remainder of the specification, reference to detecting/determining/indicating face touching or detecting/determining/indicating that an arm event/output or otherwise is indicative of face touching is not intended to be limiting and should be understood to refer to potential, imminent and/or actual face touching. This may include that a user's hand is in a position where there is significant risk that the user may touch their face in the near future, for example because the user's hand is proximate their face and/or is moving towards the face.

The exemplary system 2000 in FIG. 1 comprises one or more sensors 2100, preferably a plurality of sensors 2100. The system 2000 comprises a processor 2200. In the preferred form, the system 2000 comprises a wearable device 2300 comprising a body portion 2302 which is worn by a user 1000.

The sensor(s) 2100 are each configured to generate one or more sensor signals indicative of characteristics of the user's arm 1100, or part of the user's arm, for example its position and/or orientation, and to send the sensor signals, for example to a processor 2200. The sensor(s) 2100 are mounted on the body portion 2302 which is configured to be worn on the user's arm 1100. The body portion 2303 may be configured to be worn on one or either arm. In certain forms, the system 2000 comprises two body portions, one configured to be worn on each arm.

The processor 2200 is configured to receive and process the sensor signal(s) and determine whether the signals are indicative of face touching. In certain forms, the processor 2200 may be comprised as part of the wearable device 2300, while in other forms the processor 2200 is located remotely from the wearable device 2300.

In the illustrated embodiment, the system 2000 comprises an output device 2400 for indicating face touching. The processor 2200 is configured to provide an output indicative of face touching, for example it generates one or more output signals. The output signals are received by the output device 2400 which may be configured to issue an alarm 2402. The alarm warning issued by the output device 2400 may be before, during and/or after the user touches his/her face 1200. In certain forms, the output device 2400 may be comprised as part of the wearable device 2300, while in other forms the output device 2400 is located remotely from the wearable device 2300.

The system 2000 may be designed to detect face touching by measuring biomechanical proxies for face touching rather than measuring face touching directly. This allows the wearable device 2300, in certain forms of the technology, to be configured so that, in use, it is located away from the user's face 1200. This may allow the detection of face touching in a more discreet manner than a device located on or proximate a user's face to measure face touching directly.

The measurement methods selected may be correlated to these proxies and the sensor(s) 2100 may be configured and selected to detect parameters indicative of these proxies. In examples, one proxy may be the angle at the user's elbow, and another proxy may be the orientation of the user's forearm. In other examples, the proxy may be the orientation of the user's upper arm. Experiments by the inventors have indicated that these proxies, and more specifically when these proxies fulfil certain detectable criteria, are good indicators of face touching.

5.3. Body Portion

In certain forms, the system 2000 comprises a body portion 2302. The body portion 2302 may be any body and may be configured for mounting the sensor(s) 2100, which are carried by the body portion 2302, to the user's arm.

Figure 2:
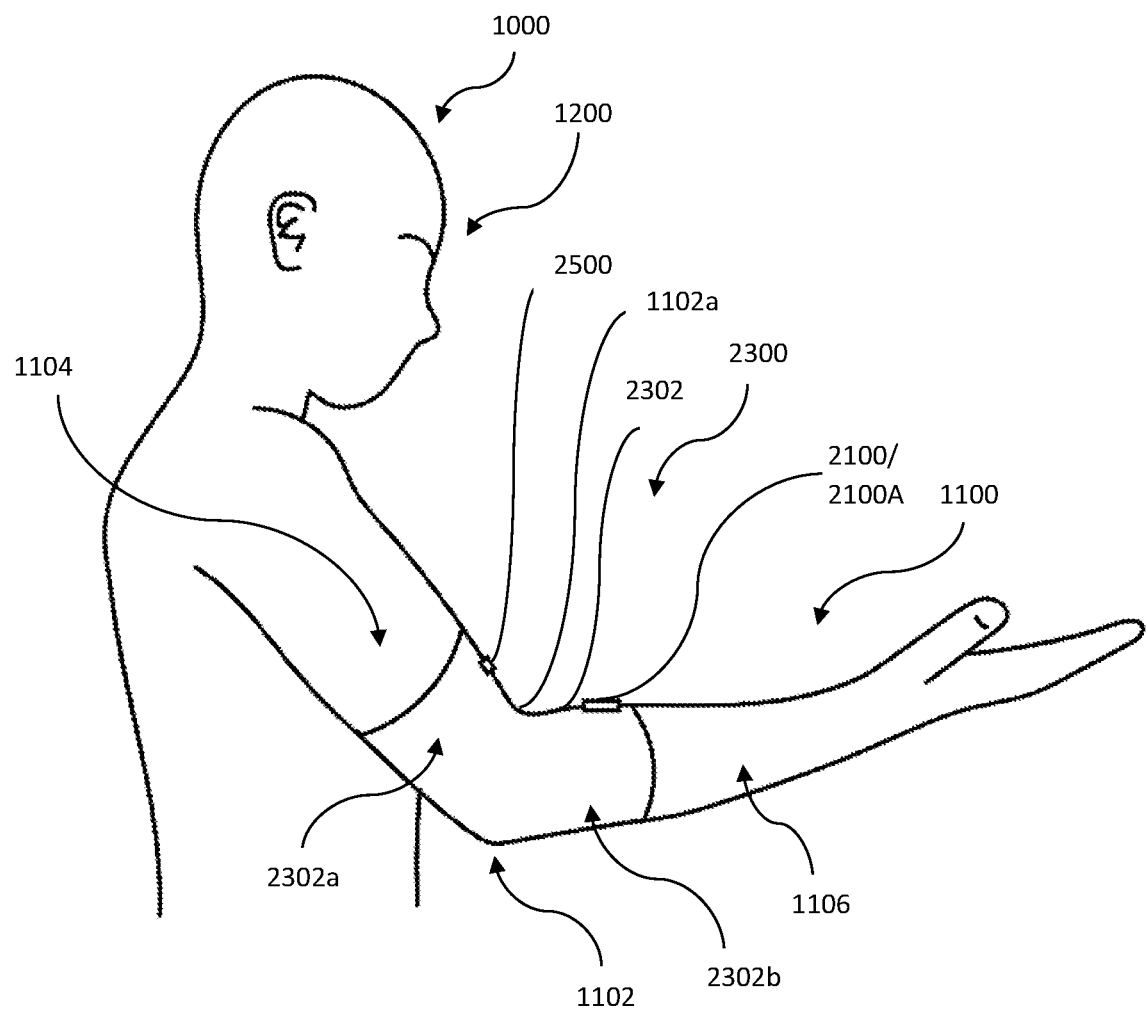
FIG. 2 is a side view of an exemplary wearable device in the form of a sleeve.

FIG. 2 shows an exemplary wearable device 2300 comprising a body portion 2302 in the form of a sleeve 2302 particularly suited for mounting on a user's arm 1100 on the user's elbow region. The elbow region will be understood to include the user's elbow 1102 and parts of the arm proximate the elbow 1102, for example the lower upper arm and upper forearm.

In examples, the body portion 2302 comprises a plurality of sections 2302a, 2302b. In the illustrated example, the body portion 2302 comprises a first section 2302a and a second section 2302b. The first section 2302a is located at least partially above the user's elbow 1102 and the second section 2302b located at least partially below the user's elbow 1102.

In the illustrated example, the first and second sections 2302a, 2302b are integrally formed as the sleeve 2302.

In alternative forms, the sections 2302a, 2302b may be separately formed. These separately formed sections 2302a, 2302b may be mounted to the user's arm 1100, for example worn as sleeves. Alternatively, the sections 2302a, 2302b may be attached to each other, for example releasably attached to each other. In yet other forms, the body portion 2302 or section 2302a, 2302b may be adjustable to adjust the location of the sections 2302a, 2302b relative to each other and/or the user's arm 1100. This may facilitate the adjustment of the location of sensors 2100 mounted on the body portion 2302.

In other forms, the body portion 2302, which may be a single, integrally formed body, or may be separately formed sections 2302a, 2302b, may be mounted to the user's arm 1100 in another manner. For example, the body portion 2302, or sections 2302a, 2302b thereof, may be mounted to the user's arm 1100 using an adhesive. In one form, the sensor unit 2100A, or part thereof (for example the sensor unit housing), may form section 2302b and a magnet 2500 may form section 2302a and these may be mounted to the user's arm 1100 directly or indirectly. In some forms the sections 2302a, 2302b may be orientated and spaced apart by a placement guide, wherein the placement guide facilitates correct placement of the sections 2302a, 2302b on the user's arm 1100. In some forms, the placement guide is removed after the sections 2302a, 2302b are mounted, e.g. adhered, to the user's arm 1100.

In other forms, the sections 2302a, 2302b may be integrally formed as a strip which may be mounted to the user's arm such that the strip is positioned and extends in the direction the arm 1100 extends in, e.g. the strip extends along the inside of the user's arm 1100.

In preferred embodiments, the sleeve 2302 is made from a relatively soft, flexible material. It is to be appreciated the body portion 2302 and the sections 2302a, 2302b may be made from any suitable material known to the skilled addressee. In some forms, the sections 2302a, 2302b may be made from different materials to each other or they may be formed from a combination of materials.

5.4. Sensor(s)

The system 2000 comprises one or more sensors 2100 each configured to generate one or more sensor signals indicative of the position and/or orientation of the user's arm 1100, or part of the user's arm. In certain forms, one or more of the sensors 2100 may be configured to measure a parameter indicative of the position and/or orientation of the user's arm 1100, or part of the arm, and to generate one or more sensor signals indicative of the parameter measured by the sensor 2100. In certain forms, one or more of the sensors 2100 may be configured to detect an arm event caused by a particular position and/or orientation of the user's arm 1100 and to generate one or more sensor signals indicative of the arm event having occurred.

It will be appreciated that the sensors may be configured to generate sensor signals indicative of the position and/or orientation of the part of the user's arm to which they are mounted. For example, a sensor mounted to the forearm may generate signals indicate of the position and/or orientation of the forearm, and a sensor mounted to the upper arm may generate signals indicate of the position and/or orientation of the upper arm.

The sensor(s) 2100 is/are configured to communicate with the processor 2200. The wearable device 2300 may comprise a transmitter for transmitting the sensor signal(s) obtained by or through the sensor(s) 2100 to the processor 2200 at a remote location, for example by RF, Bluetooth, Wi-Fi or any other remote communication protocol. In some forms, the sensor(s) 2100 may comprise a receiver configured to receive data remotely from an external source, such as external control signals from the processor 2200. Data may be stored or received by the wearable device 2300 through a physical data storage device such as a memory card, USB stick or the like comprised as part of the wearable device 2300 and in communication with the sensor(s) 2100 and/or processor 2200.

In the embodiment illustrated in FIG. 2, the sensor(s) 2100 are provided to a sensor unit 2100A. The sensor unit 2100A may be mounted to the sleeve 2302. In examples, the sensor unit 2100A may be removably attached to the sleeve 2302.

In alternative forms, the sensors 2100 may comprise any arrangement of sensors 2100 which are mounted suitably on the wearable device 2300 and which can detect the relative position and/or orientation of one or more parts of the user's arm 1100.

5.4.3. Sensor for Detecting Relative Position/Orientation of Part(s) of the User's Arm In certain forms of the technology, the sensor(s) 2100 comprise a first sensor 2102 configured to generate one or more sensor signals indicative of the position and/or orientation of the user's arm 1100 relative to another part of the user's body, for example another part of the same arm. In certain forms, the first sensor 2102 may measure one or more parameters indicative of the relative position/orientation of one or more parts of the user's arm 1100 and generate sensor signals indicative of the parameter(s). In one form the first sensor 2102 measures one or more parameters indicative of the relative position of one or more parts of the user's arm 1000 in relation to another part of the user's arm. In an alternative form, the first sensor may be configured to measure one or more parameters indicative of a position of a part of the user's arm 1100 relative to a body part other than the user's arm 1100. In certain forms, the first sensor 2102 may detect an arm event caused by a particular position/orientation of the user's arm 1100 and generate sensor signals indicative of the arm event having occurred.

For the purposes of this specification, unless the context clearly requires otherwise, reference to "arm" will be understood to comprise the upper arm 1104, forearm 1106, elbow 1102, shoulder 1108, wrist 1110 and/or hand 1112.

The first sensor 2102 may comprise a single sensor or a plurality of individual sensors operating together to measure these parameters or detect these events.

Throughout this specification there will be reference to sensors generating signals that are "indicative of" certain values or parameters. It will be appreciated that, unless the context expressly requires it, this does not require the signals to represent or encode the respective values or parameters themselves. The signals may indirectly indicate those values or parameters. In one example, explained below, a magnetic field strength measurement may be indicative of the angle of a user's elbow. Therefore, a sensor signal may be indicative of the angle at the user's elbow by representing the magnetic field strength measurement and not necessarily by representing the stated angle directly.

Figure 2A:
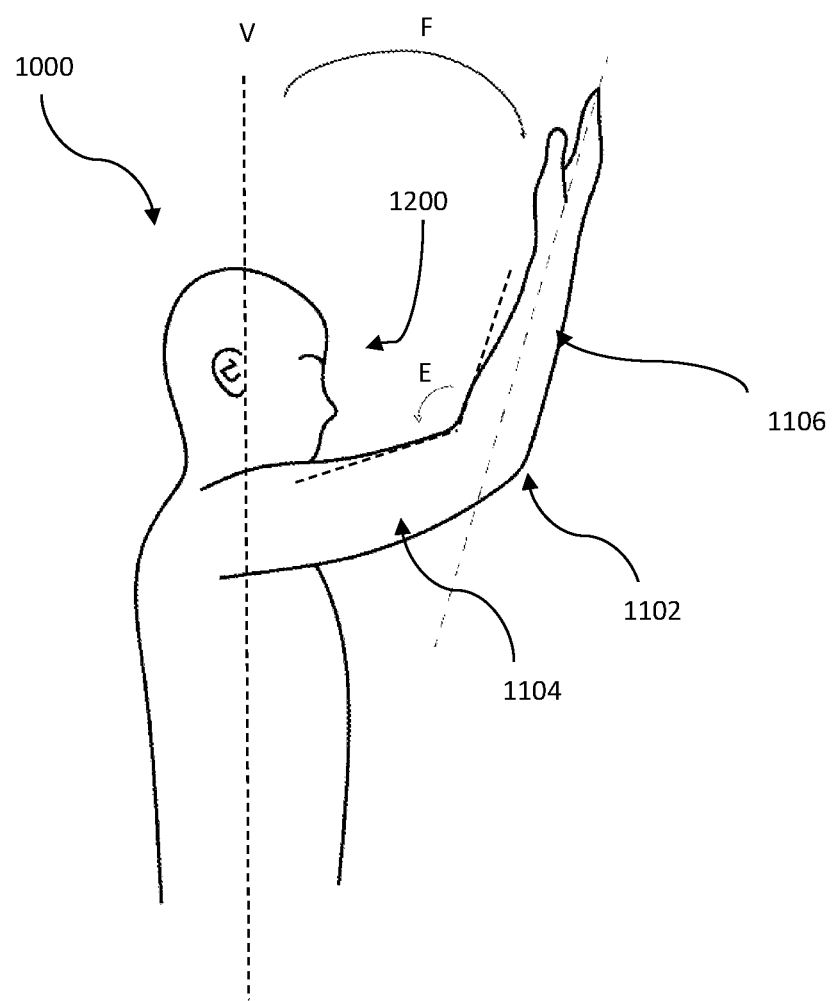
FIG. 2A is a side view of a user's arm showing parameter(s) indicative of an angle at a user's elbow and parameter(s) indicative of orientation of the user's forearm.

In certain forms of the technology, a biomechanical proxy used to indicate face touching is the angle at the user's elbow, since it has been observed that a user needs to bend their elbow in order to touch their face with their hands. Consequently, as shown in FIG. 2A, a parameter indicated by the first sensor 2102 may be the angle at the user's elbow, i.e. an angle E of the forearm 1106 relative to the upper arm 1104 at the elbow 1102. By indicating the angle at the elbow, the first sensor 2102 is configured to indicate a parameter(s) indicative of an angle between the user's forearm 1106 and the user's upper arm 1104.

In one form of the technology, the first sensor comprises a magnetometer 2103 and the wearable device 2300 comprises a magnet 2500 mounted on the body portion 2302.

In preferred forms, the sensor unit 2100A comprises the first sensor 2102. As illustrated in FIG. 2, the sensor unit 2100A is located in use on the user's forearm 1106, preferably mounted on the second section 2302b. The magnet 2500 is located in use on the user's upper arm 1104, preferably mounted on the first section 2302a. In an alternative form, the locations of the magnetometer 2103 and the magnet 2500 may be swapped, i.e. the magnetometer 2103 may be mounted on the first section 2302a and the magnet 2500 may be mounted on the second section 2302b.

In certain forms, the first sensor 2102 is positioned on an anterior antebrachial or brachial region of the user's arm 1100. For example, the magnetometer 2103 may be positioned on an anterior antebrachial region of the user's arm 1100 and the magnet 2500 may be positioned on an anterior brachial region of the user's arm 1100. In other forms, the first sensor 2102 may be positioned on a lateral, medial or posterior antebrachial or brachial region of the user's arm 1100.

Figure 3:
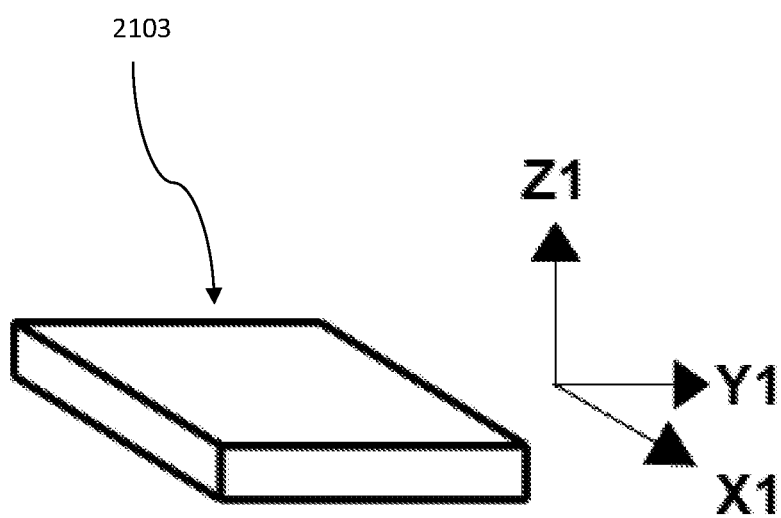
FIG. 3 is a perspective view of an exemplary first sensor in the form of a magnetometer.
Figure 5A:
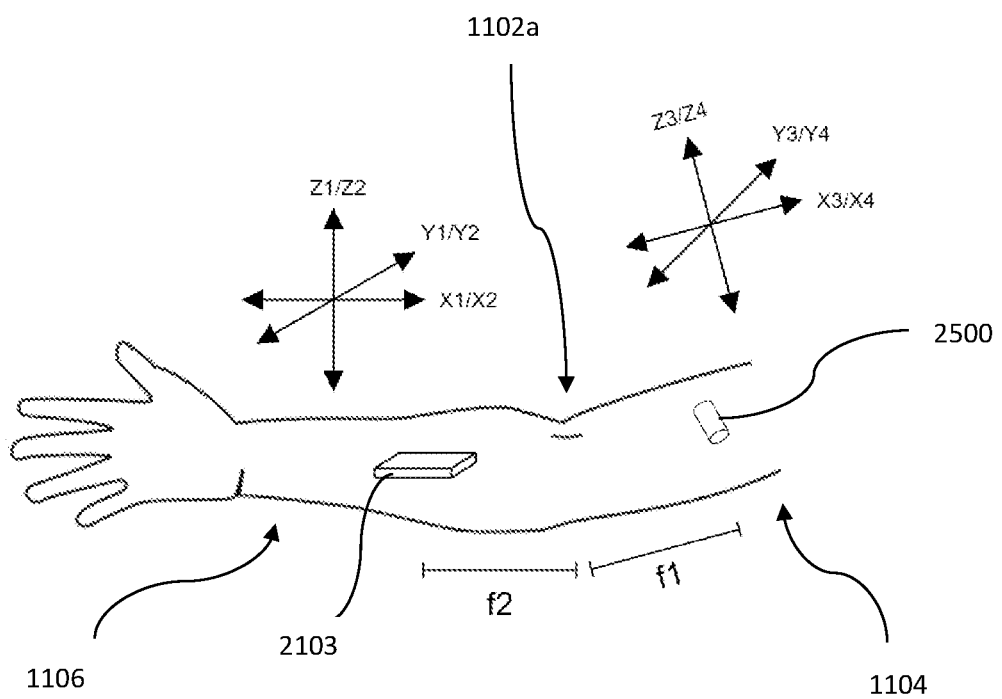
FIG. 5A is a perspective view of the magnetometer of FIG. 3 and the magnet of FIG. 4 arranged on a user's arm according to one form of the present technology.

As illustrated in FIG. 3, the magnetometer 2103 defines three perpendicular axes, one axis in each of the mutually perpendicular directions along which the magnetometer 2103 measures the magnetic field strength and/or direction: X1, Y1 and Z1. Referring to FIG. 5A, three perpendicular axes may also be defined in relation to the user's forearm 1106: one axis in the longitudinal direction in which the forearm 1106 extends (X2), and two other axes (Y2 and Z2) which are perpendicular to X2 and to each other. In the form shown in FIG. 5A, the magnetometer 2103 is orientated relative to the user's forearm 1106 such that X1 and X2 are parallel to each other, Y1 and Y2 are parallel to each other and Z1 and Z2 are parallel to each other. In other forms, one or more of the measuring axes of the magnetometer may not be so aligned with the axes X2, Y2 and Z2 as just defined in relation to the forearm.

In certain forms the magnetometer 2103 is configured to measure a magnetic field strength of the magnet 2500 in one or more directions, for example a magnetic field strength component in directions along each of X1, Y1 and Z1, and/or an overall magnitude of the magnetic field strength ($\sqrt{(X1^2+Y1^2+Z1^2)}$). The magnetometer 2012 is configured to generate one or more sensor signals indicative of any one or more of the measured magnetic field strengths.

In another form, the magnetometer 2103 is configured to measure a direction of the magnetic field generated by the magnet 2500, for example the angle of the magnetic field relative to one or more of X1, Y1 and Z1, and/or an overall magnetic field direction. The magnetometer 2012 is configured to generate one or more sensor signals indicative of any one or more of the measured magnetic field directions. In some forms, the magnetometer 2103 may be configured to measure the magnetic field direction(s) in addition, or alternatively, to measuring the magnetic field strength(s).

Figure 4:
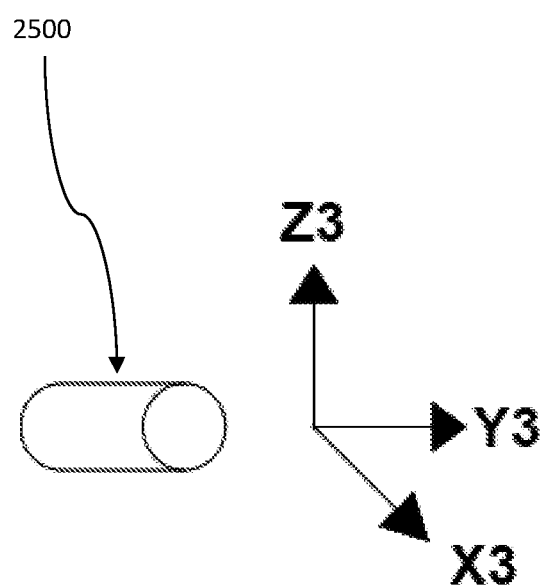
FIG. 4 is a perspective view of an exemplary magnet.

As illustrated in FIG. 4, three perpendicular axes may be defined in relation to the magnet 2500: one axis along the polar axis of the magnet 2500 (Z3), and two other axes (X3, Y3) perpendicular to Z3 and to each other. Referring to FIG. 5A, three perpendicular axes may be defined relative to the user's upper arm 1104: one axis in the longitudinal direction in which the upper arm 1104 extends (X4), and two other axes (Y4, Z4) perpendicular to X4 and to each other. The magnet 2500 may be orientated relative to the user's upper arm 1104 in use such that X3 and X4 are substantially parallel to each other, Y3 and Y4 are parallel to each other and Z3 and Z4 are parallel to each other. In this form, the polar axis Z3 of the magnet 2500 is substantially perpendicular to the longitudinal direction in which the upper arm 1104 extends (X4) and. In alternative forms, the polar axis of the magnet may be substantially parallel to the longitudinal direction in which the upper arm 1104 extends (X4).

Figure 5B:
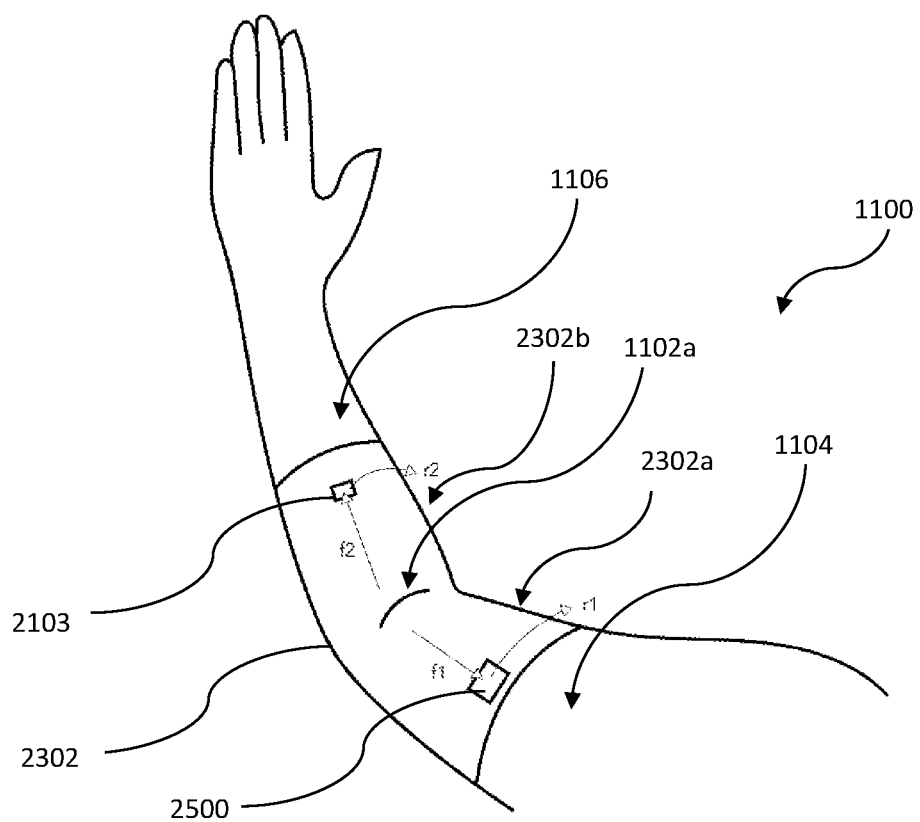
FIG. 5B is a perspective view of a wearable device comprising magnetometer and magnet according to one form of the present technology.

FIG. 5B shows a wearable device 2300 according to one form of the technology on a user's arm in use. In this form the wearable device 2300 is configured so that the positioning of the magnetometer 2103 and magnet 2500 on the user's arm 1100 is as shown in the figure. In the illustrated example, the magnetometer 2103 and magnet 2500 are mounted on the sleeve 2302. f1 is the distance between the magnet 2500 and an antecubital (inner elbow) joint 1102a, and f2 is the distance between the magnetometer 2103 and the antecubital joint 1102a. The distances from the antecubital joint 1102a may be considered equivalent to the distances from the cubital fossa (elbow crease) on the outside of the body. r1 is the distance between the magnet 2500 and an anterior line defined on an anterior antebrachial region of the user's arm 1100. r2 is the distance between the magnetometer 2103 and an anterior line defined in on an anterior brachial region of the user's arm 1100. Therefore, r1 and r2 define the positioning of the magnetometer 2103 around the user's forearm 1106 and of the magnet 2500 around the upper arm 1104 respectively. In preferred forms, the wearable device 2300 is configured so that r1 equals r2. Therefore, when the elbow is fully extended so that the angle E at the elbow (as shown in FIG. 2A) is 180°, the axes X1 and X3 defined by the magnetometer 2103 and the magnet 2500 respectively are substantially aligned. Additionally or alternatively in certain forms, r1=0 and/or r2=0, i.e. one or both of the magnetometer 2103 and the magnet 2500 are positioned on an anterior line of the respective antebrachial or brachial region. Put another way, when the user stands with their arm extended and their antecubital joint 1102a (and possibly palm) extending directly upwards, one or both of the magnetometer 2103 and the magnet 2500 are positioned on top (i.e. superior to) the immediately adjacent part of the arm.

Referring again to FIG. 5A, the wearable device 2300 may be configured so that, in use, the magnetometer 2103 and the magnet 2500 are each located approximately the same distance from the antecubital joint 1102a of the user's elbow 1102 (i.e. f1=f2). In certain forms, that distance may be approximately 30-120 mm, for example 50-70 mm, for example 60 mm in one form. In certain forms the wearable device 2300 may be configured so that the part of the first sensor 2102 on the upper arm, which may be the magnet 2500 in some forms, is positioned to overlay, or is proximate to, the tendon at the bottom or distal end of the bicep, which may be referred to as the distal biceps tendon. This has been found to provide a particularly stable location for the magnet 2500, which helps the accuracy and consistency of the wearable device 2300 detecting face touching.

In forms in which both f1=f2 and r1=r2=0, the magnetometer 2103 and magnet 2500 are substantially aligned with each other when the elbow 1102 is fully closed as will be described below.

Figure 5C:
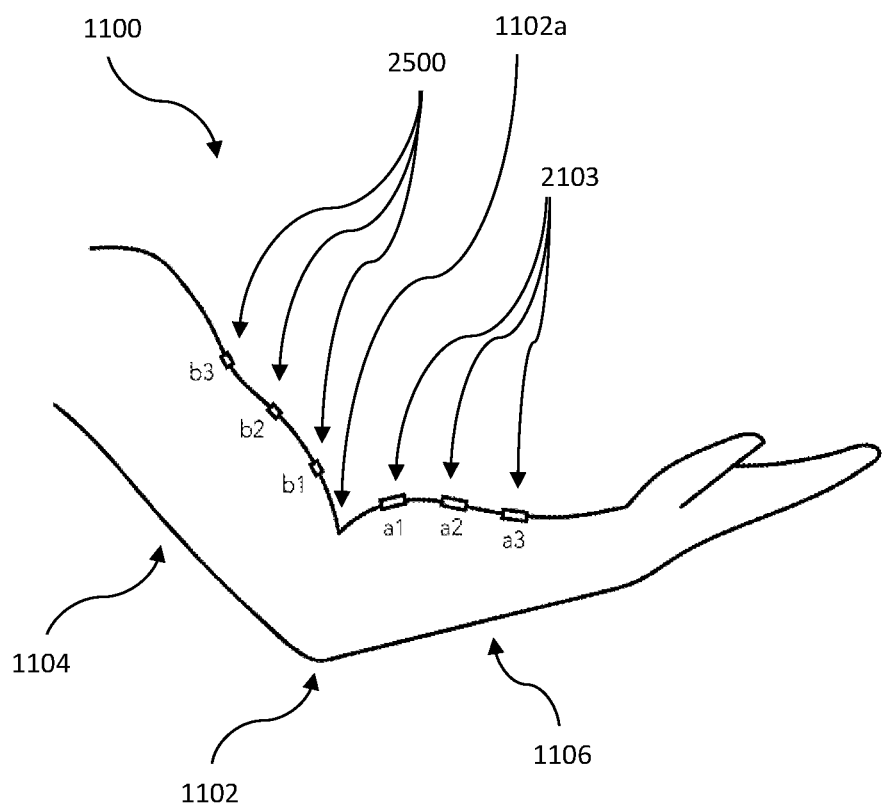
FIG. 5C is an illustration of various different possible positions of a magnetometer and magnet when comprised as part of a wearable device according to forms of the present technology.

In other forms f1 does not equal f2. For example, FIG. 5C shows various positions b1-b3 and a1-a3 of the magnet 2500 and magnetometer 2103 respectively according to forms of the technology on a user's arm in use. Each of the positions a1-a3 and b1-b3 shown in FIG. 5C is on an anterior line of the respective antebrachial or brachial region (i.e. in terms of the parameters shown in FIG. 5B, r1=0 and r2=0). The distance f1 (as defined above in relation to FIG. 5B) is different for each of the positions b1, b2 and b3 and the distance f2 is different for each of the positions a1, a2 and a3. In forms of the technology in which one or more angles of the magnetic field relative to one or more directions is/are used as a value or values indicative of the relative position of the forearm and the upper arm (i.e. the angle at the elbow), the wearable device 2300 may be configured so that, in use, the magnet 2500 is positioned substantially closer to the antecubital joint 1102a of the user's elbow 1102 than the magnetometer 2103. For example, the wearable device 2300 may be configured so that, in use, the magnet 2500 is positioned at b1 and the magnetometer 2103 is positioned at a2 or a3. In these forms, f1 is less than f2. In certain forms, f1 may be approximately 5-50 mm, for example 15-40 mm, for example 20 mm. In certain forms, f2 may be approximately 50-120 mm, for example 60-90 mm, preferably 75 mm. In other forms, f1 is greater than f2 and the magnet 2500 is positioned substantially further from the antecubital joint 1102a of the user's elbow 1102 than the magnetometer 2103.

Figure 6:
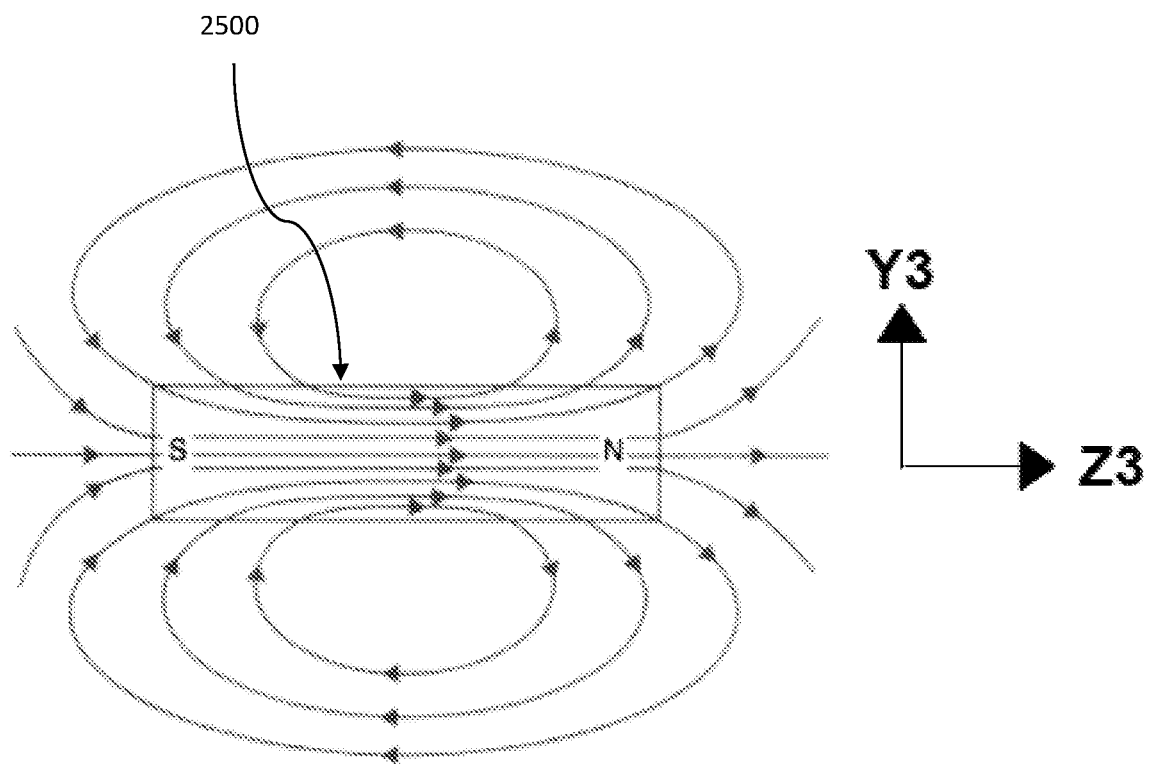
FIG. 6 is a side view of the magnet of FIG. 4 showing the magnetisation and magnetic field generated.

FIG. 6 shows the magnetic field generated by the magnet 2500 which is magnetised along Z3. In one exemplary form, the magnet grade is N38. Preferably, the magnet may have dimensions in the range 2-15 mm along any one side, for example in one form the dimensions of the magnet 2500 are 12.5 mm×6 mm×3.5 mm. It is to be appreciated that in alternative forms one or more of the magnet grade, dimensions, shape and magnetisation may vary. In some forms, magnetic lensing may be used to modify the magnetic field generated by magnet 2500.

The magnetic field produced by the magnet 2500 varies in magnitude and direction with distance from the magnet 2500 along each of the axes X3, Y3, Z3. Consequently, the magnitude and direction of the magnetic field produced by the magnet 2500 that is detected by magnetometer 2103 varies as the magnet 2500 is moved relative to the magnetometer 2103. For example, referring to FIG. 7, which is a schematic illustration of a stationary magnetometer 2103 and magnet 2500 arrangement according to one form of the present technology showing lines of magnetic field generated by the magnet 2500, when the magnet 2500 and magnetometer 2103 are stationary, co-linear and spaced apart along their X axes, and orientated parallel to each other along their other axes, a magnetic field strength will only be measured by the magnetometer along Z1.

Figure 7:
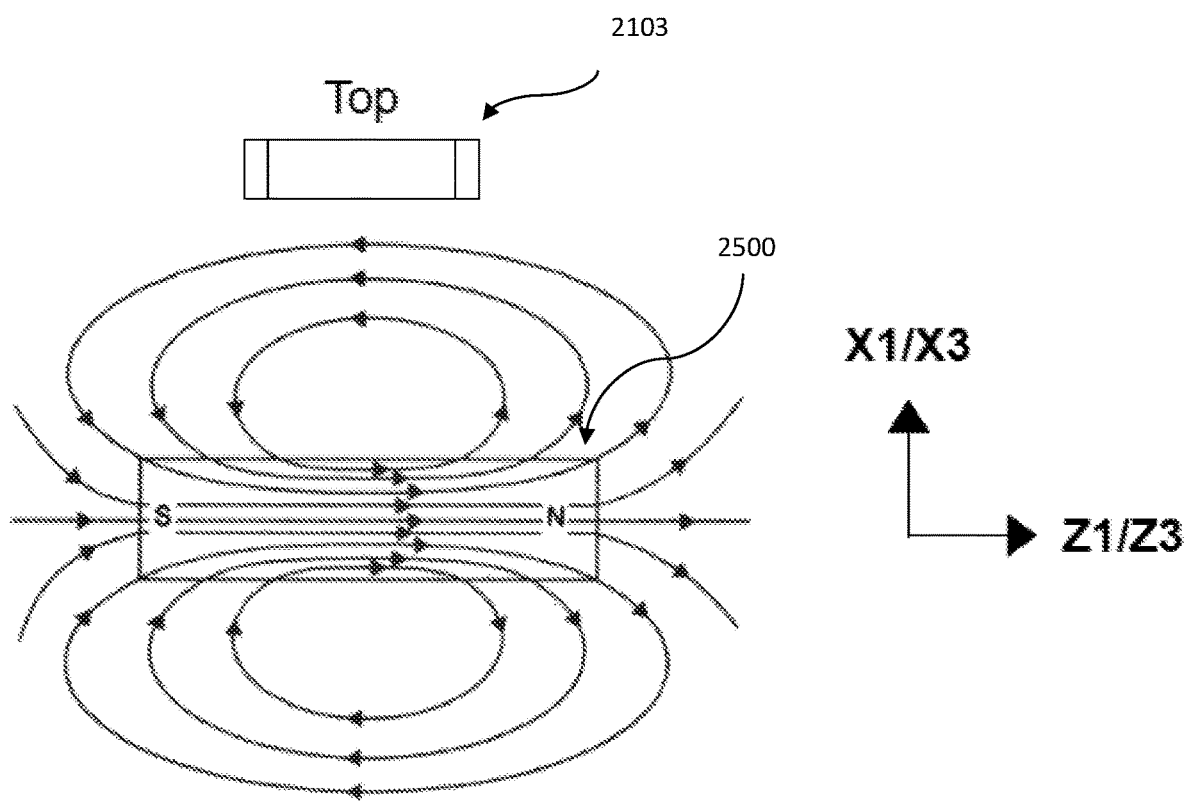
FIG. 7 is a schematic illustration of a stationary magnetometer and magnet arrangement according to one form of the present technology.
Figure 8:
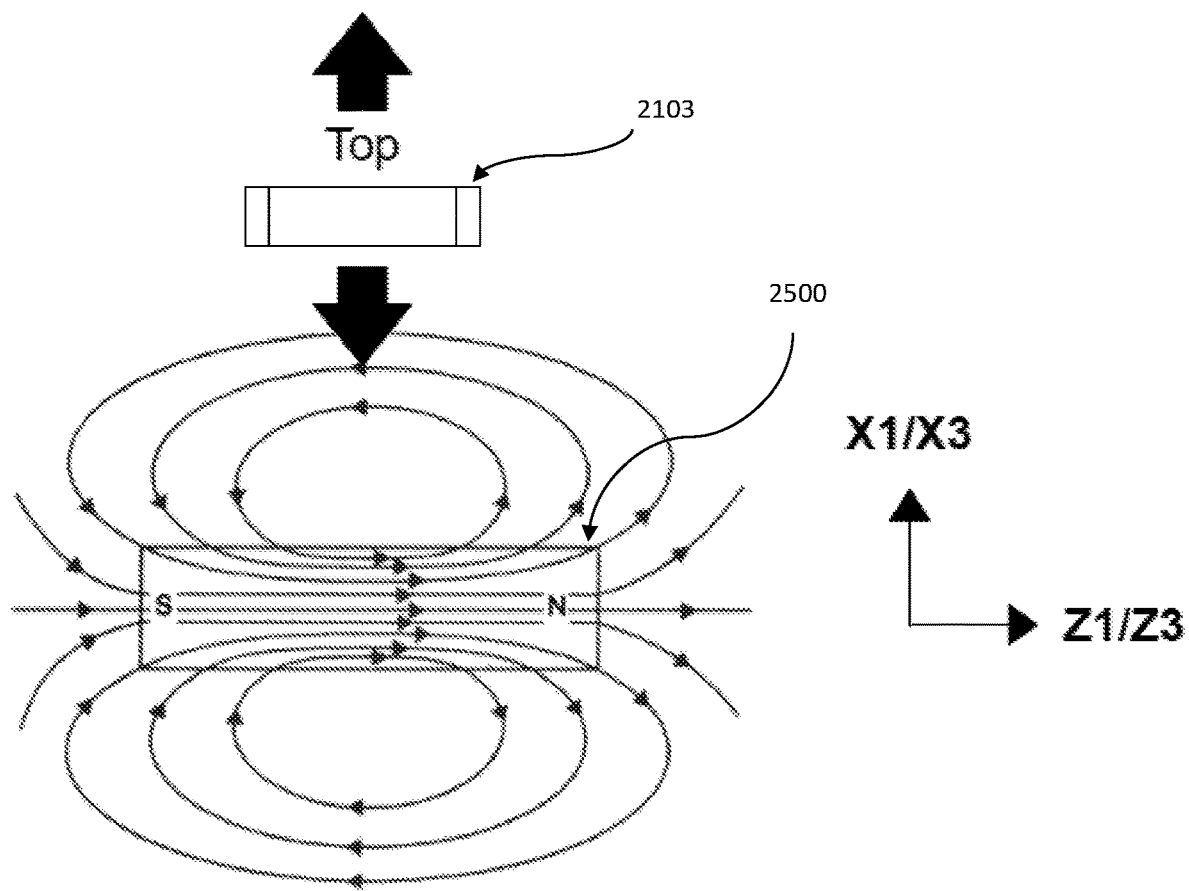
FIG. 8 is another illustration of the magnetometer and magnet arrangement of FIG. 7, showing the magnetometer and magnet moving relative to each other in one direction.
Figure 9:
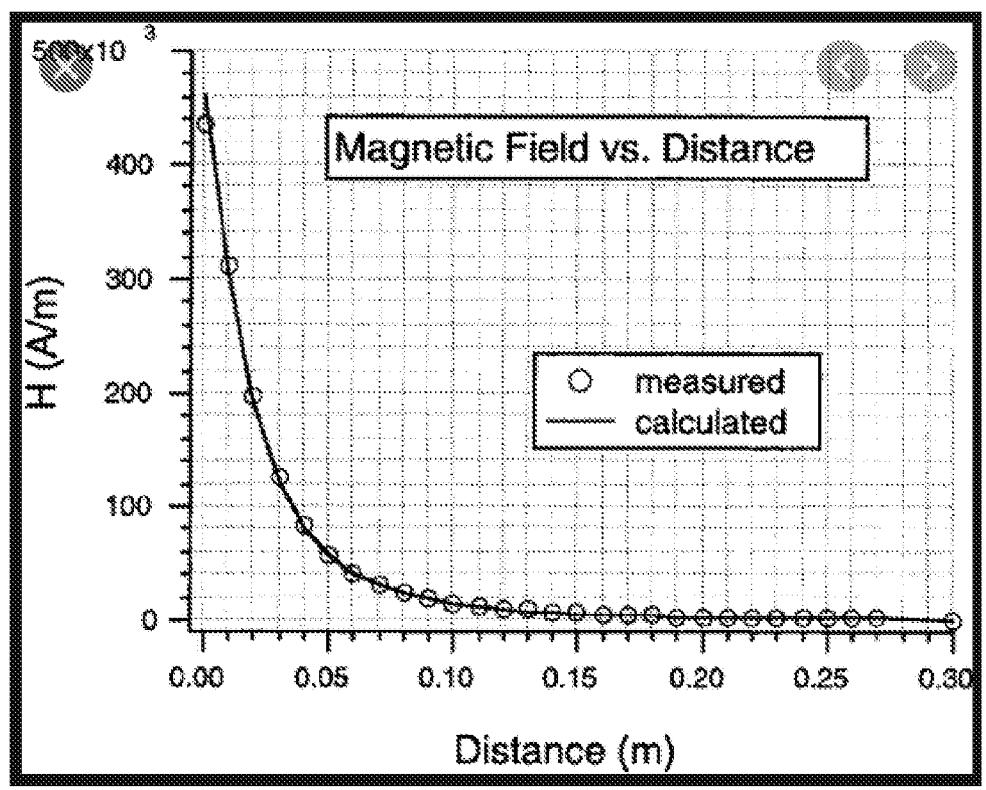
FIG. 9 is a graph showing the change in magnetic field strength as a result of the magnetometer/magnet movement shown in FIG. 8.

FIG. 8 shows the same magnetic field of magnet 2500 as shown in FIG. 7 with magnetometer 2103 shown moving relative to the magnetic field. When the magnet 2500 and magnetometer 2103 are co-linear, spaced apart and moving relative to each other along their X axes, and orientated parallel to each other along their other axes, as shown in FIG. 8, the magnetic field strength measured by the magnetometer 2103 along Z1 will vary. This variation is shown in FIG. 9, which plots the magnetic field strength in the Z1 direction measured by the magnetometer 2103 (which, in the form shown in FIG. 8, equals the overall magnetic field strength measured by the magnetometer 2103 since the components of the magnetic field in the X1 and Y1 directions are zero) against the distance of the magnetometer 2101 from the magnet 2500 in the X1 (and X3) direction. The magnetic field strength decreases as the magnet 2500 and magnetometer 2103 move further apart (as indicated by the lower density of magnetic field lines in the figures).

Figure 10:
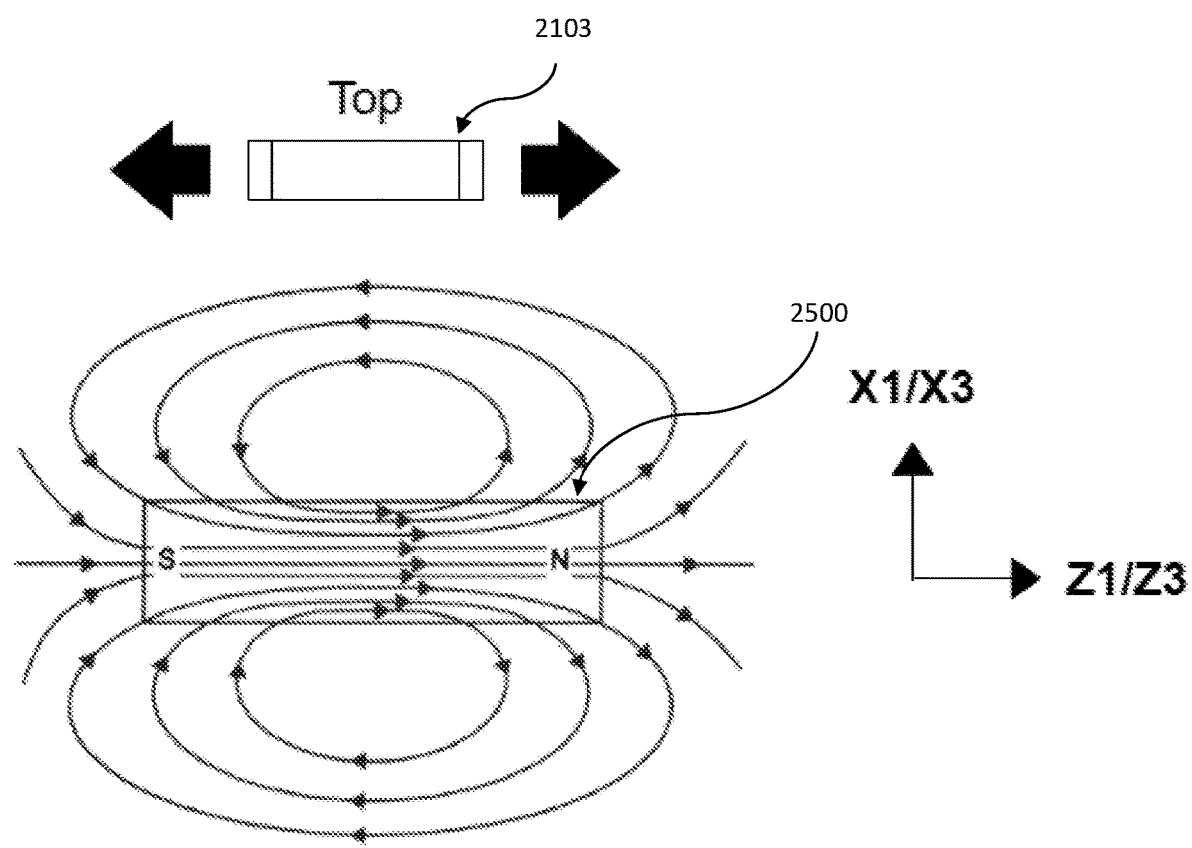
FIG. 10 is another illustration of the magnetometer and magnet arrangement of FIG. 7, showing the magnetometer and magnet moving relative to each other in another direction.
Figure 11:
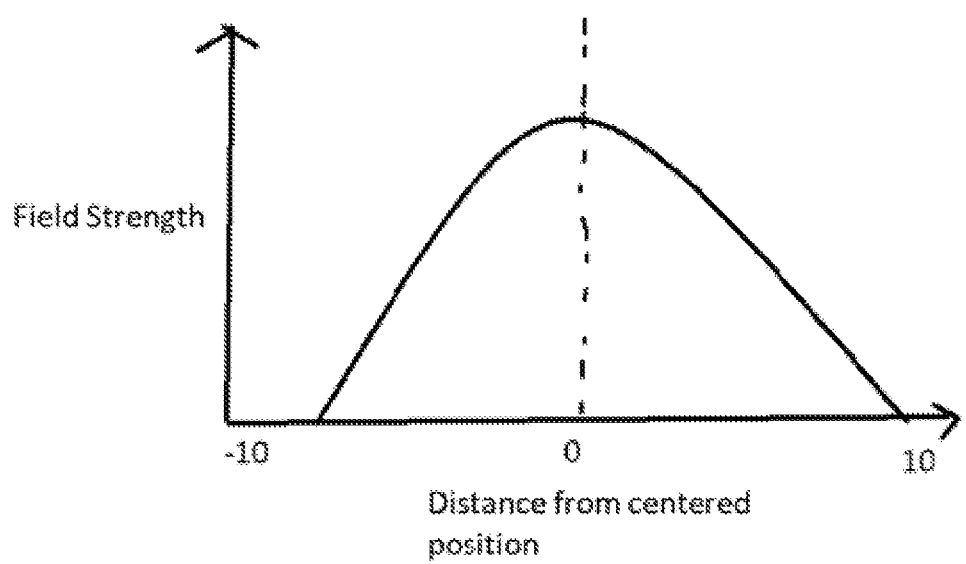
FIG. 11 is a graph showing the change in magnetic field strength as a result of the magnetometer/magnet movement shown in FIG. 10.

FIG. 10 shows the same magnetic field of magnet 2500 as shown in FIGS. 7 and 8 with magnetometer 2103 shown moving relative to the magnetic field. This movement may represent movement which misaligns the magnetometer 2103 and magnet 2500 as shall be discussed in more detail later in the specification. When the magnet 2500 and magnetometer 2103 are spaced apart along their X axes with their respective X, Y and Z axes parallel and the magnetometer 2103 is moving in the direction in the Z direction (relative to both the magnet 2500 and the magnetometer 2101, since their Z axes are parallel in FIGS. 10 and 11), the magnetic field strength measured by the magnetometer 2103 along Z1 will vary. This variation is shown in FIG. 11, which plots the magnetic field strength in the Z1 direction measured by the magnetometer 2103 against the distance of the magnetometer 2101 from alignment with the X3 axis of the magnet 2500. Furthermore, as the magnet 2500 moves as indicated by the arrows in FIG. 10, the magnetic field strength along X1 will vary and consequently there is a change in the detected direction of the magnetic field.

In certain forms of the technology, the magnet 2500 may be cylindrical in shape. FIG. 28 is a graph illustrating the variation of the magnitude of the magnetic field with angle around the magnet (at a given distance from the magnet) for both a cuboid (or 'rectangular') magnet and a cylindrical magnet. In the case of the cylindrical magnet, the measurement is taken at the same distance from the polar (or longitudinal) axis of the cylindrical magnet at each angle. The graph in FIG. 28 shows that the magnitude of magnetic field is significantly more uniform with rotation in the case of a cylindrical magnet than a cuboid magnet. Consequently, to avoid this variation affecting the accuracy of the determination of face touching in the present technology, in certain forms, a cylindrical magnet may be used. The cylindrical magnet may be oriented so that its longitudinal axis is arranged parallel with the longitudinal axis of the upper arm. This results in a magnetic field having a shape relative to the magnetometer 2103 similar to that shown in FIG. 16A. Alternatively, the cylindrical magnet may be oriented so that its longitudinal axis is arranged perpendicular to the longitudinal axis of the upper arm, for example extending in the anterior/posterior direction when the arm is by the user's side (in which case the Z3 axis is in the orientation relative to the arm as shown in FIG. 5A) or extending in the lateral/medial direction when the arm is by the user's side. The latter orientation, i.e. where the longitudinal axis is arranged perpendicular to the longitudinal axis of the upper arm and in the lateral/medial direction when the arm is by the user's side, may be preferred in some forms. In this case, when the elbow opens and closes, the magnetometer moves through a region of the magnetic field in which the field lines are approximately perpendicular to the direction of movement of the magnet and are symmetrical with respect to the angular orientation around the magnetic axis. This makes the field strength reliably variable and helps accuracy of the magnetometer measurements determining distance between the magnet and magnetometer, and consequently the angle between the upper and lower arms.

The magnetic field magnitude(s) measured by the magnetometer 2103 may be used to indicate the relative position of the magnetometer 2103 and magnet 2500. Additionally or alternatively, the variation of the direction of the magnetic field which is detected by the magnetometer 2103 may be used to indicate the relative position of the magnetometer 2103 and magnet 2500. The magnitude and/or direction of the magnetic field may be used as a parameter from which the processor may determine the angle at the user's elbow as will be explained in more detail below.

In alternative forms of the technology the first sensor 2102 may comprise a proximity sensor other than a magnetometer. For example, the first sensor 2102 may comprise a near field communication (NFC) reader, which may be located on one of the user's forearm 1106 and upper arm 1104. An NFC tag may be located on the other of the user's upper arm 1104 and forearm 1106. The wearable device 2300 may be configured so that the NFC reader and NFC tag are positioned similarly to the positions of the magnetometer 2103 and magnet 2500 respectively, as described for exemplary forms of the technology above. The location of the reader and tag may also be swapped in certain forms of the technology. In another example, the first sensor 2102 may comprise a radio frequency identification (RFID) reader positioned in use on one of the user's forearm 1106 and upper arm 1104, which operates in use with an RFID tag positioned on the other of the user's forearm 1106 and upper arm 1104. In yet another example, an infrared sensor may be used as the first sensor 2102. It is appreciated that other first sensors 2102 which are known to those skilled in the art may be used as a suitable proximity sensor.

More generally, the first sensor may 2102 be configured to sense a field or signal associated with a sensed member. For example, a magnetometer is an example of a first sensor where the sensed member is a magnet (that generates a magnetic field sensed by the magnetometer) and NFC and RFID readers are examples of first sensors where the sensed member is an NFC or RFID tag (which transmits a signal when energised by the reader).

In alternative forms of the technology the first sensor 2102 may comprise a contact sensor, e.g. a pressure or electrical contact sensor. In some forms, the first sensor 2102 may comprise a switch or other device configured to detect the relative position of the part(s) of the user's arm 1100, for example when the angle at the user's elbow decreases below a maximum amount needed to engage the switch or other contact sensor. That is, in some forms, the first sensor 2102 may not generate a sensor signal indicative of the relative position/orientation of the user's arms at all times. In these forms, the first sensor 2102 may only generate a sensor signal at particular times, for example, when a contact sensor, or other proximity sensor, determines that the relative position/orientation meets certain criteria, e.g. the angle between the upper arm and forearm is below a certain maximum threshold necessary to trigger a switch.

In an alternative form, the first sensor 2100 may comprise at least two accelerometers. For example, a first accelerometer may be located on the user's upper arm 1104 and a second accelerometer may be located on the user's forearm 1106. The accelerometers may be used to detect the user's upper arm and forearm orientations. The relative orientations of these arm parts may be used to determine the angle at the user's elbow. The accelerometer provided to the user's forearm 1106 may be the same accelerometer that is comprised as part of a second sensor 2104 as described below.

5.4.4. Sensor for Detecting Orientation of Part(s) of the User's Arm with Respect to Gravity In certain forms of the technology, the sensors 2100 comprise a second sensor 2104 configured to measure one or more parameters indicative of the orientation of one or more part of the user's arm 1100. The second sensor 2104 may comprise a single sensor or a plurality of individual sensors operating together to measure these parameters.

In certain forms of the technology a biomechanical proxy used to indicate face touching is the orientation of the user's forearm, since it has been observed that a user needs to orient their forearm in a certain manner (or within a certain range of orientations, as explained further below) in order to touch their face with their hands. Consequently, as shown in FIG. 2A, a parameter(s) measured by the second sensor 2104 may be indicative of an orientation of the user's forearm. In some forms, an "orientation" of the user's forearm may be understood to mean the angle of the forearm caused by the relative positioning of the distal end of the forearm compared to the proximal end of the forearm. In some forms, the orientation of the forearm may alternatively, or additionally, refer to the degree of orientation of the forearm around its own longitudinal axis, while the relative positioning of the distal and proximal ends remains the same. The orientation of the user's forearm may be considered with respect to a reference, for example a fixed reference such as gravity, i.e. the direction of the gravitational force.

In certain forms, the orientation may be an angle of the forearm relative to vertical (i.e. gravity) and/or horizontal in one or more planes of the body. In the example shown, an angle F represents the forearm's angle relative to the vertical axis V of the upper body, i.e. the line of intersection between the mid-sagittal plane and the frontal (or coronal) plane of the upper body. That is, when the arm extends out in front of the user, perpendicular to the frontal plane, as shown in FIG. 2A, angle F is the angle that a projection of the forearm onto the mid-sagittal plane makes with the frontal plane. It has been observed that it is more common for a face touching event to occur if the arm extends out in front of the user, but there is no biomechanical limitation that prevents face touching when the arm extends in a different direction, for example, to the side of the user. Angle F is generally indicative of the cumulative effect of the amount of shoulder flexion/extension and the amount of elbow flexion/extension on the orientation of the forearm.

Figure 21A:
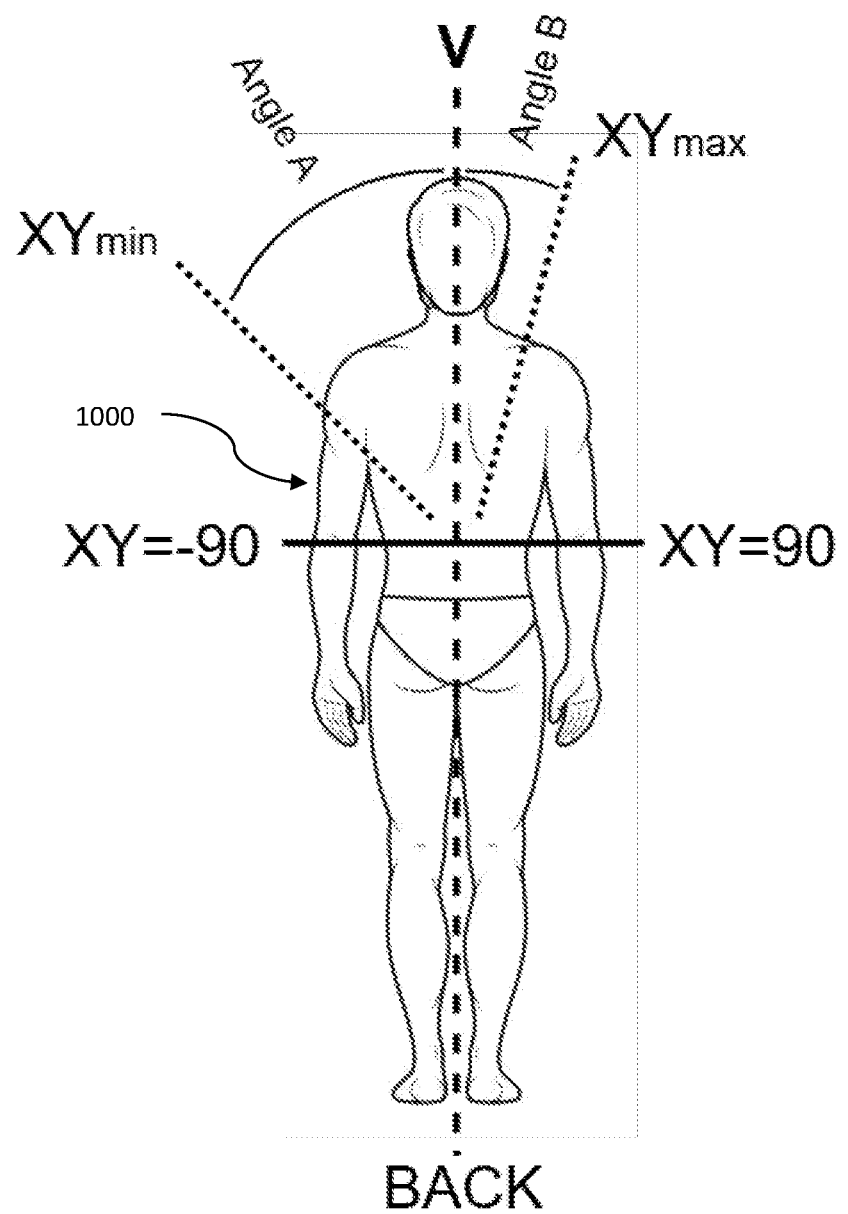
FIG. 21A is a rear view of a user's body showing predetermined threshold(s) defined in the frontal plane according to one form of the present technology.

There will also be another angle (not shown in FIG. 2A but see FIG. 21A) that is indicative of the amount of internal/external rotation of the arm, i.e. the rotation of the forearm around an axis longitudinally through the upper arm. This angle may be an angle between the forearm and a vertical plane in which lies the upper arm of the same arm. When the arm is held directly out in front of the user, this angle is the angle of the forearm relative to the sagittal plane (since in that orientation the upper arm lies in the sagittal plane), i.e. the angle that a projection of the forearm onto the frontal plane makes with the sagittal plane (e.g. angles A or B as shown in FIG. 21A).

In preferred forms, the second sensor 2104 is in the form of an accelerometer 2105. In the example illustrated in FIG. 2, the sensor unit 2100A comprises the accelerometer 2105. The second sensor 2104, when used to measure an orientation of the user's forearm, is located on the user's forearm 1106, for example mounted on the second section 2302b. In certain forms, the second sensor 2104 is positioned on the anterior antebrachial region of the user's arm 1100, i.e. the side of the forearm on the same side as the cubital fossa. In other forms, the second sensor 2104 is positioned on a lateral, medial or posterior antebrachial region of the user's arm 1100. For example, the second sensor 2104 may be co-located with, or positioned close to, the first sensor 2102. In certain forms, the second sensor 2104 and the first sensor 2102 are provided in the same sensor unit 2100A.

Figure 13A:
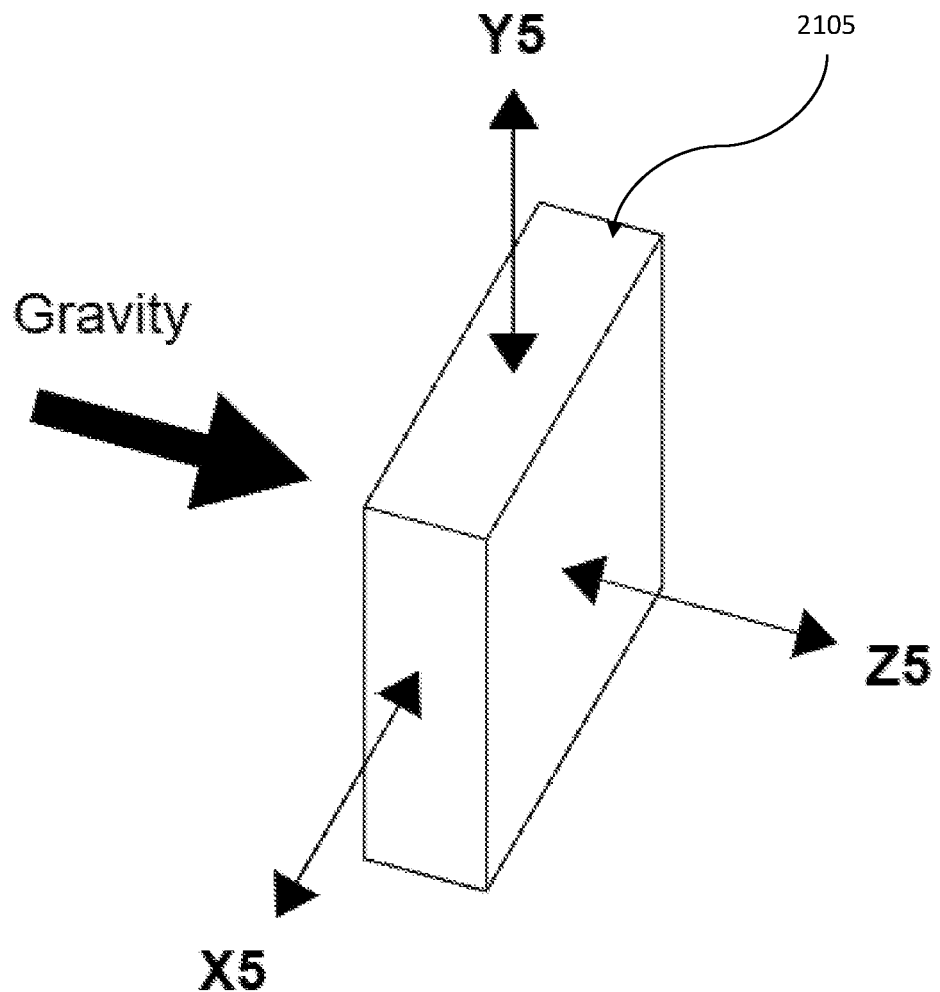
FIG. 13A is a perspective view of an exemplary second sensor in the form of an accelerometer.
Figure 13B:
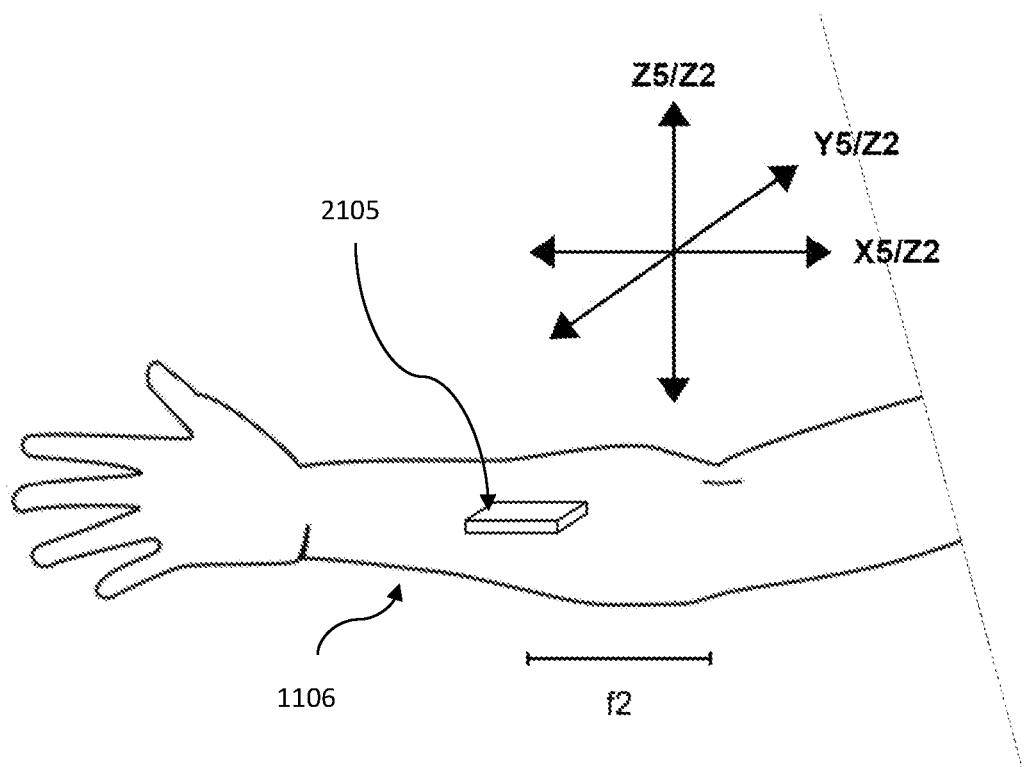
FIG. 13B is a perspective view of the accelerometer of FIG. 13A arranged on a user's arm.

As illustrated in FIG. 13A, the accelerometer 2105 defines one or more axes, for example three perpendicular axes, one axis in each of the mutually perpendicular directions in which it measures acceleration: X5, Y5 and Z5. Referring to FIG. 13B, the wearable device 2300 may be configured so that, when worn, the accelerometer 2105 is orientated relative to the user's forearm 1106 such that the respective X, Y and Z axes are orientated parallel to each other. In other forms of the technology, the axes defined by the accelerometer may be orientated in directions that are not parallel to the axes X2, Y2 and Z2 relative to the forearm 1006 as defined above. The accelerometer 2105 may be configured to measure acceleration of the accelerometer 2105 along each of X5, Y5 and Z5 axes. The accelerometer 2105 may further be configured to generate one or more sensor signals indicative of the acceleration of the accelerometer 2105 along each of X5, Y5 and Z5.

The accelerations measured by the accelerometer 2105 may be used to indicate an orientation of the accelerometer 2105 by using the direction of the Earth's gravitational field as a proxy for the vertical axis of the body. The accelerations may be used as a parameter from which the processor may determine the orientation of the user's forearm as will be explained in more detail below.

Using the direction of the Earth's gravitational field, as detected by the accelerometer 2105, as a proxy for the vertical axis of the body assumes that the user's body is upright. Forms of the technology which apply this assumption are unable to determine face touching when the user's body is not upright, since the system has no knowledge of the orientation of any part of the user's body other than their arm. To address this, in certain forms of the technology, the system 2000 comprises a head/torso orientation sensor mounted on the user's torso or head. The head/torso orientation sensor is configured to measure an orientation of the sensor relative to the Earth's gravitational field and to send sensor signals indicative of that orientation directly or indirectly to processor 2200. It will be described later how these sensor signals may be used to determine face touching when the body is not upright.

In other forms of the technology the second sensor 2104 may comprise a gyroscope or other device configured to detect the orientation of part(s) of the user's arm. The gyroscope may be mounted to the part of the user's arm for which the orientation is to be detected, for example the forearm.

In certain forms, the gyroscope may be configured to sense the rotation of the gyroscope relative to a reference orientation. In one form, the reference orientation of the gyroscope may be determined through a calibration process. For example, an input may be provided to the processor 2200 when the user's arm is held in a certain position, for example straight up, straight down, horizontally out in front, or horizontally out to the side. The processor 2200 may use this input to determine what signals from the gyroscope correspond to the reference orientation, allowing subsequent orientations to be determined in relation to the reference orientation.

In another form, the second sensor 2104 may comprise both a gyroscope and an accelerometer in fixed orientation to each other, for example housed in the same unit. In this form, the accelerometer may be used to provide the reference orientation to the gyroscope. For example, the accelerometer may be able to sense the direction of the force of gravity to provide a reference to the gyroscope to enable the sensing of movement in relation to that direction. For example, the accelerometer and gyroscope may both be configured to send sensor signals to the processor 2200, which compares the signals from the accelerometer to the signals from the gyroscope and determines the orientation of the gyroscope accordingly, and consequently the orientation of the part of the arm to which the gyroscope/accelerometer unit is mounted.

5.5. Computing System & Processor

Figure 14:
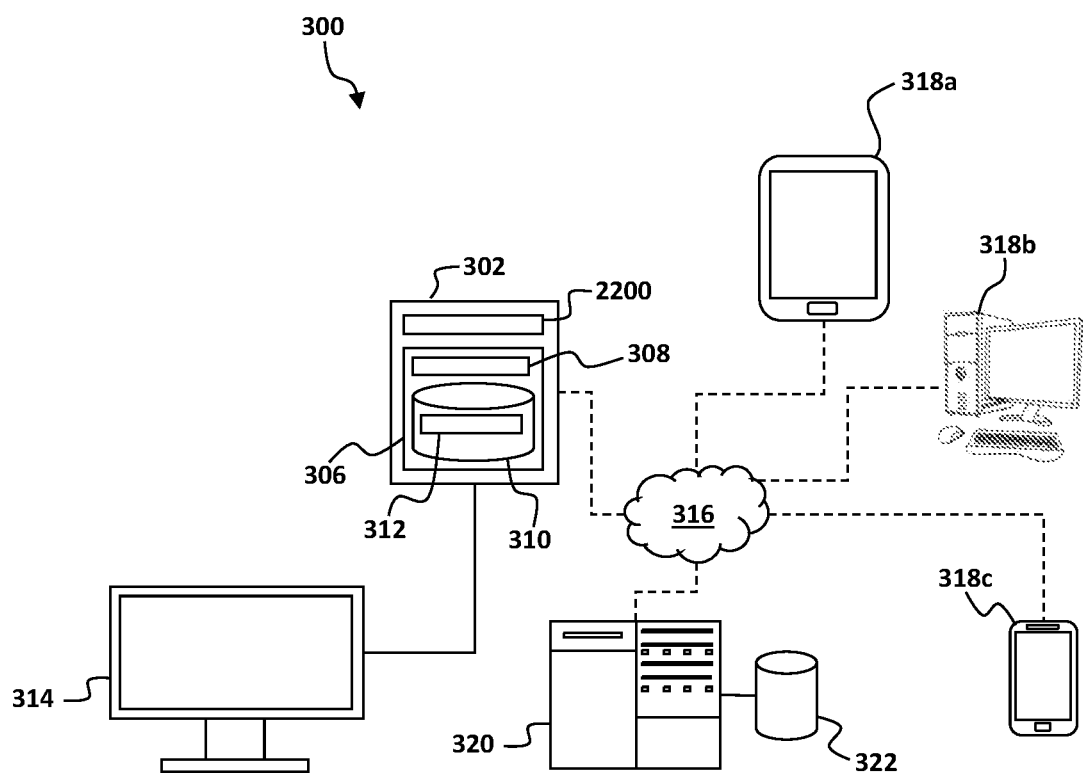
FIG. 14 is a schematic illustration of a computer system according to an aspect of the present disclosure.

With reference to FIG. 14, an exemplary computing system 300 used in certain forms of the technology for analysis of signals provided by the wearable device 2300 is shown. The system 300 comprises a hardware platform 302 that manages the collection and processing of sensor signals from the one or more of the sensors 2100 which have been described in more detail herein. The hardware platform 302 has a processor 2200, memory 306, and other components typically present in such computing devices. The hardware platform 302 may be local to the sensors 2100, for example provided the sensor unit 2100A. In one form of the technology, the memory 306 stores information accessible by processor 2200, the information including instructions that may be executed by the processor 2200 and information from signals 310 that may be retrieved, manipulated or stored by the processor 2200. The memory 306 may be of any suitable means known in the art, capable of storing information in a manner accessible by the processor 2200, including a computer-readable medium, or other medium that stores signals that may be read with the aid of an electronic device.

The processor 2200 may be any suitable processing device known to a person skilled in the art. Although the processor 2200 and memory 306 are illustrated as being within a single unit, it should be appreciated that this is not intended to be limiting, and that the functionality of each as herein described may be performed by multiple processors and memories, that may or may not be remote from each other or from the system 300. The instructions may include any set of instructions suitable for execution by the processor 2200. For example, the instructions may be stored as computer code on the computer-readable medium. The instructions may be stored in any suitable computer language or format. Signals 310 may be retrieved, stored or modified by processor 2200 in accordance with the instructions. The signals 310 may also be formatted in any suitable computer readable format. Again, while the signals are illustrated as being contained at a single location, it should be appreciated that this is not intended to be limiting—the signals may be stored in multiple memories or locations. The signals 310 may also include a record 312 of control routines for aspects of the system 300.

In some embodiments, the hardware platform 302 may communicate with a display device 314 to display the results of processing of the signals. The hardware platform 302 may communicate over a network 316 with user devices 318 (for example, a tablet computer 318a, a personal computer 318b, a smartphone 318c, or a smart watch (not shown)), or one or more server devices 320 having associated memory 322 for the storage and processing of signals collected by the local hardware platform 302. It should be appreciated that the server 320 and memory 322 may take any suitable form known in the art, for example a "cloud-based" distributed server architecture. The network 316 may comprise various configurations and protocols including the Internet, intranets, virtual private networks, wide area networks, local networks, private networks using communication protocols proprietary to one or more companies, whether wired or wireless, or a combination thereof.

In order for processor 2200 to analyse the arm event detected by sensors 2100 to determine whether the arm event is indicative of face touching, sensor signals are sent from the sensors 2100 to the processor 2200. Any suitable data transmission protocol may be used, including wired or wireless transmission, and over a communications network, for example the Internet.

The wearable device 2300 may comprise the processor 2200, for example the processor 2200 is provided to the sensor unit 2100A. As described above, in some forms the processor 2200 or a part of the processor 2200 may be located remote to the wearable device 2300. It is to be appreciated that processing steps carried out by the processor 2200 as described herein may at least in part be carried out by one or more processors physically co-located with of one or more of the sensors 2100, for example the first sensor 2102 and second sensor 2104 may each be physically co-located with a processor configured to carry out at some of the processing. These processors may be in communication with a further processor (local or remote to the wearable device) which is configured to carry out other processing steps. Together the processors physically co-located with the sensor(s) and the further processor may comprise the functional processor 2200.

In some forms, operation of the wearable device 2300 may be controlled by a remote device such as tablet computer 318a, personal computer 318b and/or smartphone 318c. Additionally, or alternatively, one or more remote devices may provide additional functionality to functionality provided on the wearable device 2300 itself. In certain forms, the remote device may be configured to run a software application that enables any one or more of the following:

- Tracking of the status and/or performance of the wearable device 2300, e.g. on/off status, battery and hardware status.
- Tracking activity (identified face touching events), and provision of data to a central data repository where data from multiple users may be collated. Such data may be suitably anonymised or summarised.
- Presenting the user with an interface to enable adjustment of settings of the wearable device 2300, for example the sensitivity of the system.
- Presenting the user with information to enable execution of a calibration process to enable the user to recalibrate the system 2000 to conform to their body shape and movements.
- Software and setting updates and refinements.
- Presenting the user with summary information of their face touching behaviour performance.
- Presenting information and collecting input enabling the gamification of face touching.
- Presenting the user with reminders and warnings related to operation and/or use of the system 2000 or any part thereof.

5.6. Operation of the Processor 5.6.1. Calculation of Value(s) Indicative of Relative Position/Orientation of Part(s) of the User's Arm In certain forms of the technology the processor 2200 is configured to calculate a value indicative of the relative position and/or orientation of the part(s) of the user's arm using the parameters measured by the first sensor 2102, for example the position/orientation of the user's forearm 1106 relative to the user's upper arm 1104, for example the angle at the user's elbow. In one exemplary form, the processor 2200 is configured to determine the relative position of the user's forearm 1106 relative to the user's upper arm 1104 by determining the magnetic field strength measured by the magnetometer 2103 along any one or more of the X1, Y1, and Z1 axes as explained in the following paragraphs. In an alternative form, the processor 2200 may alternatively or additionally be configured to determine the relative position of the user's forearm 1106 relative to the user's upper arm 1104, e.g. the angle at the elbow, from the direction of the magnetic field detected by the magnetometer 2103. The direction of the magnetic field may indicate the position and/or angle of the magnetometer 2103 relative to the magnet 2104.

Figure 15A:
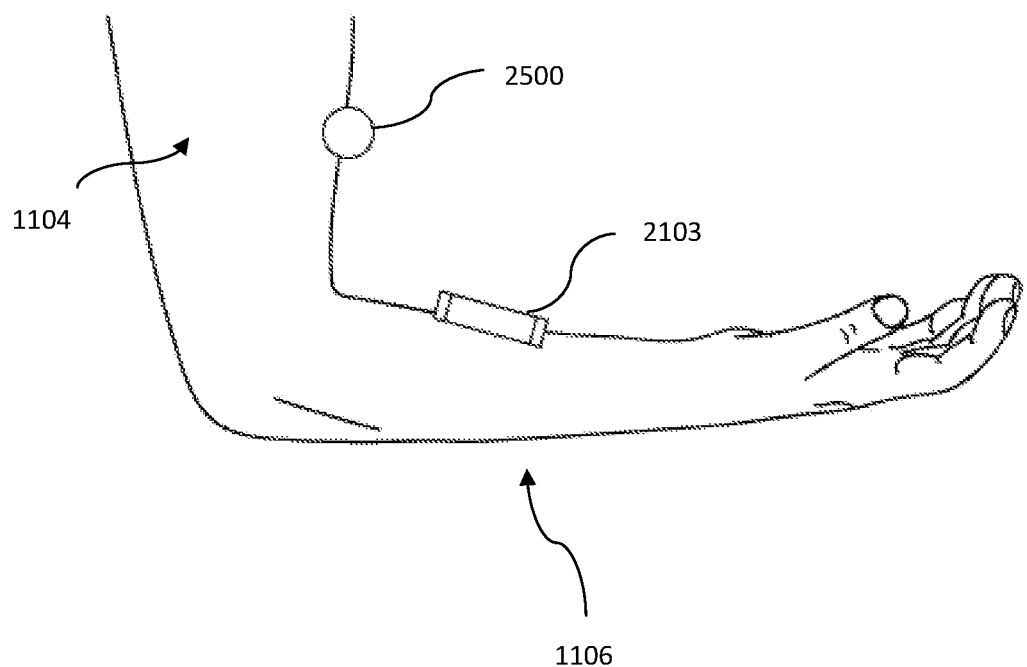
FIG. 15A is a side view of a magnetometer and magnet arrangement according to one form of the present technology, showing a relatively co-linear arrangement on the user's arm.
Figure 15B:
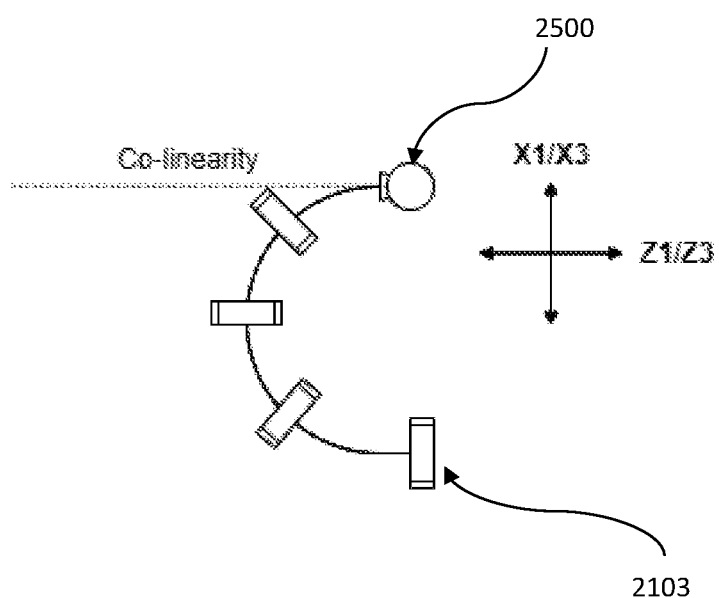
FIG. 15B is a schematic illustration of the movement of the magnetometer relative to the magnet towards the co-linear arrangement of FIG. 15A.

When a user 1000 wearing a wearable device 2300 according to certain forms of the technology, for example as shown in FIG. 2, flexes their elbow 1102, the distance between the magnetometer 2103 and magnet 2500 decreases and the angle between them changes. Referring to FIGS. 15A and 15B, when the user 1000 bends his/her elbow it causes the magnetometer 2103 to follow a curved path in relation to the magnetic field of the magnet 2500. The system 2000 in some forms may be configured to detect when the magnet 2500 and magnetometer 2103 come into close proximity to each other (i.e. the elbow is greatly flexed). It may be assumed that, for small distances of separation between the magnet 2500 and magnetometer 2103, they are oriented with their axes substantially parallel and with the magnetometer 2103 moving along an axis of the magnet 2500 (e.g. the Z axis) so that there is a proportional relationship between distance along that axis and magnetic field strength. In certain forms of the technology, the processor 2200 is configured to operate based on this assumption.

There may be several variables relating to the configuration of the wearable device 2300 which affect the ability of the magnetometer 2103 and magnet 2500 to measure the relative position of the upper arm 1104 and forearm 1106, and consequently the angle of the elbow 1102. Referring again to FIGS. 5A and 5B, these variables include the distances f1 and f2, r1 and r2, and the rotation of the magnet in any direction about Z3.

Figure 16A:
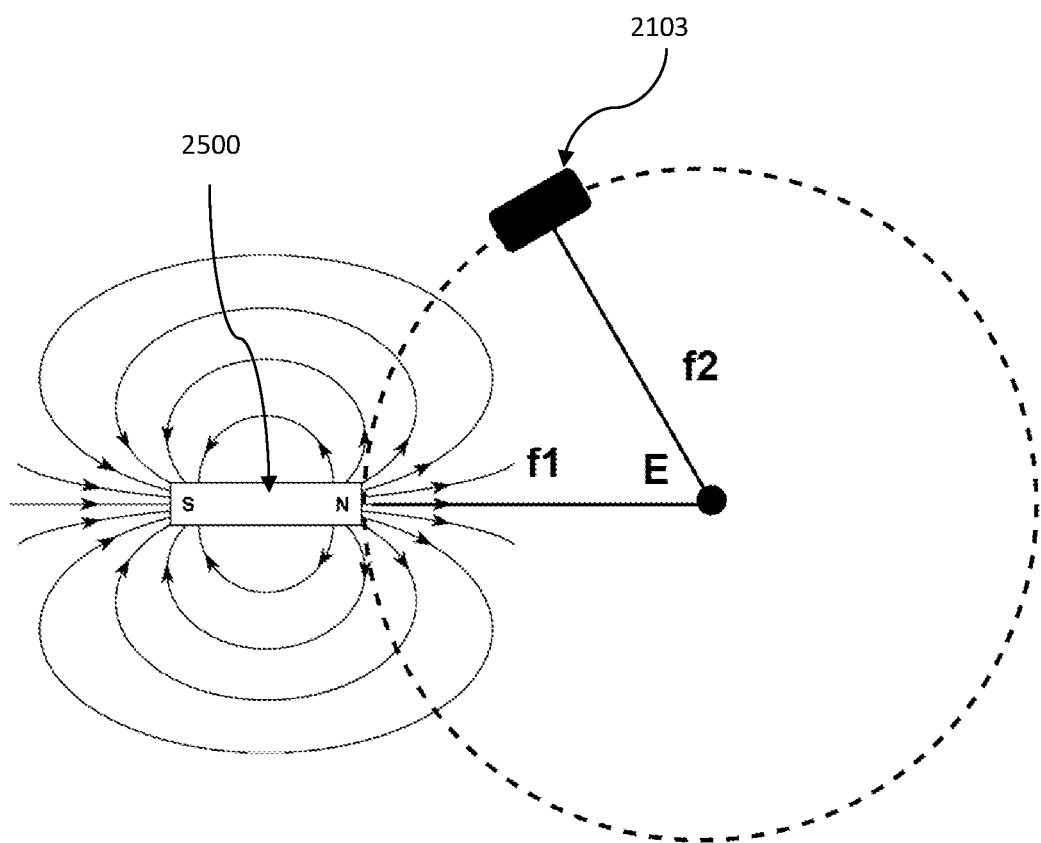
FIG. 16A is a schematic illustration showing an exemplary path in space of the magnetometer through the magnetic field generated by the magnet for a wearable device according to one form of the present technology.

FIG. 16A is a schematic illustration showing an exemplary path in space of the magnetometer 2103 through the magnetic field generated by the magnet 2500 for a wearable device 2300 according to one form of the present technology. FIG. 16A shows that, as the user's elbow 1102 flexes, the magnetometer 2103 defines a path in space through the magnetic field generated by the magnet 2500 that is a close approximation to an arc of a circle, wherein E is the angle at the elbow, f1 is the distance between the centre of the circular path and the centre of the magnet 2500, i.e. the distance from the antecubital joint 1102a to the centre of the magnet 2500, and f2 is the radius of the circular path, i.e. the distance from the antecubital joint 1102a to the centre of the magnetometer 2103. The placement of the magnetometer 2103 relative to the magnet 2500 determines the path of the arc through the magnetic field. Therefore, the properties of the magnet 2500 used in the wearable device 2300 and the arrangement of the magnetometer 2103 and the magnet 2500 on the arm 1100 are all factors which effect the detection of the elbow angle and consequently the detection of face touching. The magnet 2500 and magnetometer 2103 may be arranged to increase sensitivity to arm movement related to elbow flexion, and reduce sensitivity to misalignment or other variables which influence the detection of elbow flexion.

In use, the magnetometer 2103 and magnet 2500 may be susceptible to misalignment and this may affect the accuracy of the relative position of the forearm 1106 and upper arm 1104 determined by the processor from the measured parameter(s) of the magnetic field (e.g. strength and/or direction). This accuracy may be affected, for example because referring to FIG. 7 the magnetometer 2103 may not be able to differentiate between a low magnetic field strength measured along Z1 caused by the distance of the magnet 2500 from the magnetometer 2103 in the X direction, and a low magnetic field strength measured along Z1 because the magnetometer 2103 and magnet 2500 are misaligned (i.e. offset in the Y and/or Z directions). This misalignment could be caused, for example, when the sections 2302a, 2302b of the wearable device 2300 move relative to each other and/or relative to the user's arm 1100, e.g. when the sleeve 2302 twists on the user's arms.

Figures 17A, 17B, 17C, 17D:
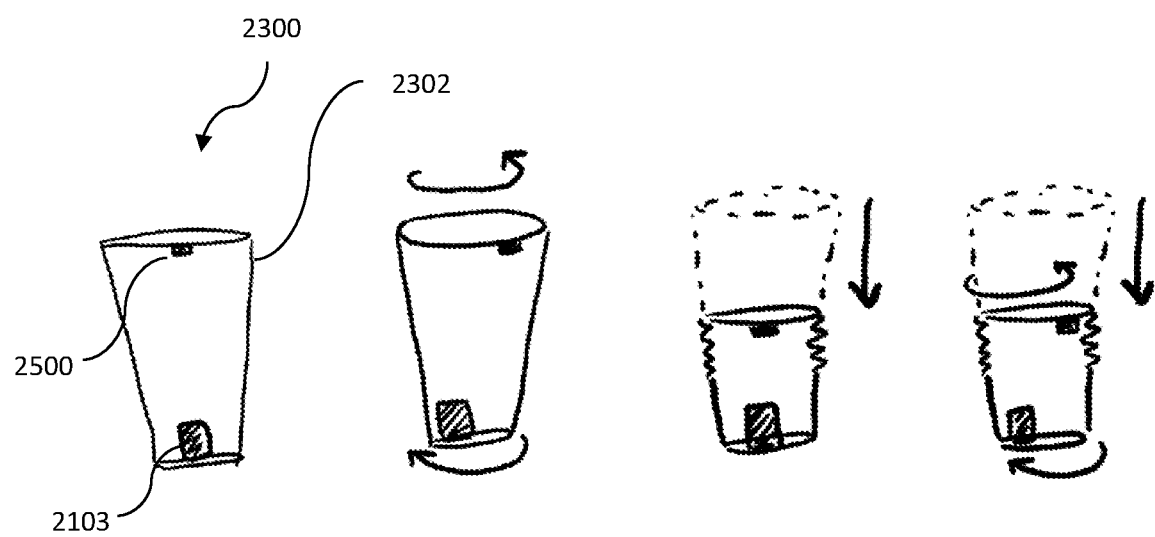
FIGS. 17A to 17D are perspective views of the wearable device according to a form of the technology showing the magnetometer and magnet in various aligned and misaligned positions.

FIGS. 17A to 17D are perspective views of the wearable device 2300 according to a form of the technology showing the magnetometer and magnet in various aligned and misaligned positions. FIG. 17A shows the magnetometer 2103 and magnet 2500 mounted on the sleeve 2302 in an aligned state when there is no elbow flex. When aligned, r1 and r2 are the same, e.g. both distances may be 0. In the no-flex state shown in FIG. 17A, the X, Y and Z axes of the magnetometer 2103 and magnet 2500 are parallel to each other and the X axes substantially align.

FIGS. 17B to 17D show the misalignment to the wearable device 2300 that may be caused when the first section 2302a of the sleeve 2302 is displaced in an inferior direction along the user's arm 1100, and/or the sleeve 2302 is twisted or rotated. FIG. 17B illustrates one possible misalignment of the magnetometer 2103 and magnet 2500 when the wearable device 2300 is in the no-flex state. As illustrated, r1 and r2 are not equal and the Y and Z axes of the magnetometer 2103 and magnet 2500 are not respectively parallel to each other. FIG. 17C again illustrates a no-flex state of the wearable device 2300, but shows that the magnetometer 2103 and magnet 2500 are misaligned as f1 is not equal to f2 because the section 2302a of the wearable device 2300 on which is mounted the magnet 2500 has shortened, e.g. by crumping. FIG. 17D illustrates another no-flex state of the wearable device 2300, but shows that the magnetometer 2103 and magnet 2500 are misaligned as f1 is not equal to f2, and r1 is not equal to r2, i.e. both shortening of one section and twisting has occurred.

Figure 12:
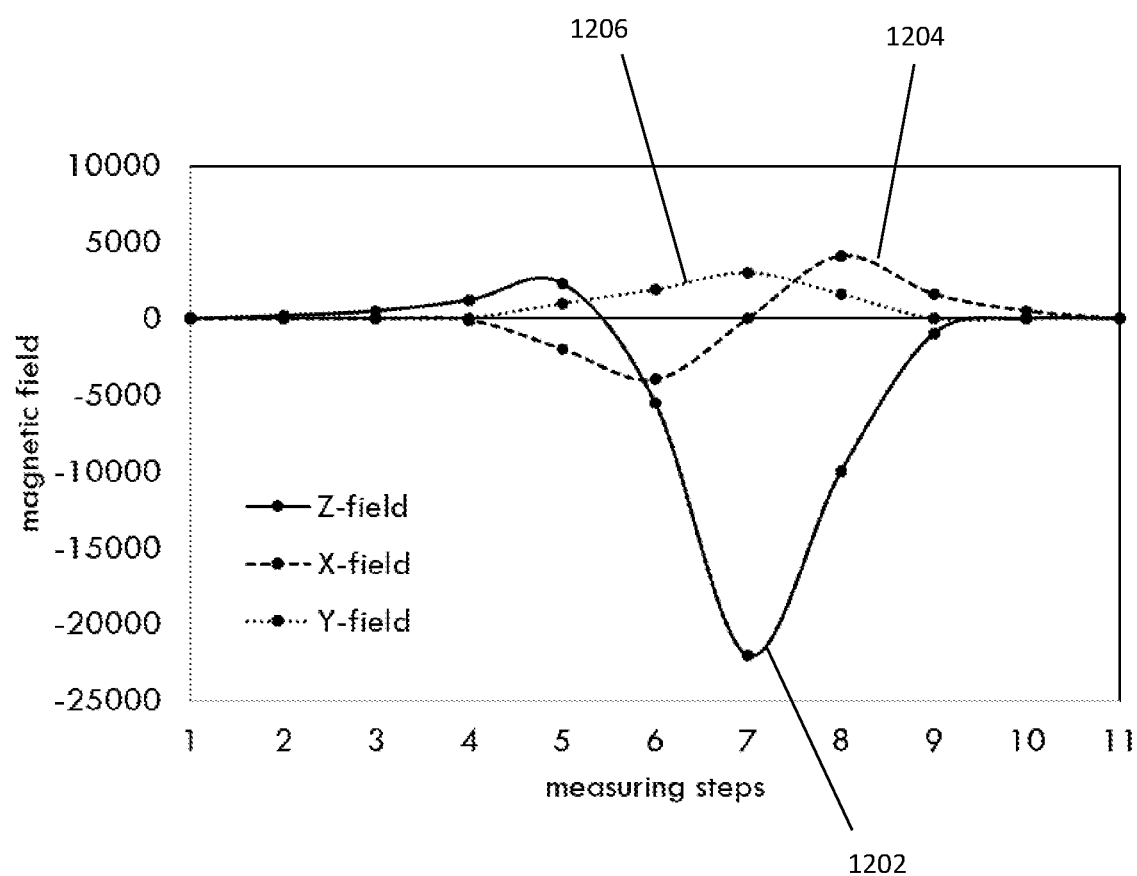
FIG. 12 is an exemplary graph of magnetic field strength measured by the magnetometer for each of a number of measuring steps as a magnetometer 2103 is moved through the magnetic field of a magnet 2500.

FIG. 12 is an exemplary graph of magnetic field strength measured by the magnetometer for each of a number of measuring steps as a magnetometer 2103 is moved through the magnetic field of a magnet 2500. The magnetometer 2103 is generally moved as shown in FIG. 10 but there is misalignment of the magnetometer 2103 in the Y direction (i.e. into/out of the page) from the magnet 2500. Line 1202 is the magnetic field strength in the Z direction, line 1204 is the magnetic field strength in the X direction and line 1206 is the magnetic field strength in the Y direction. Line 1206 indicates misalignment in the Y direction because, if the magnetometer 2103 was aligned with the magnet 2500 in this direction the magnetic field strength in this direction would be zero throughout the movement of the magnetometer 2103 shown in FIG. 10. Consequently misalignment of the wearable device 2300 may cause variations in the magnetic field strength detected by the magnetometer 2103 in one or more directions from what is expected as the elbow bends and straightens. In certain forms of the technology the risk of misalignment leading to an inaccurate determination of face touching may be mitigated as will now be explained.

In certain forms, the processor 2200 may be configured to operate in a manner that increases sensitivity to elbow flexion within a particular range of angles, e.g. between 20 to 40°, while reducing sensitivity to expected misalignment. Typical values of misalignment for a wearable device 2300 according to certain forms of the technology may be in the region of 5-10 mm, e.g. approximately 8 mm, or less in r1, f1, r2 and f2.

The dimensions of the body portion 2302 and the location of the sensors 2100 also help reduce the sensitivity of the wearable device 2300 to misalignment. For example, the length of the sleeve 2302 may be short enough to allow the wearable device 2300 to be relatively small and discreet but long enough such that it reduces the effect of misalignment between the magnetometer 2103 and magnet 2500. In some forms the length of the sleeve 2302 may be between 5 mm to 20 mm greater than the combined length of f1 and f2, for example 145 mm-160 mm in the case that f1=f2=70 mm.

To account for potential misalignment, the processor 2200 in certain forms may be configured to calculate an adjusted magnetic field strength using adjusted parameters which are indicative of magnetic field strength along one or more directions, for example one or more of the three mutually perpendicular axes given in the examples, for example X1 and Y1. The adjusted magnetic field strength may be used as the value indicative of the angle at the user's elbow. The adjusted magnetic field strength may be calculated by applying a gain to the magnetic field strength component measured in one or more directions. In one example, the processor is configured to calculate the adjusted magnetic field strength using the following formula:

$$z+f*x+g*y;$$

where x, y, z are the magnetic field strength components measured along each of the X1, Y1, and Z1 axes, and f, g is a gain on x and y so that f*x and g*y represent adjusted magnetic field strength values. In certain forms the value of the gain may be between 3 and 8, for example 5. In some forms, f and g are the same value. In other forms, f and g may be different values. The values may be selected for any configuration of wearable device 2300 to reflect one or more of the expected differences between r1 and r2, the expected differences between f1 and f2, and the magnetic field variation in one or more directions due to the shape or other properties of the magnet 2500.

As the magnet 2500 and magnetometer 2103 become misaligned, x and y increase compared to their values when there is no misalignment. Therefore by multiplying x and y by the gain and using the adjusted figures to calculate the magnetic field strength it is possible to improve tolerance for misalignment.

As stated above, in an alternative form, the processor 2200 may be configured to determine the relative position of the user's forearm 1106 relative to the user's upper arm 1104, e.g. the angle at the elbow, from the direction of the magnetic field detected by the magnetometer 2103. In such forms, for example, the example when the magnet 2500 is located at b1 and the magnetometer is located at a3 in FIG. 5C, the relative distance between magnet 2500 and magnetometer 2103 may not change significantly as the user flexes their elbow.

Figure 16B:
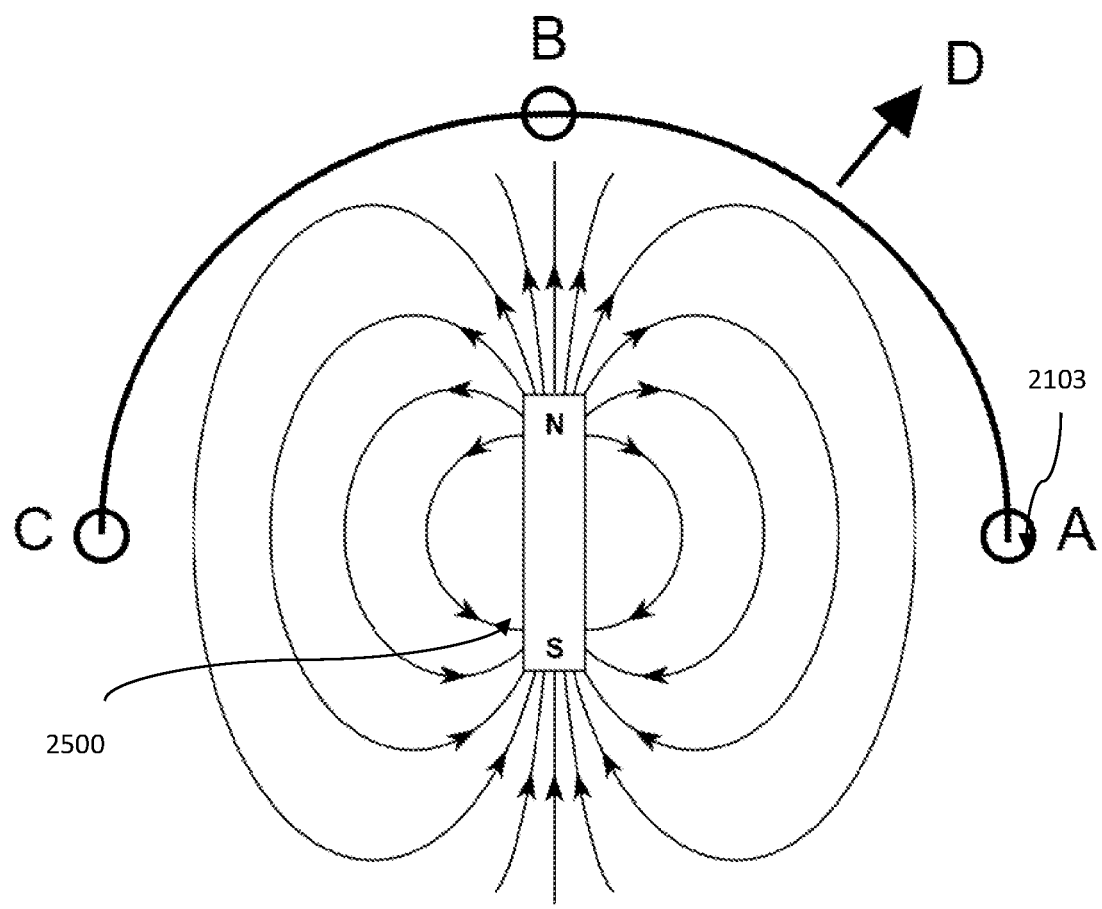
FIG. 16B is a schematic illustration showing an exemplary path in space of the magnetometer through the magnetic field generated by the magnet for a wearable device according to one form of the present technology.

FIG. 16B is a schematic illustration showing an exemplary path in space of the magnetometer 2103 through the magnetic field generated by the magnet 2500 for a wearable device 2300 according to one form of the present technology. The arrangement in FIG. 16B may be indicative of the form of the present technology which has been described with reference to FIG. 5C with the magnet 2500 located at b1 and the magnetometer located at a3. FIG. 16B shows that, as the user's elbow 1102 flexes from an extended position, where magnetometer 2103 is in position A, to a closed or flexed position, where the magnetometer 2103 is in position C, the magnetometer 2103 defines a curved path in space through the magnetic field generated by the magnet 2500 that may be approximated as a substantially circular arc. It can also be seen from FIG. 16B that the direction of the magnetic field varies along the curved path between A and C so that the direction of the magnetic field can be used to indicate where on the curved path the magnetometer 2103 is positioned. From this, the angle at the user's elbow can be determined.

This arrangement may be less sensitive to misalignment of the magnet 2500 and magnetometer 2103 from the anterior line, e.g. having different values of r1 and r2 as per FIG. 5G, because the magnetic field direction may not significantly changed when the magnet 2500 and magnetometer 2103 become misaligned in this way. This arrangement may also, or alternatively, be less sensitive to misalignment of the magnet 2500 and magnetometer 2103 from their intended positions from the antecubital joint 1102a of the user's elbow 1102 (i.e. the intended values of f1 and f2 as per FIG. 5G). Such misalignment is represented in FIG. 16B by movement of the magnetometer 2103 in the direction D as indicated by the arrow. However, since this movement is generally in substantially the same direction as the direction of the magnetic field (or opposite to that direction for a movement in the direction negative D), the magnetic field direction measured by the magnetometer 2103 may not change significantly when this type of misalignment occurs.

In alternative forms, the wearable device 2300 may comprise a plurality of magnets 2500, for example a plurality of magnets 2500 arranged in an array. In the array, the magnets may be arranged so that they are aligned along an axis and/or aligned in a plane. A plurality of magnets 2500, for example when so arranged, may generate a magnetic field that is less vulnerable to misalignment. For example, such an arrangement of magnets may provide a magnetic field with a larger relatively homogenous field region compared to the magnetic field of a single magnet. This may lessen the variation in a parameter of the magnetic field measured by the magnetometer 2103 when the arrangement is misaligned, for example the arrangement is moved in up or down the user's upper arm 1104 (i.e. f1 changes) and/or moved around the upper arm 1104 (i.e. r1 changes), compared to the magnetic field measured by the magnetometer 2103 when there is no such misalignment.

5.6.2. Calculation of Value(s) Indicative of Orientation of Part(s) of the User's Arm with Respect to Gravity In certain forms of the technology the processor 2200 is configured to calculate one or more values indicative of the orientation of part of the user's arm using the parameter(s) measured by the second sensor 2104, for example the orientation of the part(s) of the user's arm 1100. For example, the value(s) calculated by the processor may be indicative of the orientation of the user's forearm 1106.

In certain forms of the technology, for example where the second sensor 2104 is an accelerometer, the orientation of the user's arm 1100 (e.g. forearm 1106) that is calculated may be an orientation of the arm with respect to the direction of the Earth's gravitational field. In certain forms of the technology, it is assumed that the user's upper body is in an upright position so that the direction of the Earth's gravitational field, as detected by the accelerometer 2105, may be used as a proxy for the vertical axis of the body.

One example of a value indicative of the orientation of the user's forearm 1106 is the angle between the forearm and the vertical axis of the body, i.e. the line of intersection between the mid-sagittal plane and the frontal (or coronal) plane. When the arm extends out in front of the user, this is the angle between the forearm and the frontal plane, i.e. angle between the forearm and the vertical when viewed from a viewpoint that is perpendicular to the sagittal plane of the user (and when the user's upper body is upright).

Another example of a value indicative of the orientation of the user's forearm 1106 is the angle between the forearm and a vertical plane in which lies the upper arm of the same arm. When the arm is held directly out in front of the user, this is the angle of the forearm relative to the sagittal plane when viewed from a viewpoint that is perpendicular to the frontal plane of the user when the user is in an upright position (and when the user's upper body is upright).

It will be appreciated that, although the above examples of values indicative of the orientation of the user's forearm are angles relative to certain vertical planes and/or axes, in other forms the angle(s) may be indicative of the orientation of the user's forearm 1106 relative to certain horizontal planes and/or axes.

The processor 2200 may be configured to calculate an acceleration vector using the acceleration measured by the accelerometer 2105 in each of the three directions, e.g. along each of the X5, Y5 and Z5 axes. The processor 2200 may use the acceleration vector to calculate the orientation of the accelerometer 2105 relative to the earth's gravitational field. The orientation of the accelerometer 2105 relative to the earth's gravitational field may be used as a proxy for the orientation of the user's forearm 1106 relative to the vertical axis of the user's body. This assumption holds if the user's upper body is upright, or approximately so.

Figure 18:
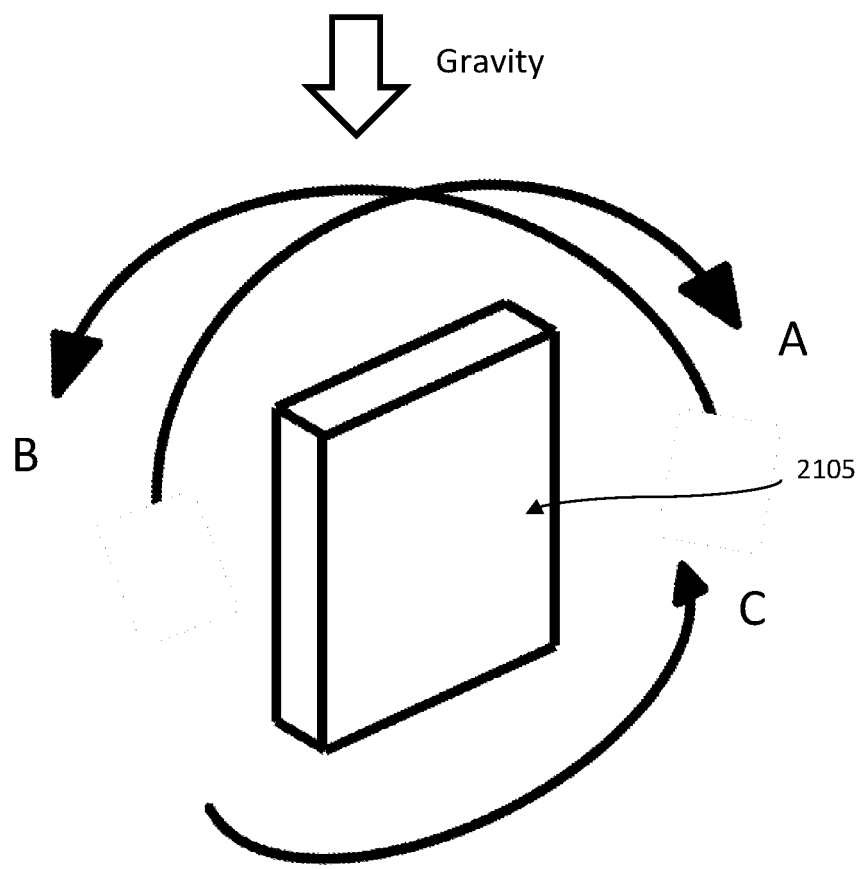
FIG. 18 is a perspective view of the accelerometer of FIG. 13A, showing various rotational movements relative to gravity.

At the typical speeds at which the user's 1100 arm is moved, the acceleration vector is dominated by the acceleration due to gravity which measures 1 g. Referring to FIG. 18, when the accelerometer 2105 is rotated in one or more of directions A and B (e.g. rotated about X5 or Y5), it can measure the acceleration in the axes which are then used to calculate the acceleration vector which determines the accelerometer's orientation. When the accelerometer 2105 is rotated in the direction of C (e.g. rotated about Z5, which, if the accelerometer is suitably oriented, may also be the axis in the direction of gravity), it cannot measure the acceleration in the axes and therefore the accelerometer's angle(s) cannot be determined. This property of the accelerometer 2105 may mean that the wearable device 2300 comprising the accelerometer 2105 as a second sensor 2104 may not be able to determine and differentiate between when the user's arm 1100 is in front of him/her or to his/her side, e.g. between when the user 1000 is standing upright and the user's arm 1100 is substantially horizontal and extending forward of the user 1000 and is substantially horizontal and to the side of the user 1000. However, it has been observed that arm actions when the arm 1100 is to the side are not common. Furthermore, it has been observed that arm events involving elbow flexion which occur out to the side of the user 1000 are predominantly face touching events when they pass the predetermined thresholds which indicate face touching, as will be described below.

Figure 19:
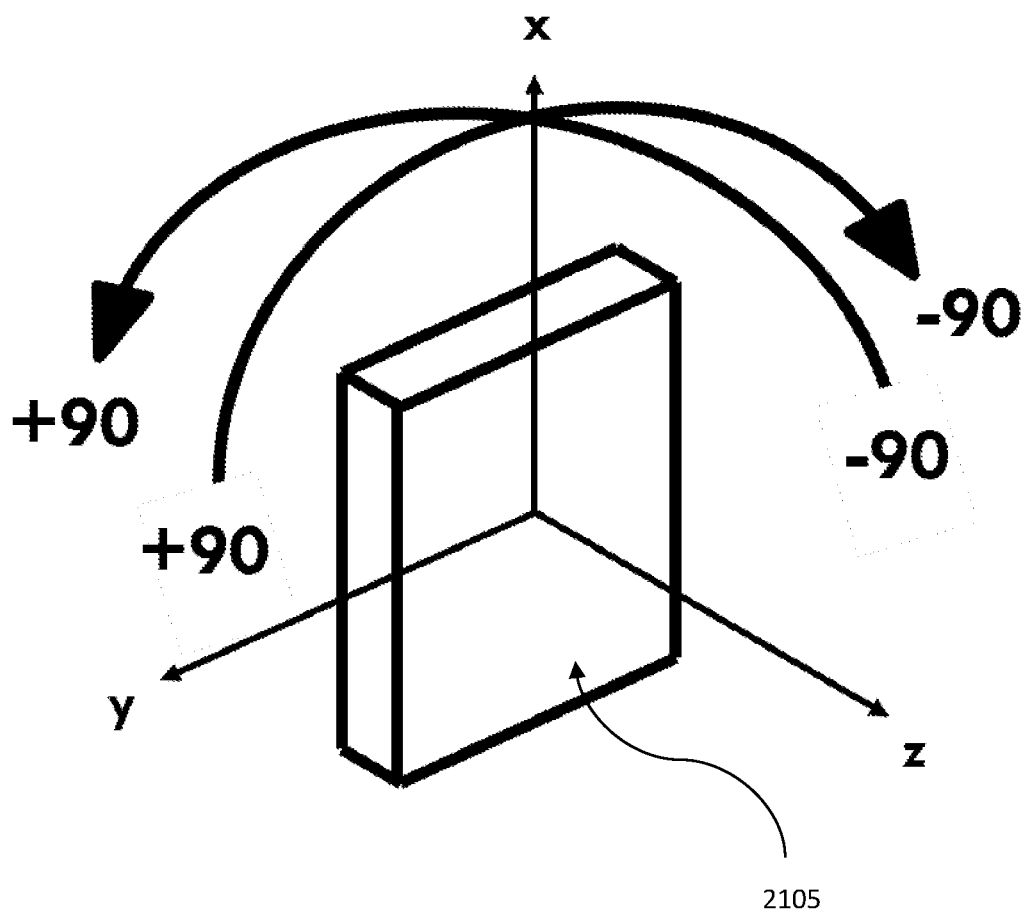
FIG. 19 is a perspective view of the accelerometer of FIG. 13A, wherein the axes of the accelerometer define a plurality of planes.

The axes of the accelerometer 2105 define a plurality of planes, for example mutually perpendicular planes, as shown in FIG. 19. The axes of X5 and Y5 define an XY plane and the axes X5 and Z5 define a XZ plane. The processor 2200 may be configured to calculate the accelerometer's angle in any one or more of the planes, for example in the XY plane (i.e. the degree of rotation around the z axis) and/or in the XZ plane (i.e. the degree of rotation around the y axis). When the accelerometer is positioned on the anterior side of the user's forearm 1106 with the axes of the accelerometer aligned with the axes of the forearm as illustrated in FIG. 13B, the accelerometer's angle in the XY plane is indicative of the amount of internal/external rotation of the arm, i.e. the accelerometer's angle in the XY plane is indicative of the angle between the forearm and a vertical plane in which lies the upper arm. In the same position, the accelerometer's angle in the XZ plane is indicative of the cumulative effect of shoulder flexion/extension and elbow flexion/extension, i.e. the accelerometer's angle in the XZ plane is indicative of the angle between the forearm and the vertical axis of the body.

In forms of the technology in which a head/torso orientation sensor forms part of system 2000 (as described above), the processor 2200 can determine the relative orientation of the user's arm to their head/torso by subtracting the orientation of the user's arm with respect to the direction of the Earth's gravitational field from the orientation of the user's head/torso with respect to the direction of the Earth's gravitational field.

5.6.3. Determination of an Arm Event Indicative of Face Touching

The processor 2200 is configured to determine the arm event is indicative of face touching by comparing one or more of the determined values to one or more predetermined thresholds. For the purposes of this specification, unless the context clearly requires otherwise, a predetermined threshold will be understood to mean a threshold that is determined prior to a processing step in which the processor uses the threshold. In certain forms of the technology a predetermined threshold may be manually provided to the processor 2200 or adjusted, and/or automatically determined or adjusted by the processor 2200. The predetermined thresholds may include one or more minimum thresholds and/or one or more maximum thresholds.

Alternatively, or additionally, the processor 2200 may be configured to determine the arm event is indicative of face touching by comparing one or more of the parameters measured by the sensors to one or more predetermined thresholds. Forms of the technology operate on the principle that certain measured parameters are proxies for positions of parts of the body, for example the magnetic field strength of a magnet on the upper arm as measured by a magnetometer on the lower arm is used as a proxy for the angle of bend at the elbow. In certain forms, the processor 2200 does not need to determine the anatomical value that is measured and to compare that to the threshold to determine whether face touching occurs. Instead, the measured parameter (e.g. magnetic field strength, in the example given) could be compared with a threshold without the processor converting that measurement into an anatomical measurement first. Therefore, where in the ensuing description a comparison to a threshold is described, it should be understood that this may include a comparison of the determined anatomical value to a threshold, or a comparison of the measured parameter used as a proxy for that determined anatomical value to a threshold, unless the context clearly requires otherwise.

In some forms, the processor 2200 is configured to determine that the arm event is indicative of face touching by independently comparing any one value to a predetermined threshold(s), e.g. the system 2000/wearable device 2300 is configured to determine face touching when only one of a plurality of requirements have been met. In other forms, the processor 2200 is configured to determine that the arm event is indicative of face touching by comparing each of a plurality of values to a respective predetermined threshold(s) and to determine face touching when a combination of requirements have been met. The combination may include more than one but not all of the requirements, or all of the requirements.

In the following description certain thresholds are provided by way of example. Some of the exemplary predetermined thresholds may be specific to whether the wearable device 2300 is sensing the position and/or orientation of part of a left or right arm of the user 1000. It will be apparent to the skilled addressee that some of the stated thresholds may need to be mirrored if the wearable device 2300 is worn, or configured to be worn, on the other arm. The exemplary forms illustrated and described herein should be understood to be for a wearable device 2300 worn on the right arm unless otherwise stated. In some forms, the predetermined thresholds for a left arm or a right arm are preconfigured on the wearable device 2300. In some forms a user may be able to interact with the processor 2200 to specify whether the wearable device 2300 is worn on the left or right arm, for example provide an input specifying 'left' or 'right' to a user device 318, and the processor 2200 alters its operation accordingly. In some forms, the wearable device 2300 may be configured to undergo a calibration procedure to determine whether the wearable device 2300 is being worn on the left or right arm, and consequently which specific predetermined thresholds the processor 2200 should apply. This may be achieved using one or more calibration steps which are described below.

In another form, a calibration procedure to determine whether the wearable device 2300 is being worn on the left or right arm may involve the user 1000 being instructed to change the orientation of the wearable device 2300 and/or components of it during use. For example, during a calibration procedure, the user 1000 may be instructed to place the sensor unit 2100A in one orientation, perform an action (e.g. bend their elbow), and then to change the orientation of the sensor(s) 2100 by changing the orientation of the sensor unit 2100A before performing another action, for example the same action. In one such form, the orientation of the sensor unit 2100A is changed between the two positions, for example by rotating it 180° about an axis of the sensor unit 2100A which extends in the same direction as X2. During elbow flexion, in one configuration (e.g. right arm configured wearable device 2300) the magnetometer 2103 measures the change in the direction of the magnetic field in a first direction, e.g. clockwise. When changing the orientation as described above (e.g. to be used on the left arm), the magnetometer 2103 measures the change in the direction of the magnetic field in a second, opposite direction, e.g. counter clockwise. The change in the direction of the magnetic field in each configuration may therefore indicate on which arm the wearable device 2300 is being worn. Once this has been determined, after the calibration process, the wearable device 2300 may be configured to set the thresholds for determining a face touching event accordingly.

In another example of a calibration process, the user may be prompted to perform a certain series of actions, for example touching their face with their arm in certain positions. The processor 2200 may be configured to collect data from the sensors 2100 during this process, which data is used by the processor 2200 to determine any one or more thresholds used to determine the occurrence of a face touching event when the system 2000 is in 'detection' mode.

Information may be able to be exchanged between the user and system 2000 during a calibration process through user devices 318 (for example, tablet computer 318a, personal computer 318b and/or smartphone 318c)

In some forms, the user may be able to interact with the processor 2200 to alter any one or more of the thresholds used to detect a face touching event. For example, the user may be able to adjust a sensitivity of the system 2000 to detect a face touching event. The user may be presented with discrete sensitivity options (e.g. low, medium, high), a numerical indication of a sensitivity setting, or a graphical representation of a sensitivity scale (e.g. a sliding icon) and be able to input a desired sensitivity setting. Such a presentation and interaction between the user and the system 2000 may occur through an interface presented on a user device 318, such as a tablet computer 318a, personal computer 318b and/or smartphone 318c.

5.6.3.1. Detecting Relative Position/Orientation of Part(s) of the User's Arm to Determine Arm Event Indicative of Face Touching The processor 2200 may be configured to determine an arm event is indicative of face touching when the value(s) indicative of the relative position/orientation of the part(s) of the user's arm, or the measured parameter used as a proxy for the relative position/orientation of the part(s) of the user's arm, relative to another part of the user's body, pass(es) a predetermined threshold.

It has been described above that, in certain forms, a value indicative of the relative position of the user's forearm relative to their upper arm (i.e. the angle at the elbow) may be the adjusted magnetic field strength and/or magnetic field direction measured by a magnetometer 2103 comprised as part of the wearable device 2300. In some forms, an arm event indicative of face touching may be determined when the adjusted magnetic field strength and/or the magnetic field direction passes (i.e. exceeds) a predetermined threshold, since this indicates that the angle of the elbow has decreased to below an elbow angle that is determined to be indicative of face touching, where the predetermined threshold for the adjusted magnetic field strength and/or the magnetic field direction correlates to the elbow angle that is determined to be indicative of face touching.

Figure 20:
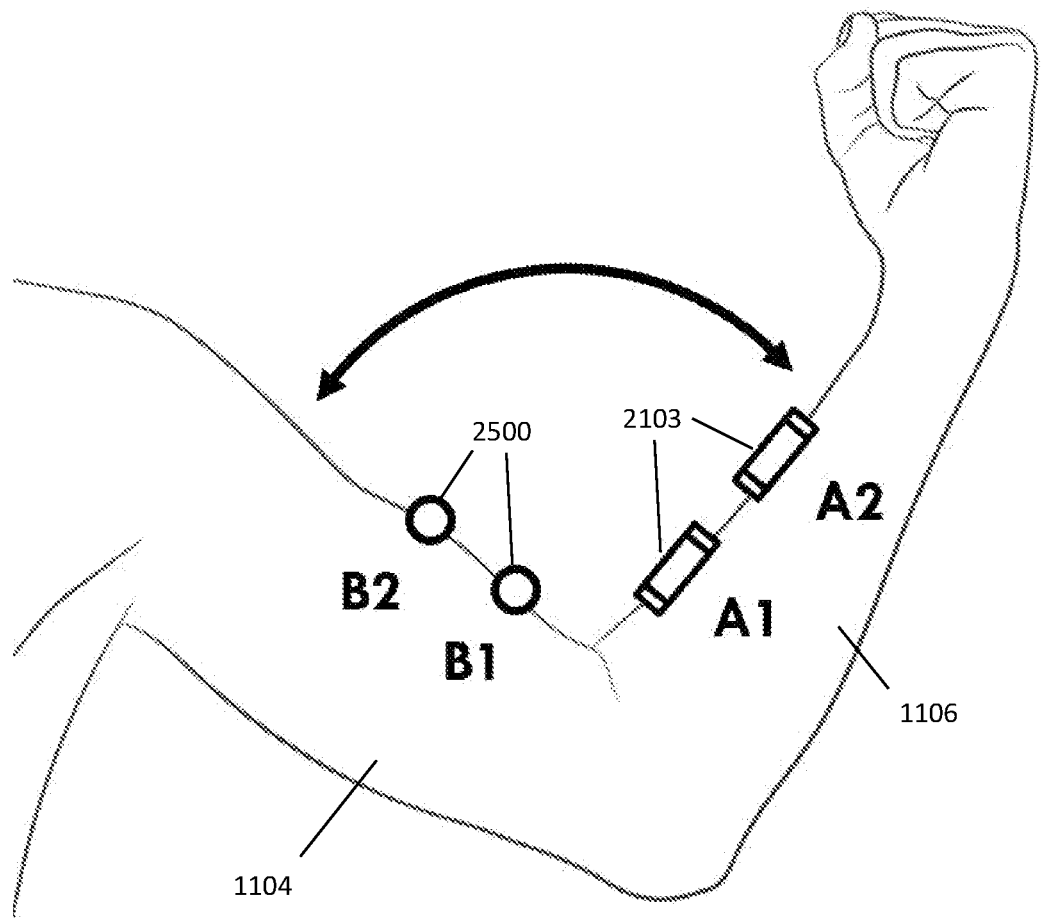
FIG. 20 is an illustration of two different possible positions of a magnetometer and magnet when comprised as part of a wearable device according to forms of the present technology.

The predetermined threshold for the adjusted magnetic field strength and/or the magnetic field direction may be dependent on the configuration of the wearable device 2300, for example the distances f1 and f2 of the magnetometer 2103 and magnet 2500 from the antecubital joint 1102a. FIG. 20 is an illustration of two different possible positions of a magnetometer and magnet when comprised as part of a wearable device according to forms of the present technology. Referring to FIG. 20, the magnetometer's predetermined threshold may be dependent on the distance between the magnetometer 2103 and the magnet 2500 for a given angle at the elbow 1102, and this distance is dependent on the distances f1 and f2 for the wearable device 2300. In the illustrated example, a magnetometer and magnet pairing of A1 and B1, which are positioned relatively close to the elbow 1102 would result in the magnetometer 2103 sensing a higher value of magnetic field strength at the same elbow angle as the magnetometer and magnet pairing of A2 and B2, which are positioned relatively further away from the elbow 1102 therefore have relatively larger values for f1 and f2.

In one exemplary form of the technology in which a magnet 2500 having grade N38 is used and the distances f1 and f2 are 7.5 cm it has been determined that the predetermined threshold for the adjusted magnetic field strength may be 6000 µT. The predetermined threshold will vary dependent on the strength (or grade) of the magnet. The predetermined threshold for other grade magnets may be determined experimentally.

The magnetic field (strength and/or direction) sensed by the magnetometer 2103 is dominated by the magnetic field of the magnet 2500 when it is located relatively close to the magnetometer 2103. When the magnet 2500 is located relatively further away, the magnetic field sensed by the magnetometer 2103 is dominated by interference, for example the interference caused by the Earth's magnetic field, other magnetic field sources or magnetic abnormalities on the wearable device 2300. Therefore, in certain forms of the technology, the predetermined threshold for the magnetometer 2103 is relatively larger than any potential sources of interference. The wearable device 2300 may be configured accordingly, for example the grade of the magnet 2500 may be suitably selected and/or the distances f1 and f2 are made sufficiently small.

5.6.3.2. Detecting Orientation of Part(s) of User's Arm with Respect to Gravity to Determine Arm Event Indicative of Face Touching The processor 2200 may be additionally or alternatively configured to determine an arm event is indicative of face touching when the value(s) indicative of the orientation of the part(s) of the user's arm 1100, or the measured parameter used as a proxy for the relative orientation of the part(s) of the user's arm, with respect to gravity, pass(es) a predetermined threshold(s).

The predetermined threshold may include a first predetermined threshold or set of predetermined thresholds for the value(s) indicative of the angle between the user's forearm 1106 and the vertical axis of the body. Additionally or alternatively, the predetermined threshold may include a second predetermined threshold or set of predetermined thresholds for the value(s) indicative of the angle between the user's forearm 1106 and a vertical plane in which lies the upper arm of the same arm. The predetermined thresholds may include a minimum and a maximum angle of either or both of these forearm angles, i.e. the arm event indicative of face touching may be determined when the forearm angle exceeds the minimum angle and/or is below the maximum angle.

FIG. 21A shows the user 1000 from the rear (i.e. a posterior view) with the arm extending out in front of the user and illustrates the predetermined thresholds for the angle between the user's forearm 1106 and a vertical plane in which lies the upper arm of the same arm. From this viewpoint and with the arm out in front of the user when the user in an upright position, this angle is equivalent to the angle of the forearm 1106 to the vertical V. Lines $XY^{min}$ and $XY^{max}$ represent the orientation of the forearm at positions corresponding to the predetermined thresholds. The angles A, B between vertical V and each of the lines $XY^{min}$, $XY^{max}$ are the predetermined thresholds in this example. In this form the threshold angles A, B are angles of the forearm relative to the vertical V when viewed from this angle while in other forms the threshold angles may be angles of the forearm relative to the horizontal, or any other reference plane. Angle B may be a maximum angle. In some forms, the minimum angle may be between 30° and 0°, for example 20° to 5°, for example B is 10°. Angle A may be a minimum angle. In some forms, the maximum angle may be between −10° to −70°, for example −20° to −60°, for example A is −54°. Therefore, an arm event indicative of face touching may be determined when any one or more of the following requirements are met: 1) the user's forearm angle from a vertical plane in which lies the upper arm of the same arm exceeds the minimum angle; and 2) is below the maximum angle. A more accurate indication of face touching may be provided if both these requirements are required to be met for the indication.

Figure 21B:
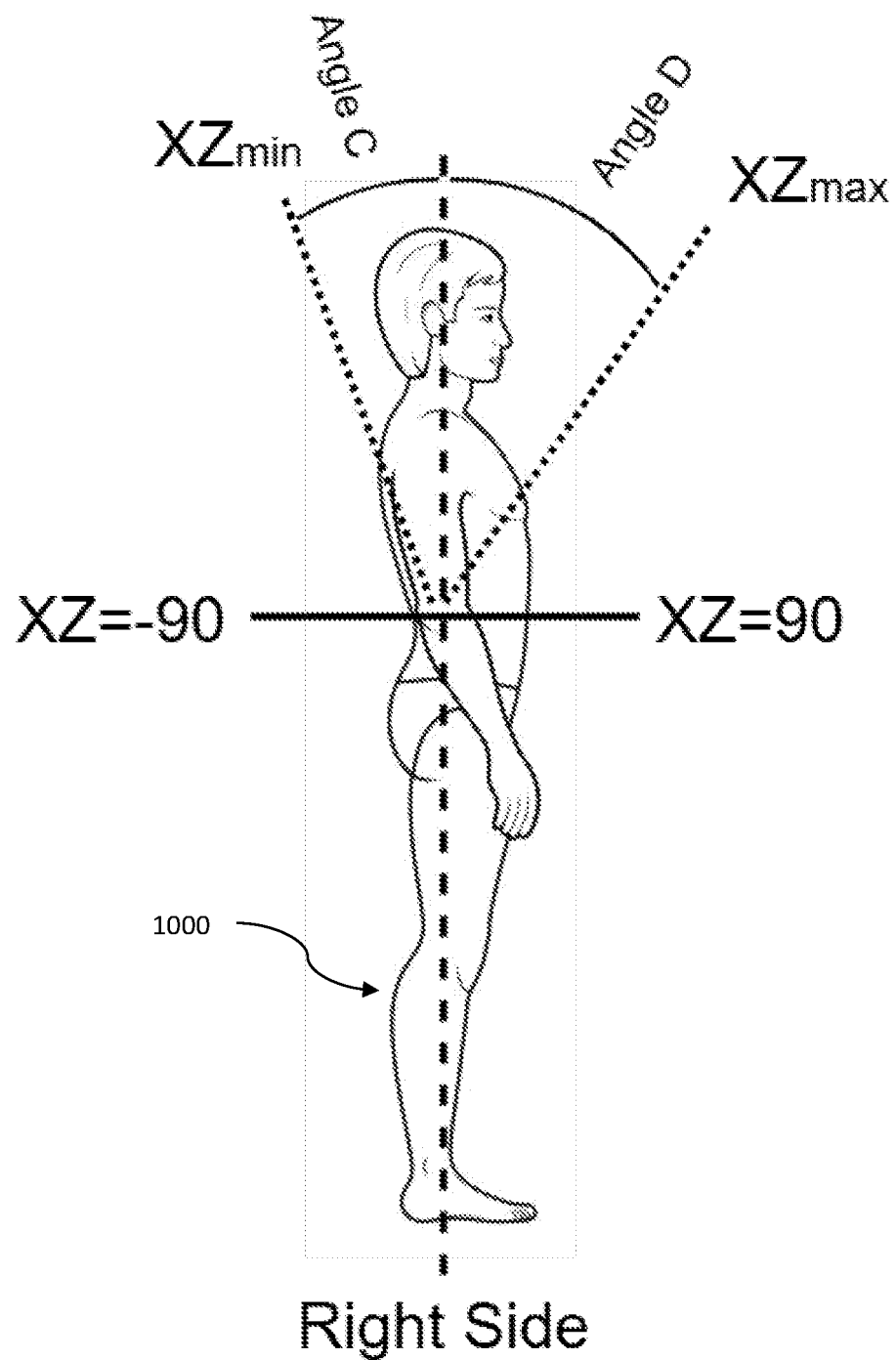
FIG. 21B is a side view of the user's body of FIG. 21A, showing predetermined threshold(s) defined in the sagittal plane.

FIG. 21B shows the user 1000 from the side with the arm extending out in front of the user and illustrates the predetermined thresholds for the angle between the user's forearm 1106 and the vertical axis of the body. From this viewpoint and with the arm out in front of the user when the user in an upright position, this angle is equivalent to the angle of the forearm 1106 to the vertical V. Lines $XZ^{min}$ and $XZ^{max}$ represent the orientation of the forearm at positions corresponding to the predetermined thresholds. The angles C, D between vertical V and each of the lines $XZ^{min}$, $XZ^{max}$ are the predetermined thresholds in this example. In this form the threshold angles C, D are angles of the forearm relative to vertical V when viewed from this angle while in other forms the threshold angles may be angles of the forearm relative to the horizontal, or any other reference plane. Angle C may be a minimum angle. In some forms, the minimum angle may be between −50° to −10°, for example −40° to −20°, for example C is −30°. Angle D may be a maximum angle. In some forms, the maximum angle may be between 0° to 40°, for example 10° to 30°, for example D is 15°. Therefore, an arm event indicative of face touching may be determined when any one or more of the following requirements are met: 1) the user's forearm angle from the vertical axis of the body exceeds the minimum angle; and 2) is below the maximum angle. A more accurate indication of face touching may be provided if both these requirements are required to be met for the indication.

While in some forms the determination of face touching may be based on whether any one measure of the orientation of the forearm meets the relevant criteria, a still further more accurate indication of face touching may be provided when determination is based on both measures of the orientation of the forearm described above meeting the relevant criteria.

It has been explained that, in certain forms, the system 2000 may comprise a head/torso orientation sensor and, from the signals generated by such a sensor, the processor 2200 may determine the relative orientation of the user's arm to their head/torso by subtracting the orientation of the user's arm with respect to the direction of the Earth's gravitational field from the orientation of the user's head/torso with respect to the direction of the Earth's gravitational field. After that subtraction is made the same steps as are described above are applied to determine whether face touching is occurring.

A system 2000 may be beneficial in detecting face touching irrespective of the orientation of the user's head or body situations, but the disadvantage is that it requires an additional sensor to be provided and worn by the user.

5.6.3.3. Detecting Combination of Relative Position/Orientation and Orientation of Part(s) of the User's Arm with Respect to Gravity to Determine Arm Event Indicative of Face Touching In certain forms, the processor 2200 is configured to determine the arm event is indicative of face touching when the value(s) indicative of the relative position/orientation of the part(s) of the user's arm pass(es) a predetermined threshold, and the value(s) indicative of the orientation of the part(s) of the user's arm 1100 with respect to gravity pass(es) a predetermined threshold. In one embodiment, for example, an arm event is determined when all of the following requirements that indicate face touching have been met: angle at the user's elbow meeting the relevant criteria as described above; orientation of the forearm as an angle between the user's forearm 1106 and gravity (or the vertical axis of the body) meeting the relevant criteria as described above; and orientation of the forearm as angle between the user's forearm 1106 and a vertical plane in which lies the upper arm of the same arm meeting the relevant criteria as described above. In the exemplary form, the wearable device 2300 comprises an AND gate, wherein the processor 2200 is configured to repeatedly calculate the values described above and compare them with the predetermined thresholds and make a determination that the arm event is indicative of face touching if each of the above predetermined thresholds are met.

Figure 22:
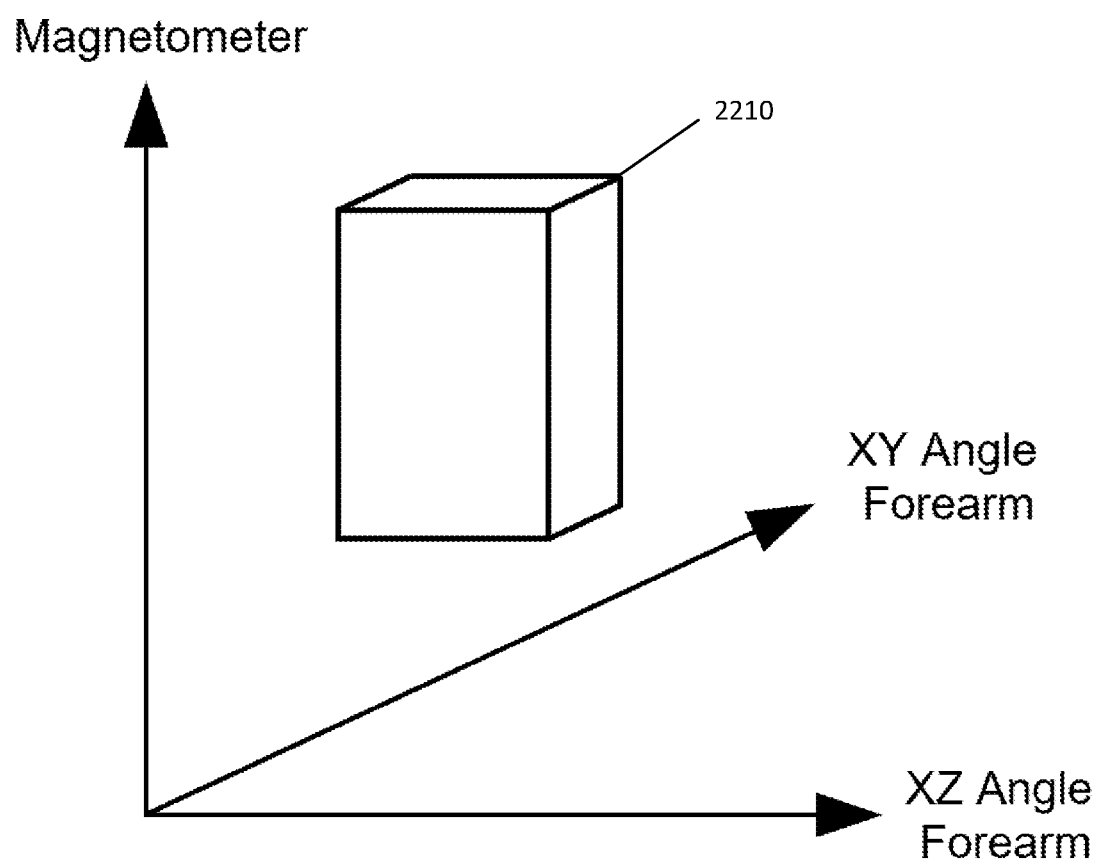
FIG. 22 is an illustration of the combination of values calculated by the processor that may lead to a determination of face touching according to one form of the technology.

FIG. 22 is an illustration of the combination of values calculated by the processor 2200 that may lead to a determination of face touching according to one form of the technology. The vertical axis indicates the value indicative of the angle at the user's elbow, for example as measured by the magnetometer 2103 in some forms described above. The horizontal axis represents a value indicative of one measure of the orientation of the user's forearm (such as one of the measures described above), and the axis shown in perspective going into the page represents a value indicative of another measure of the orientation of the user's forearm (such as the other measure described above). The shaded cuboid 2210 indicates the set of values for which a positive indication of face touching is determined by the processor 2200.

Figure 23:
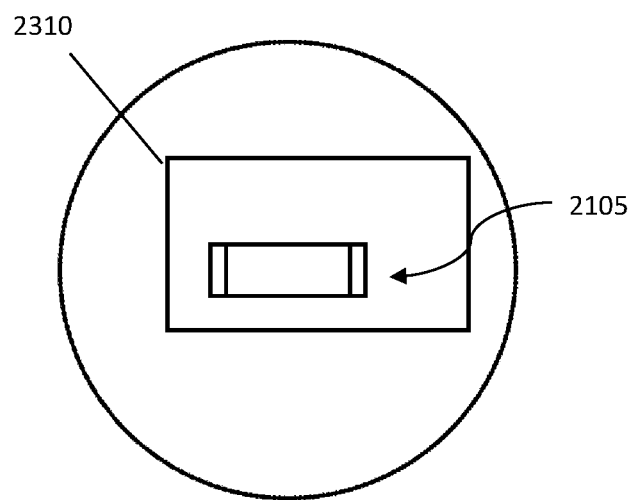
FIG. 23 is an illustration of the combination of values sensed by the accelerometer and calculated by the processor that may lead to a determination of face touching according to one form of the technology.

FIG. 23 is an illustration of the combination of values sensed by the accelerometer 2105 and calculated by the processor 2200 that may lead to a determination of face touching according to one form of the technology. The horizontal axis represents a value indicative of one measure of the orientation of the user's forearm (such as one of the measures described above), and the vertical axis represents a value indicative of another measure of the orientation of the user's forearm (such as the other of the measures described above). The combination of values shown in FIG. 23 may be considered to be the projection onto the horizontal plane in FIG. 22. The region inside the rectangle 2310 in FIG. 23 indicates the set of values for which a positive indication of face touching is determined by the processor 2200. The rectangle 2310 may be considered to be the projection of the shaded cuboid in FIG. 22 onto the horizontal plane in that diagram.

In forms of the technology represented in both FIG. 22 and FIG. 23, the thresholds for each of the values are not dependent on any of the other values. However, in some forms, more accurate results for a positive or negative indication of face touching may be achieved using an interdependency between the determined values. This is because there are biomechanical constraints of the arm joints and therefore there are discoverable interdependencies between parameters describing the position/orientation of parts of the arm, for example the angle between the upper arm and forearm at the elbow and orientation of the forearm with respect to gravity, that are required to touch the face. Consequently, in certain forms of the technology, any one or more of the predetermined threshold(s) of any one or more of the values calculated by the processor 2200 as being indicative of the relative position of a part or parts of the user's arm and/or the orientation of a part of parts of the user's arm may be dependent on one or more of the other values calculated by the processor 2200 as being indicative of the relative position of a part or parts of the user's arm and/or the orientation of a part of parts of the user's arm. Alternatively, or additionally, the value(s) may be a function of any one or more of the parameters measured by the sensors (for example the magnetic field strength measured by the first sensor).

An illustration of this is shown in FIG. 24, which is an illustration of the combination of values calculated by the processor 2200 that may lead to a determination of face touching according to another form of the technology. The axes of FIG. 24 are similar to those shown in FIG. 22 only, in the case of the vertical axis, labelled as the anatomical value of the angle of elbow flexion rather than the measured magnetic field strength that is indicative of this value. FIG. 24 shows a region 2410 indicating the set of values for which a positive indication of face touching is determined by the processor 2200. The graph in FIG. 24 illustrates an inter-related relationship between the predetermined thresholds according to one form of the invention. The predetermined thresholds of the wearable device 2300 may be determined by a relationship between the thresholds of the various sensors 2100. For example, the magnetometer's 2102 predetermined threshold and the accelerometer's 2105 predetermined thresholds in each of the frontal plane and the mid-sagittal plane may be dependent upon one or more of the values of which they are thresholds. In an example, the predetermined threshold(s) of the value(s) indicative of the user's elbow angle may be a function of the parameter(s) measured by the second sensor 2104 and/or the value(s) indicative of the orientation of the user's forearm calculated by the processor 2200. In another example, the predetermined threshold(s) of the value(s) indicative of the orientation of the user's forearm 1106 may be a function of the parameter(s) measured by the first sensor 2102 and/or the value(s) indicative of the user's elbow angle calculated by the processor 2200.

An example of such an interdependency is that, when the forearm is near vertical, the elbow may need to be substantially closed for an upright user to touch their face. When the elbow is opened, the forearm may need to be oriented more horizontally for the same user to touch the face.

It has been identified that there may be a baseline threshold value for the two values of the orientation of the forearm previously identified (i.e. the angle of the forearm relative to the vertical axis of the body and the amount of internal/external rotation), which is the equivalent of touching anywhere along the mid-line of the face with the hand, with the elbow relaxed by the side. When the arm extends in front of the user, this is when the forearm is oriented approximately vertically in the sagittal plane and angled slightly towards the middle of the body in the frontal plane. As the angle of the forearm in the frontal plane either increases or decreases from his position (moving the forearm more upright, or more flat across the chest), the forearm also needs to move towards the back of the body in the sagittal place, in order to track the fact that the cheeks angle backwards on either side of the mid-line of the face.

As shown in FIG. 24, the thresholds (both upper and lower) for the angle at the elbow in relation to the amount of internal/external rotation of the arm for a constant angle of the forearm with respect to the vertical axis of the body may be approximately V-shaped, i.e. the threshold for the elbow angle decreasing as external rotation increases up to a certain amount after which the threshold for elbow angle increases as external rotation increases. The thresholds (both upper and lower) for the angle at the elbow in relation to the angle of the forearm with respect to the vertical axis of the body for a constant amount of internal/external rotation of the arm may be approximately related so that, as the threshold for the elbow angle increases, the threshold for the forearm angle increases. In the illustrated co-ordinate space shown in FIG. 24, the resulting region in which face touching is deemed to occur may be approximately a 3D chevron shape.

FIG. 25 is an illustration of the combination of values sensed by the accelerometer 2105 and calculated by the processor 2200 that may lead to a determination of face touching according to another form of the technology. As with FIG. 23, the horizontal axis represents a value indicative of one measure of the orientation of the user's forearm, and the vertical axis represents a value indicative of another measure of the orientation of the user's forearm. The combination of values shown in FIG. 25 may be considered to be the projection onto the horizontal plane in FIG. 22 or FIG. 24. The region inside the line 2510 in FIG. 25 indicates the set of values for which a positive indication of face touching is determined by the processor 2200. The region 2510 may be considered to be the projection of a volume 2410 such as is shown in FIG. 24 onto the horizontal plane in that diagram. In FIG. 25 the accelerometer's predetermined thresholds are functions of each other.

5.6.4. Algorithm Execution

The processor 2200 is configured to process the sensor signals and to determine whether the arm event is indicative of face touching by execution of an algorithm. The algorithm may comprise a predetermined sequence of instructions or a set of rules for computing on the processor 2200. Computing may comprise calculating and/or signal processing. The instructions or rules of the algorithm may be executed on the processor 2200 such that the sensor signals which relate to the arm event and the parameter(s) measured using the sensor(s) 2100 may be used to compute and determine that the arm event indicative of face touching.

The algorithm may be a rule-based or threshold-based analytical model. The model may comprise a subset of parameters which may be configured to define the model behaviour. The algorithm may comprise a set of instructions executable by the processor 2200 including:
  (a) calculate the value(s) indicative of the relative position and/or orientation of the part(s) of the user's arm; and
  (b) determine the arm event is indicative of face touching by comparing the value(s) indicative of the relative position of the part(s) of the user's arm and/or the value(s) indicative of the orientation of the part(s) of the user's arm to one or more predetermined thresholds. The comparisons made by the processor may occur in any order, or simultaneously, and may occur through a repeated process.

FIG. 26 illustrates an exemplary algorithm 4000 executed by processor 2200, wherein the algorithm 4000 comprises a set of instructions including:
  (a) receive the sensor signal(s) indicative of the magnetic field strength and/or direction (4002);
  (b) calculate the adjusted magnetic field strength and/or the magnetic field direction (4004), for example the adjusted magnetic field strength is calculated by using the equation provided above;
  (c) receive the sensor signal(s) indicative of the acceleration (4006);
  (d) calculate the acceleration vector (4008);
  (e) calculate the accelerometer's angle in the XY plane (4010);
  (f) calculate the user's forearm angle as compared to a vertical plane in which lies the upper arm of the same arm (4012);
  (g) calculate the accelerometer's angle in the XZ plane (4014);
  (h) calculate the user's forearm angle as compared to the vertical axis of the body (4016); and
  (i) determine the arm event is indicative of face touching when one or more of the requirements described above are met (4018).

In some forms, the system 2000 may be calibrated in one or more calibration steps. The system 2000 may be configured to operate in a calibration mode during which the processor 2200 receives signals generated by the sensor(s) 2100 when the user performs calibration steps with the wearable device 2300 and performs steps to calibrate the system 2000. In this mode the user 1000 may be instructed by the wearable device 2300 or another associated device, e.g. tablet computer 318a, personal computer 318b, smartphone 318c, or smart watch (not shown), to preform one or more arm movements or a series of arm movements which form the calibration steps. The parameters measured by the sensor 2100 from performing these movements may be transmitted in one or more sensor signal(s) to the processor 2200, and the processor 2200 may use these and/or the values it calculates using these to determine and/or adjust the predetermined thresholds.

5.7. Output Device

The output device 2400 is a device configured to provide an output that is indicative of face touching. In the illustrated embodiment, the wearable device 2300 may comprise the output device 2400. The output device 2400 may be mounted to the body portion 2302, for example it may be provided to the sensor unit 2100A. In alternative forms, the output device 2400 may be located remote to the wearable device 2300. For example, the output device 2300 may form part of the computer system 300 described above. For example, the output device 2400 may include but may not be limited to devices such as tablet computer 318a, personal computer 318b, smartphone 318c, or smart watch (not shown). Additionally or alternatively, the output device may comprise memory 306 or 322.

In certain forms, the output device 2400 may comprise an alarm 2402 configured to generate one or more of: a vibration or other haptic feedback, a sound, and a visual stimulus.

In preferred forms, when an arm event indicative of face touching is determined by the processor 2200, it immediately (i.e. as soon as practicably possible, or "in real-time") triggers the generation and transmission of the output signals to the alarm 2402 which generates the warning to the user. The warning may be generated before, during and/or after a face touching event. In other forms, when an arm event indicative of face touching is determined by the processor 2200, the event is logged in memory 306 for provision to the user or another person or system at a later time. In other forms, the alarm 2402 may be triggered after a predetermined number of arm events indicative of face touching are determined by the processor 2200. In some forms, the predetermined number may be adjusted manually or automatically. For example, the user is a smoker, and after the predetermined number of arm events indicative of face touching have been determined, the alarm 2402 may be triggered to warn the user to stop smoking. In an example, the predetermined number may be equivalent to an average number of arm movements required to smoke of a certain number of cigarettes.

5.8. Method of Determining Face Touching

FIG. 27 illustrates an exemplary method 3000 of determining face touching using the system 2000 and/or wearable device 2300 described above. An example of implementation of the method 3000 shown in FIG. 27 will be described with reference to the use of the exemplary wearable device shown in FIG. 2.

In a first step 3100, a wearable device is mounted to the user's arm 1100.

In a second step 3200, the sensor signals are generated by the sensor(s) 2100 when the part(s) of the user's arm are moved.

In a third step 3300, the sensor signals generated by the sensors 2100 are transmitted to the processor 2200.

In a fourth step 3400, the transmitted sensor signals are processed by the processor as described above.

In a fifth step 3500, one or more output signals are generated as a result of the processing performed by the processor 2200.

In a sixth step 3600, the one or more output signals generated by the processor 2200 are transmitted to the output device 2400, and in preferred forms, the output device 2400 generates a warning to the user 1000.

5.9. Alternative Form of the Technology

FIGS. 29 to 37 illustrate a system 2000 for determining potential, imminent and/or actual face touching according to another form of the present technology wearable device.

As shown in FIG. 29, the wearable device 2300 may be configured for the user to wear a wearable device 2300 on one or each arm.

As shown in FIG. 30, the user may wear the wearable device 2300 at a distance above the main creases on the cubital fossa of the arm. The distance may be between 3 mm to 50 mm, for example.

When the user bends the elbow, the proximal surface of the forearm may push the lever of a microswitch 3002. This in turn will activate the stimulus module in wearable device 2300. Wearable device 2300 may be held in position by an elastic material 3012.

As shown in FIG. 31 the wearable device 2300 may consist of microswitch 3002, tilt switch 3004, vibration motor 3005, capacitor 3006, battery 3007 and on/off switch 3008. FIG. 31 shows an example of arrangement of different components in the wearable device 2300. In this arrangement, the stimulus module may emit a short duration of stimulus, for example sound or vibration when a person tries to touch the face by bending the elbow and elevating the arm.

The bending of the elbow may be detected by lever microswitch 3002 and the elevation of the arm may be detected by the tilt switch 3004. The current needed to produce a short duration of stimulus may be supplied by capacitor 3006. Microswitch 3002 may direct the current to charge capacitor 3006 during an inactive phase (lever not pushed).

During an active phase (lever pushed), microswitch 3002 may direct current from capacitor 3006 to vibration motor 3005, hence resulting in stimulus production. The tilt switch 3004 may complete the circuit, causing the wearable device 2300 to produce stimulus only when a person elevates their arm in combination with bending the elbow. For clarity, when a person bends their elbow without arm elevation, the device may remain inactive. These systems may increase the specificity of the device. On/Off switch 3008 may allow the user to switch off the device when not in use.

As shown in FIG. 32, the different modules or components may be fitted into a device housing 3009.

As shown in FIG. 33, the tilt switch 3004 may be positioned at an angle 3010 in relation to the horizontal axis of device housing 3009. Angle 3010 may be between 60° to 89°, for example. Microswitch 3002 may be positioned at a height 3011 in relation to the horizontal axis of device housing 3009. Height 3011 may be between 8 mm to 20 mm, for example.

As shown in FIG. 34, the wearable device 2300 may be attached to an elastic material 3012.

As shown in FIG. 35, the wearable device 2300 may produce a stimulus when the user bends the elbow and elevates the arm, when trying to touch his/her face, eyes, nose, mouth and/or ears.

FIG. 36 illustrates exemplary steps that may be involved in activation of the device to produce a stimulus in one form. Overtime, the user may overcome the habit of face touching. This aims to prevent the transmission of infectious disease such as Covid-19 and influenza virus or other diseases.

As shown in FIG. 37, a plurality of modules may be used as part of the wearable device 2300.

5.10. Other Remarks

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this specification is not, and should not be taken as, an acknowledgement or any form of suggestion that that prior art forms part of the common general knowledge in the field of endeavour in any country in the world.

Aspects of the present technology may also be said broadly to consist in the parts, elements and features referred to or indicated in the specification of the application, individually or collectively, in any or all combinations of two or more of said parts, elements or features. Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present technology.

The invention claimed is:

1. A System for determining one or more of potential, imminent and actual touching of a user's face by the user's hand, the system comprising a wearable device comprising:
   a body portion configured to be worn on the user's arm, wherein the body portion is configured to be mounted on the user's elbow region;
   a first sensor mounted on the body portion, wherein the first sensor is configured to generate a first sensor signal indicative of an angle between the user's forearm and the user's upper arm; and
   a second sensor mounted on the body portion, wherein the second sensor is configured to generate a second sensor signal indicative of an orientation of the user's forearm with respect to a reference,
   wherein the system further comprises:
   a processor for receiving the first sensor signal and the second sensor signal from the first sensor and the second sensor respectively, the processor being configured to determine one or more of potential, imminent and actual face touching of the user's face by the user's hand from the first sensor signal and the second sensor signal by comparing the first sensor signal to a first threshold and determining whether the second sensor signal has certain values which in combination with the comparison of the first sensor signal to the threshold, indicate one or more of a potential, imminent and actual face touching of the user's face by the user's hand; and
   an output device for receiving a signal from the processor and for indicating that one of potential, imminent or actual touching of the user's face by the user's hand has been determined by the processor, wherein the output device is configured to generate one or more of: a vibration or other haptic feedback, a sound, and a visual stimulus as an alarm to the user when such potential, imminent or actual touching of the user's face by the user's hand is determined.

2. A wearable device as claimed in claim 1, wherein the first sensor is a proximity sensor and the first sensor signal is indicative of a relative distance between a part of the user's forearm arm and a part of the user's upper arm.

3. A wearable device as claimed in claim 1, wherein the first sensor is mounted on the body portion so that, when worn, the first sensor is located on the user's forearm or upper arm and the wearable device further comprises a sensed member mounted on the body portion so that, when worn, the sensed member is located on the other of the user's forearm or upper arm, wherein the first sensor is configured to sense the distance of the sensed member from the first sensor.

4. A wearable device as claimed in claim 3, wherein the first sensor is a magnetometer and the sensed member is a magnet.

5. A wearable device as claimed in claim 4, wherein the magnetometer is configured to separately measure magnetic field strength in a plurality of directions.

6. A wearable device as claimed in claim 4, wherein the magnetometer is configured to measure a direction of a sensed magnetic field.

7. A wearable device as claimed in claim 1, wherein the second sensor signal is indicative of an angle of the user's forearm relative to vertical.

8. A wearable device as claimed in claim 1, wherein the second sensor signal is indicative of an amount of internal/external rotation of the arm.

9. A wearable device as claimed in claim 1, wherein the second sensor is an accelerometer.

10. A wearable device as claimed in claim 9, wherein the accelerometer is configured to separately measure acceleration in a plurality of directions.

11. A wearable device as claimed in claim 1, wherein the wearable device comprises the processor, the processor being mounted on the body portion.

12. A wearable device as claimed in claim 1, wherein the body portion comprises a sleeve, wherein the sleeve comprises a first section configured, when worn, to be located above the user's elbow and a second section configured, when worn, to be located below the user's elbow.

13. A wearable device as claimed in claim 1, wherein the second sensor is a gyroscope.

14. A system as claimed in claim 1 wherein the first threshold is dependent on the second sensor indicative of the orientation of the user's forearm with respect to the reference.

15. A system for determining one or more of potential, imminent and actual touching of a user's face by the user's hand, the system comprising:
   a magnetometer configured to be mounted on the user's arm; and
   a magnet configured to be mounted on the user's arm, wherein the magnetometer and the magnet are configured to be mounted on the user's arm so that, when worn, one of the magnetometer and the magnet is located above the user's elbow and the other one of the magnetometer and the magnet is located below the user's elbow,
   wherein the magnetometer is configured to send a first sensor signal indicative of an angle between the user's forearm and the user's upper arm to a processor, the processor being configured to determine one or more of potential, imminent and actual face touching of the user's face by the user's hand from the sensor signal, wherein the system further comprises:
a processor for receiving the sensor signal from the magnetometer and a second sensor signal from the magnet, the processor being configured to determine one or more of potential, imminent and actual face touching of the user's face by the user's hand from the first sensor signal and the second sensor signal by comparing the first sensor signal to a first threshold and determining whether the second sensor signal has certain values which in combination with the comparison of the first sensor signal to the threshold, indicate one or more of a potential, imminent and actual face touching of the user's face by the user's hand; and
an output device for receiving a signal from the processor and for indicating that one of potential, imminent or actual touching of the user's face by the user's hand has been determined by the processor, wherein the output device is configured to generate one or more of: a vibration or other haptic feedback, a sound, and a visual stimulus as an alarm to the user when such potential, imminent or actual touching of the user's face by the user's hand is determined.

16. A system as claimed in claim 15, wherein the system further comprises the processor.

17. A system as claimed in claim 16:
wherein the magnetometer is configured to measure a magnetic field strength of the magnet in each of a plurality of directions,
wherein the magnetometer is configured to send a signal indicative of the measured magnetic field strengths to the processor, and
wherein the processor is configured to:
receive the signal;
calculate one or more adjusted magnetic field strength values from the measured magnetic field strengths in one or more of the plurality of directions;
calculate an adjusted magnetic field strength using the adjusted magnetic field strength values; and
determine one or more of potential, imminent and actual face touching of the user's face by the user's hand from the adjusted magnetic field strength.

18. A system as claimed in claim 15, wherein the system further comprises an orientation sensor configured to be mounted on the user's arm, wherein the orientation sensor is configured to generate an orientation sensor signal indicative of an orientation of the user's forearm with respect to a reference and to send the orientation sensor signal to the processor, the processor being configured to determine one or more of potential, imminent and actual face touching of the user's face by the user's hand from the sensor signal and the orientation sensor signal.

19. A system as claimed in claim 15, wherein the magnetometer and magnet are mounted on a sleeve configured to be worn on the user's elbow region.

20. A wearable device for use in a system for determining one or more of potential, imminent and actual touching of a user's face by the user's hand, the wearable device comprising:
a body portion configured to be worn on the user's arm, wherein the body portion is configured to be mounted on the user's elbow region;
a first sensor mounted on the body portion, wherein the first sensor is configured to generate a first sensor signal indicative of an angle between the user's forearm and the user's upper arm; and
a second sensor mounted on the body portion, wherein the second sensor is configured to generate a second sensor signal indicative of an orientation of the user's forearm with respect to a reference,
wherein the system further comprises:
a processor configured to:
receive and process the first sensor signal and the second sensor signal and determine one or more of potential, imminent and actual face touching of the user's face by the user's hand from the first sensor signal and the second sensor signal;
calculate from the first sensor signal and the second sensor signal a plurality of values indicative of the position and/or orientation of the user's arm;
determine one or more potential, imminent and actual face touching of the user's face by the user's hand by comparing each of the values to one or more predetermined thresholds,
wherein the predetermined threshold(s) of at least one of the values is dependent on another one or more of the values or one or more of the plurality of parameters.

* * * * *